United States Patent [19]

Skeirik

[11] Patent Number: 4,910,691

[45] Date of Patent: Mar. 20, 1990

[54] PROCESS CONTROL SYSTEM WITH MULTIPLE MODULE SEQUENCE OPTIONS

[75] Inventor: Richard D. Skeirik, Newark, Del.

[73] Assignee: E.I. Du Pont de Nemours & Co., Wilmington, Del.

[21] Appl. No.: 103,124

[22] Filed: Sep. 30, 1987

[51] Int. Cl.[4] .................... G06F 15/46; G06F 15/18
[52] U.S. Cl. .................................. 364/513; 364/138; 364/300; 364/500
[58] Field of Search .............. 364/469, 500, 513, 131, 364/132, 148, 300, 550, 138, 139

[56] References Cited

U.S. PATENT DOCUMENTS

| | | | |
|---|---|---|---|
| 4,215,396 | 7/1980 | Henry et al. | 364/136 |
| 4,616,306 | 10/1986 | Kuzma et al. | 364/140 |
| 4,628,435 | 12/1986 | Tashiro et al. | 364/130 |
| 4,642,782 | 2/1987 | Kemper et al. | 364/550 |
| 4,644,479 | 2/1987 | Kemper et al. | 364/550 |
| 4,648,044 | 3/1987 | Hardy et al. | 364/513 |
| 4,649,515 | 2/1987 | Thompson et al. | 364/900 |
| 4,658,370 | 4/1987 | Ermon et al. | 364/513 |
| 4,670,848 | 6/1987 | Schramm | 364/513 |
| 4,672,529 | 6/1987 | Kupersmit | 364/138 |
| 4,740,886 | 4/1988 | Tanifuji et al. | 364/150 |
| 4,752,889 | 6/1988 | Rappaport et al. | 364/513 |
| 4,754,410 | 6/1988 | Leech et al. | 364/513 |
| 4,825,353 | 4/1989 | Jenkins | 364/152 |

OTHER PUBLICATIONS

Edblad et al., Pat. No. 4,227,245 (Jumbo), cols. 59-59, 10/7/80.
"RESCU-On-Line Real-Time Artificial Intelligence," Ray Shaw, Computer Aided Engineering Journal (Feb., 1987) pp. 29-30.
"Applying Artificial Intelligence to Process Control Systems," P. D. Christopherson, vol. 2 of Auton Control Pet, Petrochem Dealin, Proc IFAC Workshop (1986), pp. 151-155.
"Expert Systems in On-Line Process Control," Robert L. More, Mark A. Kromer (undated).
"Plant Scale Process Monitoring and Control Systems: Eighteen Years and Counting," L. E. DeHeer, in the volume Foundations of Computer Aided Process Operations, Proceedings of the First International Conference of Foundations of Computer Aided Process Operations, Park City, Utah, Jul. 5-10, 1987 (1987), p. 33.
"Application of Expert Systems to Process Problems," Sripada et al., Energy Processing/Canada, vol. 78 (1985), pp. 26-31.
"Process Control Applications of Artificial Intelligence," K. W. Goff, Proceedings of the Refining Department of the American Petroleum Institute, vol. 65 (1986), pp. 26-31.
"Expert Systems—Applications of AI in Engineering," William S. Faught, Computer (IEEE) (Jul. 1986).
"Chemical Plant Fault Diagnosis Using Expert Systems Technology: A Case Study," Duncan A. Rovan, Reprints of papers for IFAC Kiota Workshop on Fault Detention and Safety in Chemical Plants (Sep. 26, 1986).
"Dispatcher: An Intelligent Approach to Factory Control," R. Zemel and M. Acock, Proceedings of the 1986 American Control Conference (Jun. 18-20, 1986), vol. 1, pp. 152-155.

(List continued on next page.)

Primary Examiner—Parshotam S. Lall
Assistant Examiner—Thomas G. Black
Attorney, Agent, or Firm—Saidman, Sterne, Kessler & Goldstein

[57] ABSTRACT

An integrated system for process control in which a process supervisor procedure (which is preferably the top-level procedure) is configured as a modular software structure, with modules which can be revised by a user at any time without significantly interrupting the operation of the process supervisor. A user can define or redefine modules by editing highly constrained templates, which preferably include module timing and sequencing options including: block becomes active if another specified block has become active; block becomes active if a new value has been entered for a specified data source; block becomes active if a specified time of inactivity has elapsed; and combinations of these.

28 Claims, 18 Drawing Sheets

OTHER PUBLICATIONS

"Historical Data Recording for Process Computers," John C. Hale et al., *CEP* (Nov., 1981), pp. 38–43.

"A Real Time Expert System for Process Control," L. Hawkinson, et al., *Artificial Intelligence Applications in Chemistry* (American Chemical Society 1986).

"Using an Expert System for Fault Diagnosis," D. A. Rowan, *Control Engineering* (Feb., 1987).

"Plexys: The Plant Expert System Enhancement to KEE: Knowledge Aided Engineering and Plant Operations Analysis," *Intellicorp EPPS* (Jun. 5, 1986).

"AI amd MAP in Processing Industries," Kane, *Hydrocarbon Processing* (Jun., 1986).

"Expert Systems: Are They the Next Generation of Process Controls?," Moore et al., *InTech* (May, 1985), pp. 55–57.

"Troubleshooting Comes Online in the CPI," *Chemical Engineering* (Oct. 13, 1986), pp. 14–19.

"Experience in the Development of an Expert System for Fault Diagnosis in a Commercial Scale Chemical Process," P. S. Dhurjati et al., *Foundations of Computer Aided Process Operations*, Proceedings of the First International Conference of Foundations of Computer Aided Process Operations, Park City, Utah (Jul. 5–10, 1987).

"Control Software Comes to Personal Computers," M. Manoff, *Control Engineering* (Mar., 1984), pp. 66–68.

*Expert Systems* (ed. R. Forsythe 1984).

P. Harmon and D. King, *Expert Systems* (1985).

D. Waterman, A Guide to Expert Systems (1984).

"An Academic/Industry Project to Develop an Expert System for Chemical Process Fault Detection," D. E. Lamb et al. presented Nov. 13, 1985 at the Annual Meeting of the American Institute of Chemical Engineers, Chicago, Ill.

"Process Control Using Modular Package Software", Watson, *EIII Conference Publications No. 102 (1973).*

"On–Line Process Simulation Techniques in Industrial Control Including Parameter Identification and Estimation Techniques," in *Proceedings of the Eleventh Annual Advanced Control Conference* (1985).

"Real–Time Expert Systems in Process Control", the Digest of the IEEE Colloquium held 29 Nov. 1985 at Salford, U.K.

Build-Expert Process Variable Rule Template

Rule Name: XYLENE_COLUMN_STEAM

Data Type: [ 5 ] Goal of Cont Sys loop #: [ 5 ] DMT PROD SHRT DEVIAT [ ]

Retrieval Time Interval: [ ]

Oldest Allowable Age: [ ]

| Status Value | Operator Limit | | Operator Limit | |
|---|---|---|---|---|
| MIN | .LT. | 40.5 | | |
| MAX | .GT. | 66.5 | | |
| MID | .GE. | 40.5 | .LE. | 66.5 |
| | | | | |
| | | | | |

Keypad 7 — Delete Rule

Keypad 9 — Top of Form

Keypad — Store rule & Exit

Figure 3

```
Build Expert - Process Variable Calculation Rule Template
Rule Name: XYLENE_COLUMN_STEAM
```

Value to be test against the limits below: V1

| Status Value | Operator | Limit | Operator | Limit |
|---|---|---|---|---|
| MIN | .LT. | E2 | | |
| MAX | .GT. | E1 | | |
| MID | .GE. | E2 | .LE. | E1 |
|  |  |  |  |  |
|  |  |  |  |  |

| Keypad 7 Delete Rule | Keypad 8 Next Page | Keypad 9 Top of Form | Keypad - Store rule & Exit |
|---|---|---|---|

---

Build Expert - Process Variable Calculation Rule Template - P 2

| | Data Type | | Data Index | | Time_Int - Avg |
|---|---|---|---|---|---|
| V1 | 5 | Goal of Cont Sys loop # | 3 | XYL COL AVG STEAM | |
| V2 | 5 | Max Manip Value Suprv Block # | 3 | XYL COL AVG STEAM | |
| V3 | 5 | Min Manip Value Suprv Block # | 3 | XYL COL AVG STEAM | |
| V4 | | | | | |
| V5 | | | | | |
| V6 | | | | | |
| V7 | | | | | |
| V8 | | | | | |
| V9 | | | | | |
| V10 | | | | | |

E1 V2-D5
E2 V3+D5
E3
E4
E5
E6
E7
E8
E9
E10

| Keypad 7 Delete Rule | Keypad 8 -> E1 | Keypad 9 Top of Form | Keypad - Store rule & Exit |
|---|---|---|---|

Figure 4

Build-Expert Analysis Rule Template

Rule Name: FB_TARGET_1

The condition Named: FB_TARGET

Will have the value: XYLENE COLUMN

| (NOT) | Variable Rule Name or Analysis Condition Name | | Status Value |
|---|---|---|---|
| | FB DIRECTION | .EQ. | CUT |
| .AND. ( .NOT. | XYLENE COLUMN STEAM | .EQ. | MIN |
| .AND. ( | | .EQ. | |
| .AND. ( | | .EQ. | |
| .AND. ( | | .EQ. | |

[Keypad 7 Delete Rule]  [Keypad 9 Top of Form]  [Keypad - Store rule & Exit]

Figure 5

Build-Expert Action Rule Template
Rule Name: CHANGE XYLENE STEAM

Do the Action below if:

Variable Rule Name or
Analysis Condition Name         .EQ.   Status Value
FB TARGET                              XYLENE COLUMN Action Type: [ 1 ]

1 - Execute a Fortran Statement (may incl a subroutine call)
　　2 - Execute a command procedure
　　3 - Send a Computer Mail Message Fortran Executable Statement, or filename of command procedure
Status = Select_supv_block ( 3 , 4 , 5 , 0 , 0 , 0 )

| Keypad 7 Delete Rule | Keypad 8 Enter Msg | Keypad 9 Top of Form | Keypad - Store rule & Exit |

Figure 6

Build Supervisor Block Selection

Block Number: [....]

Block Type: [....]   1 - Feedback
2 - Feedforward
3 - User Program
4 - Shewhart

Enter the number of the block you want to work on, and press Return. To set up a new block, enter an unused number or press Next Avail Block, then specify the block type.

Keypad 8
Next Avail Block

Keypad -
Prev Page

Figure 9

*Shewhart Statistical Filter Block*
SETUP TEMPLATE

Block Number: [ 1 ]
Block Type: Shewhart                    Block Owner: [Skejlk]
Block Description:                      Control Application Name: [MFB Control]
[DMT Product MFB Shewhart Block]
Filtered Var Type:     [ 4 ]  Historical Database Var # [2084] DMT PRODUCT MFB PPM ← 1236
Deviation Var Type:    [ 4 ]  Historical Database Var # [2990] DMT PRD SHRT DEVIAT
Rule Var Type:         [ 2 ]  Historical Database Var # [2991] DMTR PRD SHRT RULE
External Switch Type:  [ 0 ]  Manual                    [Man]
Aim:        [22.000] PPM ─ 1222
Sigma:      [2.5000] PPM ─ 1224
Fix Time:   [ 0  09:00:0] ─ 1226

Minimum Deviation: [22.00] DEVIAT ← 1228
Maximum Deviation: [100.00] DEVIAT ← 1230
Min Value Meas Var: [5.0000] PPM ─ 1232
Max Value Meas Var: [100.00] PPM ─ 1234
Action Log File: [MFB Control]
Block Status:    On - Recovrd Usr Err

| Keypad 7 Toggle On/Off | Keypad 8 Next Avail Block | Keypad 9 Top of Form | Keypad - Store rule & Exit |

FIG. 12

PROCESS CONTROL SYSTEM WITH MULTIPLE MODULE SEQUENCE OPTIONS

PARTIAL WAIVER OF COPYRIGHT
CROSS-REFERENCE TO OTHER APPLICATIONS
BACKGROUND OF THE INVENTION
  Process Control Generally
    Modularity
    Historical Process Database
    Continuous Control Action
    Control of Multiple Manipulated Variables
  Expert Systems Generally
    Knowledge Input and Updating
    Expert System Knowledge Structures
  Expert Systems for Process Control
    "RESCU"
    "FALCON"
    "ONSPEC Superintendent"
    "PICON"
    Self-Tuning Controllers
SUMMARY OF THE INVENTION
BRIEF DESCRIPTION OF THE DRAWING
DESCRIPTION OF THE PREFERRED EMBODIMENTS
  General Organization of Hardware and Procedures
    Process Context
    Historical Process Database
  Supervisor and Build-Supervisor Procedure
    Base Cycle Procedure
      Sample Source Code
    Build-Supervisor Procedure
      Top-Level Menu
      Data Source Specification
      Block Timing Information
      Primary Block Switching
      Secondary Block Switching
      Block Description Fields
      Action Logging
      Block Status
    Feedback Blocks
      Parameters
      Block Operation
      Data passed to the user routine
      Sample Source Code
    Feedforward Block
      Parameters
      Block Operation
      Data passed to the user routine
        Sample Source Code
    Statistical Filtering Blocks
      Parameters
      Block Operation
        Sample Source Code
    User-Defined Program Block
      Parameters
      Block Operation
      Build-User-Program Procedure
    Block-handling Utilities
      Monitoring
      Block Initialization
  Build-Expert and Expert Procedures
    Preferred Menu Structure
    Standardized Data Interface
    Constructing the Expert System
      Sample Expert System
    Expert Rule Structure
      Retrieval Rules
      Analysis Rules
      Action Rules
    Generating the Expert Procedure
      Generating Source Code
        Sample Source Code
Claims A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

CROSS-REFERENCE TO OTHER APPLICATIONS

The following applications of common assignee contain some common disclosure, and are believed to have effective filing dates identical with that of the present application:

EXPERT SYSTEM WITH NATURAL-LANGUAGE RULE UPDATING (filed Sept. 30, 1987: Ser. No. 103,050);

EXPERT SYSTEM WITH THREE CLASSES OF RULES (filed Sept. 30, 1987: Ser. No. 102,832);

PROCESS CONTROL SYSTEM WITH RECONFIGURABLE EXPERT RULES AND CONTROL MODULES (filed Sept. 30, 1987: Ser. No. 103,014);

PROCESS CONTROL SYSTEM WITH ACTION LOGGING (filed Sept. 30, 1987: Ser. No. 103,118);

and PROCESS CONTROL SYSTEM WITH ON-LINE RECONFIGURABLE MODULES (filed Sept. 30, 1987: Ser. No. 103,047).

BACKGROUND OF THE INVENTION

1. Field of the Invention

The present invention relates to expert systems (also known as knowledge-based systems), to process control systems, and to hybrids thereof.

2. Discussion of Related Art

Various known teachings which are believed to be related to various ones of the innovations disclosed in the present application will now be discussed. However, applicant specifically notes that not every idea discussed in this section is necessarily prior art. For example, the characterizations of the particular patents and publications discussed may relate them to inventive concepts in a way which is itself based on knowledge of some of the inventive concepts. Moreover, the following discussion attempt to fairly present various suggested technical alternatives (to the best of applicant's knowledge), even though the teachings of some of those technical alternatives may not be "prior art" under the patent laws of the United States or of other countries. Similarly, the Summary of the Invention section of the present application may contain some discussion of prior art teachings, interspersed with discussion of generally applicable innovative teachings and/or specific discussion of the best mode as presently contemplated, and applicant specifically notes that statements made in the Summary section do not necessarily delimit the various inventions claimed in the present application or in related applications.

Process Control Generally

To compete in global markets, manufacturers must continually improve the quality and cost of manufacture of their products. They must do this in the face of changing market needs, changing raw materials costs, and reduced staffing. Automatic computer control of the manufacturing process can play an important part in this, especially in the chemical process industry. Most process plants already have the basic automatic regulating controls (low level controls) needed to control the plant at a given operating point. These provide the foundation for higher level supervisory controls (referred to here as supervisor procedures or supervisors) that seek to improve quality, reduce cost, and increase plant uptime by moving the plant to a different operating point. These changes can be made directly via the lower level controls, or indirectly via the plant operator.

Although supervisory controls have been in use for years, they have lacked a number of desirable features. To best improve quality and cost, a supervisor procedure should:

help control the quality of the end product;
reduce the cost of operating the plant;
help avoid unnecessary upsets or shutdowns;
work effectively with plant operators;
act in concert with standard operating procedures; and
be supportable by plant operating and support people.

To measure quality, a supervisor procedure should ideally have access to measurements of the basic properties of the product which affect its value and usefulness to the customer. Since most product properties measurements are sampled (and are measured in a laboratory), the supervisor should have access to a historical process database which can store these measurements as well the basic process data from the lower level control systems. Since sampled measurements and the process itself normally include some components of random variation, the supervisor should include statistical tests which can determine if a sequence of sampled measurements is varying normally around its aim value (i.e. is "on aim"), or has shifted significantly from aim (is "off aim").

To control quality, a supervisor procedure should have the capability to change the operating point of the process (via the lower level controls) when a measured property goes off aim. It should have the ability to act in response to new data or statistical tests, or to act at regular time intervals. It should also be able to preemptively change the operating point when basic conditions (such as plant production rate) change. It should allow a number of independent control objectives, and new ones should be easy to add. Since the process may use any number of different low level controllers, the supervisor should be able to communicate with all of them.

To work effectively with plant operators, a supervisor procedure should be understandable. It should carry out its control actions in a way that is natural and understandable to operators. It should provide enough information about its current state and its past actions for the operator to judge its performance. It should inform the operator when it acts (or chooses not to act), explaining how much action was taken, where it was taken, why it was done, and what effect it might have. Since the effect of actions taken to control quality and reduce cost can last longer than a single shift, it should provide a record of all its actions.

To act appropriately under all circumstances, to reduce operating costs in a way consistent with quality, to help avoid unnecessary upsets and shutdowns, and to take operating procedures into account, a supervisor should ideally include the logical decision making capabilities of expert systems. Because decisions will normally focus on a specific task or area, many independent expert systems should be allowed. The expert systems should have access to the many sources of process measurements, laboratory measurements, and control system parameters. They should be able to reason symbolically using that information, and to make their decisions take effect through communication and control actions. To work effectively, the supervisor should be able to control its expert system functions in concert with its other functions.

To be supported by plant personnel, the supervisor should be easy to use. It should allow common control actions to be set up easily, with a means of customizing less common functions. It should allow control actions to be changed easily. It should have a simple means of specifying the informative messages to be generated about it actions. Its expert systems should allow process knowledge to be entered, stored, and updated in a way that plant support people understand. It should provide a simple, appropriate knowledge representation which naturally includes data retrieval, symbolic reasoning, and effective means of implementing decisions in the plant. The knowledge structure should allow any authorized plant expert to enter knowledge, without restricting access to those who know computer languages or have memorized special rule structures.

The present invention addresses many of these concerns.

Normally supervisory control has been thought of separately from another higher level of control called optimizing control which seeks to minimize operating cost. In some cases, the requirement to minimize variation in product properties (i.e. to improve product quality) is absolutely primary, so that cost optimization only be performed as an objective secondary to quality objectives. In this environment, use of classical optimization techniques to achieve cost optimization may not be possible. In other cases, it has been possible to integrate a balance of supervisory and optimizing control into the supervisor.

Modularity

Supervisory control systems using a modular structure are well known. For example, the Process Monitoring and Control-1000 (PMC-1000) control package marketed by Hewlett Packard is a modular control package which can function as a supervisory control system. PMC modules, called blocks, perform alarming and limiting, proportional/integral/derivative control, trending, driving an electrical output, running programs, and other functions. Each block writes one or more output values into memory. To build PMC control structures, the user creates as many blocks as needed and links them to other block output values. A new runnable system must then be generated. Once the system is running, parameters such as gain constants can be changed, but the linking of blocks is fixed. PMC runs on a base time cycle, and blocks can only be scheduled to execute at multiples of the base cycle time. Although PMC maintains a historical database, it cannot be used for control, and does not effectively store intermittently sampled data. It is believed that there is no maximum number of blocks.

It is believed that some earlier discussion of the significance of modularity in process control software is found in Watson, "Process Control Using Modular Package Software," IEE Conference Publications number 102 (1973) (which is hereby incorporated by reference).

Historical Process Database

A database of historical process data is generally described in Hale and Sellars, "Historical Data Recording for Process Computers," 77 Chem. Eng'g Progress 38 (1981) (which is hereby incorporated by reference).

Continuous Control Actions

In classical feedback and feedforward control, the prior art teaches that the best control results are achieved by making continuous changes to the process. In computer control, where cyclic operation forces changes to be made in discrete steps, many small, frequent steps are conventionally preferred. While in principle this gives the best possible control performance, such control actions are very difficult to visualize. In fact, it may be impossible to determine what actions have been taken by what control strategies, and how long the control strategies have been making changes. This makes it very difficult to judge whether control strategies are working properly, or even if they are working at all. This method of control also runs counter to the methods used by operators, who generally make a few significant changes and wait to see the effects.

In feedback control, the use of a deadband is a well know way of avoiding small actions caused by a noisy measurement. (That is, if the control variable falls within a specified deadband of values surrounding the goal value, the control value will not be manipulated.) This deadband, as is well known, helps to avoid instability in control systems. Statistical process control also tends to reduce the number of feedback control actions. However, neither technique is sufficient to make all control actions understandable, since some actions will not be considered noisy.

The use of a feedforward relation among control variables is also well know among those skilled in the art of process control. That is, in some cases, whenever one variable changes (e.g. if a particular control variable is manipulated for any reason), another variable will also be manipulated according to a predetermined relationship. For example, in a distillation process, it may be desirable to immediately decrease the heat input whenever the rate of feed of the crude feed stock is decreased. In feedforward control, a deadband is normally not used.

Control of Multiple Manipulated Variables

In many process control applications, several manipulated variables must be jointly controlled in a single control loop (e.g. in some relation to a single measured variable). A special (and very common) case of this is seen in many situations where a single manipulated variable can normally be used, but alternate manipulated variables should be used instead if the first-choice manipulated variable becomes constrained. When human operators optimally handle problems of this kind, their choice of which output to change will often be made heuristically, based on cost, quality, response dynamics, and process stability.

"Decoupling" is a conventional way of reducing multi-input multi-output problems to sets of single-input single-output problems. In decoupling, it is usually assumed that all of the manipulated variables should be changed.

A different but related problem arises when a number of manipulated variables ("knobs") can be changed to respond to a single measured variable. Operators often use a heuristic approach in choosing which knob (or knobs) to manipulate, and sometimes choose not to act. The heuristic approach may consider cost, quality, response dynamics, and process stability. It may include alternate knobs to be used when all of the preferred knobs are constrained. Classic control methods are not well suited to this approach.

Expert Systems Generally

The term "expert system" is used in the present application (in accordance with what is believed to be the general usage at present) to refer to a system which includes non-trivial amounts of knowledge about an underlying problem. Almost any control system which has been customized for a particular application might be argued to embody small amounts of relevant knowledge in its very structure, but the term expert system is generally used only for systems which contain enough accessible information that they can usefully supplement the knowledge of at least some (but normally not all) human users who must deal with problems of the type addressed. Expert systems at their best may serve to codify the expert knowledge of one person (a "domain expert"), so that that person's expertise can be distributed and made accessible to many less expert users who must address problems of a certain type. Some well-known successful examples include a medical diagnostic program (MYCIN) and a diagnostic program which assists mechanics working on diesel engines.

As these examples show, one very common area of application for expert systems has been fault diagnosis. Many other areas of application have been recognized; see generally *Expert Systems* (ed. R. Forsythe 1984) (which is hereby incorporated by reference); P. Harmon and D. King, *Expert Systems* (1985) (which is hereby incorporated by reference); and Donald Waterman, *A Guide to Expert Systems* (1984) (which is hereby incorporated by reference).

Knowledge Input and Updating

One of the very general problems in the area of expert systems is how knowledge is to be gotten into an expert system in the first place. That is, specialists in artificial intelligence often assume that a "knowledge engineer" (that is, a person who is experienced and competent in the specialized computer languages and software commonly used for artificial intelligence applications) will interview a "domain expert" (that is, a person who actually has expert knowledge of the type of problems which the expert system is desired to be able to address) to extract his expertise and program an expert system accordingly. However, there are some very important drawbacks to this prradigm. First, competent "knowledge engineers" are not readily available. In particular, the requirements of maintaining a real-world application (such as an expert system for chemical process control, as in the preferred embodiments disclosed below) are such that it is dangerous to rely on a sufficient supply of "knowledge engineers" to go through the iterations necessary to not only input the knowledge base reliably, but also maintain the software base once it is created.

The rapidly developing art of software engineering has shown that one of the key requirements for a large software system is that it be maintainable. Thus, for example, the software system must be set up so that, after the technologist who first puts together an expert system is gone, it can be maintained, modified, and updated as necessary by his successors.

Thus, one key problem in the area of expert systems is the problem of maintenance and updating. Especially in more complex real-world applications, it is necessary that a large software structure, such as that required for a sophisticated expert system, be maintainable. For example, in an expert control system, control strategies may be modified, new control strategies may be introduced, sensor and/or actuator types and/or locations may be changed, and the economic factors relevant to cost versus throughput versus purity tradeoffs may change. Normally, expert systems attempt to maintain some degree of maintainability by keeping the inference rules which the processor executes separate from the software structure for the processor itself. However, this normally tends to lead to a larger software structure which operates more slowly.

Specialists in expert systems also commonly assume that expert systems must be built in a symbolic processing environment, e.g. in environments using LISP or PROLOG. Even for complex processes, a single large knowledge base is usually assumed. The program which processes the knowledge therefore requires complex procedures for processing the knowledge base, and these are typically coded separately from the knowledge. This leads to large software structures which execute slowly on conventional computers. Specialized "LISP machines" are commonly recommended to speed up the inference process.

Expert System Knowledge Structures

Published material regarding knowledge based systems (expert systems) has proposed several classifications for the types of rules which are to be used. For example, U.S. Pat. No. 4,658,370 to Erman et al., which is hereby incorporated by reference, describes "a tool.. for building and interpreting a knowledge base having separate portions encoding control knowledge, factual knowledge, and judgmental rules." (Abstract) The method described in this patent still appears to rely on the availability of a "knowledge engineer." This patent appears to focus on the application of an expert system as a consultation driver for extracting the relevant items of knowledge from a human observer. Knowledge is separated into factual knowledge such as classes, attributes, allowed values, etc., which describe the objects in the domain; judgmental knowledge, which describes the domain (and its objects) in the form of rules; and control knowledge describing the problem solving process to be used by the inference procedure in processing the knowledge. (The control knowledge has nothing to do with control of an external process.) This knowledge structure is designed to make the task of knowledge engineering easier, and to make the knowledge system and its reasoning during a consultation easier to understand. The knowledge base is written in a specialized programming language. This is a very powerful structure, which requires a very high skill level.

Expert system development tools which are designed to make the input of knowledge easier have been developed. U.S. Pat. No. 4,648,044 to Hardy, et al., describes "a tool for building a knowledge system.. [which] includes a knowledge base in an easily understood English-like language expressing facts, rules, and meta-facts for specifying how the rules are to be applied to solve a specific problem". (Abstract). Although this tool is not as complex as some current expert systems tools, the knowledge must be entered in a rigidly structured format. The user must learn a specialized language before he can program the knowledge base. Despite some simplification in the development process, a fairly high skill level is still required.

Expert Systems for Process Control

Chemical processing plants are so complex that few people develop expertise except in limited areas of the process. Plants run around the clock, production rates on a single line are very high, and startup is usually long and costly, so improper operation can be very costly. It has also been fund that, in a complex chemical processing plant, some operators can achieve substantially higher efficiencies than others, and it would be advantageous if the skill level of the best operators could be made generally available. Expert systems promise significant benefits in real-time analysis and control by making scarce expertise more widely available. However, application of expert systems in this area has not progressed as far as it has in interactive, consultative uses.

Integration of expert system software with process control software poses special problems:

First, there is the problem of how the software structure for an expert system is to be combined with the software for a process control system. Several expert systems which have been suggested for process control have used an expert system as the top-level supervisor procedure for the control system.

Second, as discussed above, many process control strategies have difficulty with situations where there are multiple control parameters (inputs to the process) which could be manipulated. That is, for processes which have only one primary control parameter (as many do), the problem of what value to set for that control parameter is in significant ways a much simpler problem than the question of which one or ones of multiple control parameters should be addressed, and in which direction.

It should also be noted that the use of an expert system to design a new process (or to debug a newly introduced process) has significantly different features from the problem of optimally controlling an existing process. Similarly, while expert systems have also been applied to the automatic distribution of jobs to multiple workstations through an automated materials handling system (an example of this is the DISPATCHER Factory Control System developed by Carnegie Group Inc.), the queuing problems presented by the allocation of different types of materials in batches to many parallel assembly workstations making different products are quite different from the problems in continuously operating single line processes, particularly chemical processes.

"RESCU"

The system known as "RESCU" resulted from a collaborative demonstration project between British government and industry. See, e.g., Shaw, "RESCU online real-time artificial intelligence," 4 *Computer-Aided Engineering J.* 29 (1987) (which is hereby incorporated by reference); and the Digest of the IEE Colloquium on 'Real-Time Expert Systems in Process Control', held 29 Nov. 1985 at Salford, U.K. (which is hereby incorporated by reference). From available information, it appears that this is a real-time expert system which was developed to provide advice on quality control in an detergent plant. The system searches for a hypothesis about the plant which is supported by process data, and uses it as the basis for advice. This system also uses a single knowledge base for the entire plant and thus requires complex inference control methods.

"Falcon"

"Falcon" is a fault diagnosis system for a chemical reactor, which monitors up to 30 process measurements and seeks to identify a set of up to 25 failures in the process. This was developed as a demonstration project between DuPont, the Foxboro Company, and the University of Delaware, and is described, for example, in D. Rowan, "Using an Expert System for Fault Diagnosis," in the February 1987 issue of *Control Engineering,* which is hereby incorporated by reference. See also "Troubleshooting Comes On Line in the CPI" in the Oct. 13, 1986, issue of *Chemical Engineering* at page 14, which is hereby incorporated by reference. This system required several man years of development, and because it is programmed in LISP, it has proven difficult to maintain the knowledge base through process changes.

"ONSPEC Superintendent"

The "ONSPEC Superintendent" (TM), marketed by Heuristics Inc., is a real-time expert systems package which monitors data from the ONSPEC (TM) control system. See Manoff, "On-Line Process Simulation Techniques in Industrial Control including Parameter Identification and Estimation Techniques," in *Proceedings of the Eleventh Annual Advanced Control Conference* (1985) (which is hereby incorporated by reference); and Manoff, "Control Software Comes to Personal Computers," at page 66 of the March 1984 issue of *Control Engineering* (which is hereby incorporated by reference). The "Superintendent" monitors for conformance with safety and control procedures and documents exceptions. It can also notify operators, generate reports, and cause control outputs.

"PICON"

The PICON (TM) system, which was marketed by Lisp Machines, Inc. (LMI), was apparently primarily intended for real-time analysis of upset or emergency conditions in chemical processes. It can monitor up to 20,000 input process measurements or alarms from a distributed control system. It uses a single knowledge base (e.g. containing thousands of rules) for an entire process. To handle such a large number of rules, it runs on a LISP computer and includes complex inference control methods. PICON must be customized by a LISP programmer before the knowledge base can be entered. The domain expert then enters knowledge through a combination of graphics icons and Lisp-like rule constructions. See, for example, L. Hawkinson et al., "A Real-Time Expert System for Process Control," in *Artificial Intelligence Applications in Chemistry* (American Chemical Society 1986), which is hereby incorporated by reference, and the R. Moore et al. article in the May 1985 issue of *InTech* at page 55, which is hereby incorporated by reference.

Self-tuning Controllers

Another development which should be distinguished is work related to so-called "self-tuning controllers." Self-tuning single- and multiple-loop controllers contain real-time expert systems which analyze the performance of the controller (See "Process Controllers Don Expert Guises", in Chemical Eng'g, June 24, 1985). These expert systems adjust the tuning parameters of the controller. They affect only low-level parts of the system, and use a fixed rule base embedded in a microprocessor.

SUMMARY OF THE INVENTION

In this section various ones of the innovative teachings presented in the present application will now be discussed, and some of their respective advantages described. Of course, not all of the discussions in this section define necessary features of the invention (or inventions), for at least the following reasons: (1) various parts of the following discussion will relate to some (but not all) classes of novel embodiments disclosed; (2) various parts of the following discussion will relate to innovative teachings disclosed but not claimed in this specific application as filed; (3) various parts of the following discussion will relate specifically to the "best mode contemplated by the inventor of carrying out his invention" (as expressly required by the patent laws of the United States), and will therefore discuss features which are particularly related to this subclass of embodiments, and are not necessary parts of the claimed invention; and (4) the following discussion is generally quite heuristic, and therefore focusses on particular points without explicitly distinguishing between the features and advantages of particular subclasses of embodiments and those inherent in the invention generally.

Various novel embodiments described in the present application provide significant and independent innovations in several areas, including:

systems and methods for translating a domain expert's knowledge into an expert system without using a knowledge engineer;

software structures and methods for operating a sophisticated control system while also exploiting expert system capabilities;

generally applicable methods for controlling a continuous process; and innovations, applicable to expert systems generally, which help provide highly maintainable and user-friendly experts.

Various classes of embodiments described herein provide a process control system, wherein a process which operates substantially continuously is controlled by a system which includes (in addition to a process control system which is closely coupled to the underlying process and which operates fairly close to real time, i.e. which has a maximum response time less than the minimum response time which would normally be necessary to stably control the underlying process) at least some of the following features:

(1) A supervisor procedure, which has a modular structure, and retrieves process measurements from the process control system (or other process data collection systems), passes control parameters to the process control system, and communicates with people. Preferably, the supervisor includes the capability for statistical process control. The supervisor preferably runs on a computer system separate from the process control system.

(2) The supervisor procedure can preferably call on one or more expert system procedures as subroutines. This is particularly useful in control applications where there are multiple possible manipulated variables, since the expert system(s) can specify which manipulated variable (or variables) is to be adjusted to achieve the end result change desired, and the supervisor system can then address simpler one-dimensional control problems.

(3) Preferably, at least some users can call on a build-supervisor procedure which permits them to define or redefine modules of the supervisor procedure by editing highly constrained templates. The templates use a standardized data interface (as seen by the user), which facilitates the use in control actions of data from a wide variety of systems. The templates in the available template set preferably contains highly constrained portions (which are optimized for the most common functions), and pointers to functions which can be customized by the user.

(4) Preferably, the build-supervisor user can also call on a build-user program procedure, which allows fully customized control functions to be programmed by sophisticated users. The build-user program procedure can also be used to create customized message generation functions. These can be used to generate messages describing the actions of the supervisor, and also to call other sub-procedures, such as the expert procedures.

(5) Preferably at least some users are also permitted to call on a build-expert procedure which can be used to construct an expert system. Knowledge is specified by user input to a set of highly constrained, substantially natural language templates. The templates use a standardized data interface (as seen by the user), which facilitates the use in the expert system of data from a wide variety of systems. The completed templates can then be compiled to produce a runnable expert system. Preferably, the user can also retrieve, examine, and modify the input from previously specified templates. Thus, an expert system can be modified by recalling the templates which specified the current expert system, modifying them, and recompiling to generate a new runnable expert.

(6) A historical process database advantageously standardizes the access to current and historical process data by the supervisor and expert procedures. This is particularly useful for collecting the results of laboratory characterizations over time of the underlying process.

Control of Continuous Processes

The goals in management of a substantially continuous process include the following:

(1) Maximizing quality: In the chemical process industry, it is important to reduce variation in measured properties of the product, and to control the average measured properties at specified aim values.

(2) Minimization of cost of manufacture: The process must be operated in a way hat efficiently uses energy and feedstocks without compromising quality objectives. Upsets and inadvertent process shutdowns, which adversely affect quality and production rate, and reduce the total utility (fractional uptime) of the plant, are all costly and must be avoided.

Control of Multiple Manipulated Variables

As noted above, in many process control applications, several manipulated variables must be jointly controlled in a single control loop (e.g. in some relation to a single measured variable). A special (and very common) case of this is seen in many situations where a single manipulated variable can normally be used, but alternate manipulated variables should be used instead if the first-choice manipulated variable becomes constrained. When human operators optimally handle problems of this kind, their choice of which output to change will often be made heuristically, based on cost, quality, response dynamics, and process stability.

One novel approach to this problem (which is used in several of the preferred embodiments below) is to decompose the multiple-variable problem into a set of single-variable problems. An expert procedure is used to decide which control parameter(s) to adjust, and one or more from a set of single-input single-output procedures are used to make the adjustment(s). Not only does this facilitate quality, cost, and plant operability objectives, but it results in control strategies which act properly over a much wider range of conditions. Correct actions are taken, where conventional control methods would make no action or wrong actions. This improves the usefulness of the control strategy to the operator, and leads to higher use of the controls.

The various novel ideas described below are particularly advantageous in such multiple control parameter problems. In the presently preferred embodiment discussed below, a dimethyl terephthalate process (DMT) process is presented as an actual example to show the advantages achieved by the various novel ideas disclosed in this context.

Discrete Control Actions

As mentioned above, control systems that continuously change manipulated parameters are very difficult to monitor. Since operators depend on the supervisor procedure to maintain important product properties and process operating conditions, it is important that they be able to understand and judge supervisor performance. By restricting supervisor changes to a reasonably small number of significant discrete actions, supervisor performance becomes much more understandable.

One novel teaching stated in the present application is an integrated system for process control in which a process supervisor procedure (which is preferably the top level procedure) defines parameters for one or more control systems (or control procedures). The supervisor procedure changes control parameters only in discrete actions, and the thresholds for the decision to act are preferably made large enough (for each control parameter) that every action must be a significant change.

A related novel teaching herein is that every control action taken by the supervisor should be reported out to plant personnel in a substantially natural language message. Preferably, instances where action would be desirable but is not possible (because of constraints or other unusual circumstances) should also be reported. Preferably, a cumulative record of the messages is kept, and is available for review by operators and plant support people. Preferably, the message should report the time, amount, location, and reason for each action. Other relevant information, such as the time stamp of relevant sampled data, and the nature of statistical deviations from aim should preferably be included as well. Since every action is significant, and the number of actions is reduced, the cumulative record provides a meaningful record of supervisor performance.

This is particularly advantageous for systems where some of the relevant time constants are so slow that dynamic process responses last several hours (or longer). A new operator coming on duty at a shift change can use the cumulative record to judge what effects to expect from supervisor actions on the previous shift.

The use of a deadband in feedforward action is one novel means that is advantageously used to discretize supervisor actions. Feedforward action is taken only when the measured value changes by more than the deadband from its value at the last action. This generates a series of discrete changes in the manipulated variable, which can be effectively logged and evaluated by operators.

Statistical filtering of discretely measured values also serves to reduce control actions to a few significant changes. Statistical tests, as is well known, distinguish normal variation around the average from significant deviations from the average. In most cases, a number of measurements will be needed to indicate a deviation. By only acting on statistical deviations, relatively few, but significant, actions will result.

Expert Systems for Process Control

A general problem with expert systems is how the expert system software is to be integrated with process control software. Several expert systems which have been suggested for process control have used an expert system as the top-level supervisor procedure for the control system. However, several of the novel embodiments disclosed herein achieve substantial advantages by departing from this conventional structure. For one thing, if the expert system is the top level procedure, then it becomes more difficult to accommodate more than one expert in the system (or, to put this another way, the potential modularity of the expert system cannot be fully exploited). Thus, one significant advantage of several of the novel embodiments disclosed here is that use of more than one expert system within a single integrated system becomes much more advantageous.

Types of Process Control Systems

It should also be noted that the use of an expert system to design a new process (or to debug a newly introduced process) has significantly different features from the problem of optimally controlling an existing process. While various ones of the novel ideas disclosed herein may have significant applications to such problems as well, the presently preferred embodiment is especially directed to the problem of optimally controlling an existing operating process, and the various novel ideas disclosed herein have particular advantages in this context.

A significant realization underlying several of the innovations disclosed in the present application is that the structure of expert systems for process control applications can advantageously be significantly different from that of other expert system problems (such as consultative expert systems problems, in which a human is queried for information). The Hardy et al. and Erman et al. patents illustrate this difference. Consultative expert systems seek to substantiate one of a number of possible causes by interactively querying the user about the symptoms. Such systems must use complex knowledge representations and inference methods to minimize the number of user queries by carefully selecting the information they solicit. Moreover, since the user is not an expert, the system should be able to explain why it is requesting information.

In contrast, the real-time process problem is much simpler. The information needed by the expert is typically in the form of process measurements, which can be rapidly retrieved from process control and data systems without human intervention. There is much less need to minimize the requests for information. In fact, it may be faster to retrieve all the data that could be relevant to the problem than to determine what data is relevant. Moreover, since the experts will run automatically, there is no need to explain the reasoning during the inference process. As long as the rulebase is not too large, the process control expert can operate effectively using a simple "forward chaining" (or data driven) inference method. There is no need for the complex "backward chaining" procedures used in the consultative systems. Moreover, if a number of modular expert subprocedures are used within a single process, each expert tends to be smaller, and is more likely to work effectively in forward chaining mode. The presently preferred embodiment is especially directed to process control and monitoring, and the novel ideas disclosed herein have particular advantages in this context. However, various ones of the novel ideas may have significant applications to other problems as well.

It is believed to be a significant innovation to use expert system techniques to point to the direction of action in a multi-parameter control problem, as discussed above. One advantage is that the use of the expert permits more cases to be handled; for example, when one control parameter is up against its limits, the expert system can specify another parameter to be changed. The expert can also be especially advantageous in preventing a wrong action from being taken: in some types of processes it is conceivable that erroneous control strategies could potentially cause property damage or injuries, and the natural language inference rules of the expert (possibly combined with a more quantitative optimization scheme) can usefully ensure that this cannot happen. Thus, one advantage of various of the process control expert system embodiments disclosed in the present application is that they facilitate reliable implementation of a control strategy which (primarily) prevents a clearly wrong action from being taken, and (secondarily) permits minimizing costs.

In particular, it is especially advantageous to use a knowledge based (functional) structure where the rules are constrained to be of the three types described in the context of a process control application. The retrieval rules permit the predominantly quantitative sensor data (and other input data) to be translated into a format which is suitable for expert system application, and the control rules provide a translation back from expert system reasoning into an output which matches the constraints of the control problem.

The present invention is particularly advantageous in controlling processes which are substantially continuous, as distinguished from job shop processes. That is, while some computer-integrated manufacturing systems focus primarily on issues of queuing, throughput, statistical sampling of workpieces for inspection, etc., substantially continuous processes (such as bulk chemical synthesis and/or refining processes) typically demand more attention to issues of controlling continuous flows.

Expert Systems Generally

The present application contains many teachings which solve specific problems and offer corresponding advantages in the sub-class of expert systems used for process control, or even the sub-sub-class of expert systems used for control of substantially continuous processes. However, the present application also discloses many novel features which could be adopted into many other types of expert systems, and/or into many other types of control applications, while still retaining many (if not all) of the advantages obtained in the context of the presently contemplated best mode.

Similarly, while the present application describes numerous novel features which are particularly applicable to rule-based forward-chaining expert systems, some of the innovations described herein are believed to be very broadly novel, and could be adapted for use with other types of expert systems too.

Natural-Language Rule Statements

One of the innovative teachings in the present application provides an expert system tool in which knowledge is entered into the knowledge base through a limited set of pre-defined, highly constrained, natural-language knowledge structures which are presented as templates. In typical previous expert systems, knowledge is coded in the strict syntactical format of a rule or computer language, which allows great flexibility in knowledge representation. The person entering the knowledge (hereafter referred to as the developer) must learn the syntax, must choose an appropriate knowledge representations, and must formulate syntactically correct input.

In contrast, by restricting the developer to constrained, pre-defined structures, the need to learn rule or language syntax and structure is eliminated. Moreover, if the number of such pre-defined knowledge structures is small enough, the total knowledge representation in the expert system can be easily understood. Thus, a knowledge engineer is not needed. The domain expert can enter the knowledge to build an expert system directly. The developer's input can then be translated automatically into an operational expert system. The developer need not be concerned with or aware of the specific language or system used to implement the expert.

Another innovative teaching is that the knowledge entered into the pre-defined natural-language structures is stored in substantially natural-language form. This permits the knowledge to be revised at any time in the form in which it was originally entered: the developer simply recalls the stored template information, modifies it and stores the modified knowledge. This is also simple enough to be done by the domain expert. The modified knowledge can then be automatically translated into a modified operational expert.

Another significant advantage of several of the disclosed novel embodiments for creating an expert system is that the expert can be significantly more compact and faster in execution. This is achieved by integrating the expert system's rules with the code which performs the inference function. This allows many independent runnable expert systems to be created. Moreover, the ease and simplicity of knowledge updating can still be preserved by maintaining the natural language form of the knowledge. The knowledge base can easily be reviewed and modified without hindrance from the specific inference method used in the runnable system.

Another novel feature of several of the disclosed embodiments is the use of a standardized data interface (as seen by the user) in the knowledge templates, which facilitates the use in the knowledge base of data from a wide variety of systems. Expert systems are allowed to require data from process or laboratory measurements (both current and historical), or data collected from other sources (such as on-line analyzers), or data and parameters from the process control systems. A standard interface to all such data sources facilitates use of the data in expert systems, since domain experts usually lack the programming expertise that would otherwise be needed to access these data sources.

Expert System Rule Types

As mentioned above, previous expert systems tools normally use a rule or computer language which allows great flexibility in knowledge representation. One innovative teaching in the present application is the restriction of the knowledge structure within an expert system to rules of three highly constrained types. The three rule types are: (1) retrieval rules, which each assign one of several descriptors to a name in accordance with the values of numeric inputs; (2) analysis rules, which each can assign a descriptor to a name in accordance with tee descriptor/name assignments made by other rules; and (3) action rules, which either execute or don't execute a command in accordance with the descriptor/name assignments made by other rules.

Preferably only the retrieval rules include numeric operations. Preferably only the action rules can enable execution of an external command (i.e. of a command which does not merely affect the operation of the expert procedure). Preferably each of the action rules requires only a logical test for the assignment of a descriptor to a name. Preferably none of the action rules can assign a descriptor to a name.

While this organization of an expert system's structure is especially advantageous in the context of a process control expert system, it can also be applied to other types of expert systems. In a process control system, the relevant inputs will normally be process data, laboratory data, or control system parameters. The relevant outputs will normally be executable procedures which affect the operation of control or supervisor systems, or communicate with operators or domain experts. This teaching could also be applied to expert systems generally, in which other input and output functions are more important.

For example, in consultative use, retrieval rules need not be confined to numeric inputs, but could accept the natural language descriptor/name assignments as input from the user. To better control the requests for input, such consultative retrieval rules could advantageously execute contingent upon a test for the previous assignment of a descriptor to a name.

In general, this structuring of the inference rules provides for a more understandable expert. The retrieval rules provide access to process and control system data, and translate from quantitative input data into a natural language form. The emulation of natural-language reasoning is concentrated as much as possible in the analysis rules, which capture knowledge in a form which might be used to communicate between domain experts. The action rules translate from the natural language inference process back to output procedures which are meaningful in the computer and control system being used.

Modular Organization

The organization preferably used for process control has substantial advantages. The top level procedure is a modular process supervisory controller. The supervisor modules allow flexible specification of timing and coordination with other modules. Modules carry out commonly used control functions, using data specified through a standard data interface, as well as calling user customized functions. User customized functions might generate messages, perform unusual control actions, or call expert system procedures. Using the build-supervisor procedure, users can define or redefine modules by editing highly constrained templates which include a standard data interface specification. The standardized data interface (as seen by the user) facilitates communications with an extremely wide variety of systems. Dynamic revision is achieved by storing the user input to the constrained templates as data in a storage area accessible to both the supervisor and build-supervisor procedures. The running supervisor examines the stored data to determine which functions have been specified for that module, and what data sources have been specified through the standard data interface. The supervisor then calls an appropriate modular function and passes the user-specified data.

This organization is especially advantageous in providing parallelism and branching in control strategies. That is, the modular organization of the presently preferred embodiment permits at least the following capabilities:

(a) control strategies for more than one independent control application can be defined and updated;

(b) control strategies for more than one lower level process control system can be defined and updated;

(c) alternative control strategies can be defined an stored, so that an expert system (or other software or ser command) can switch or select between control strategies merely by selecting or "de-selecting" modules;

(d) timing and coordination of module functions is facilitated;

(e) multiple independent expert system procedures can be utilized within a single supervisor;

(f) more than one user can define control strategies by accessing different modules, simultaneously if desired.

Another innovative teaching herein is that each supervisor module (or, less preferably, less than all of the module types) should preferably contain a pointer to optional user-customized functions. These functions can be used to generate informative messages about module actions, or a sophisticated user can implement unusual or non-standard control functions, or other customization utilities (such as the build-expert procedure in the presently preferred embodiment) can be used to generate functions accessed in this manner.

This structure is "modular" in the sense that users can call up and modify the various blocks separately; but, as will be discussed below, the command procedures which perform the standardized block functions are not necessarily separate within the source code. That is, modularity is advantageously achieved by storing the template-constrained user inputs to each block as data; when the user wishes to modify the block, the data is translated back into corresponding fields in the template.

Preferably, one of the modular functions in the supervisor is statistical filtering. This is particularly useful in that statistical filtering can be introduced wherever it is advantageous, without requiring extensive custom programming by the users. As described above, statistical filtering is advantageous both for avoiding overreaction to insignificant changes, and also for aiding the understanding by plant operators by reducing the number of actions.

One of the novel teachings contained in the present application is that the use of statistical filtering helps to minimize the number of control parameter adjustments performed by the expert system, which in turn is very advantageous (as discussed below) in providing an understandable log of control actions taken.

Sequencing Modular Blocks

One innovative teaching herein is a system for process control having a modular supervisor procedure which includes novel module timing and sequencing methods. Users can preferably specify modules by editing highly constrained templates, which include several specifiers for methods to be used in controlling and coordinating module execution. Preferably the module timing options include: (1) execute module function at fixed time intervals; (2) execute module function when new data becomes available for a specified data source; (3) execute module function whenever another module executes; (4) execute module function only on programmatic request; and combinations of these. Preferably a standardized data interface is used to specify the data source for the second of these options.

Integration of Expert Procedures

The integration of expert systems into process control has been a challenging problem. Most previous attempts to use expert systems in process control have used LISP based expert systems running on a dedicate machine, often a symbolic processing machine. Usually only one expert system with a single large knowledge base is created for a process. Since the knowledge base could contain many rules, a complex knowledge representation and inference process are needed to make inferences fast enough for real-time use. The expert system typically runs independently, scheduling its own activities, and thus is effectively the "top level" procedure. Using a top level expert makes it more difficult to accommodate more than one expert system. (Another way to regard this area of advantage is to note that, without the inventions contained in the present application, the potential modularity of the expert system cannot be fully exploited.)

Several of the novel embodiments described herein achieve substantial advantages by using more than one expert system subprocedure within a single integrated system. Since expert decisions will normally focus on a specific task or area, the modularity of the problems can be exploited in the structure of the expert system. Also, if the experts run under control of the supervisor, it is much easier to coordinate the decisions of the expert systems with the control actions of the supervisor. Since many important uses of expert systems will affect control actions, this is an important factor.

Another advantage of a modular structure, where expert systems are included as independent procedures called by the supervisor, is that the overall process control system is more reliable. A badly or incompletely functioning expert system within an overall supervisor system will affect only the functions it specifically interacts with. However, the failure of a top level expert system, which controls timing and execution of control functions, could disable all supervisor functions. The modular structure also has significant advantages in maintenance and debugging.

Thus, the organization preferably used for process control has substantial advantages. The top level procedure is a cycling procedure which functions as a process control supervisor. The supervisor process can call on one or more expert system procedures, and the user can call on a build-expert procedure which can reconfigure one of the expert systems already present, or create a new expert system. The supervisor procedure can preferably also call on a historical data base.

The modular organization described is especially advantageous, as discussed above, in providing parallelism and branching in control strategies. This is especially advantageous in process control situations, since the appropriate strategies for different circumstances can be fully pre-defined by the user, and he can rapidly switch between pre-defined strategies as the need arises.

Historical Process Database

The use of a historical database of process data in combination with a process supervisor procedure and/or expert system procedure is particularly advantageous. In the presently preferred embodiment, a historical database is used which can provide a time-stamp with each piece of output data, to clearly indicate provenance, and can retrieve the stored data (for a given parameter) which bears the time-stamp closest to a given time. The historical database can preferably maintain a record of continuously measured process data (such as temperature, pressure, flow rate), as well as discretely sampled, time-delayed measurements, such as laboratory measurements. The database greatly facilitates the use of laboratory (or other sampled type) measurements. Because of the time delay in making laboratory measurements, the value of the measurement when it becomes available in the database will correspond to the continuously measured data for the instant at which the measurement sample was actually taken, which might be several hours in the past. The historical database allows time delayed measurements and their corresponding continuous measurements to be used together. This is advantageous for balancing component material flows in the process. In the presently preferred embodiment, the historical process database may be thought of as providing a way to "buffer" timestamped data and provide a standardized data interface, but it also permits other functions to be served.

The historical database also advantageously provides a basis for statistical tests. Some statistical tests will require a number of past measurements, which can be retrieved from the database. The database also advantageously allows the calculation of time average values of measurements. This can be useful in dampening noisy signals for use in a control action. In general, the database advantageously serves to buffer data input from a number of sources, standardizing access from the supervisor and expert procedures.

One of the innovative teaching in the present application is an integrated system for process control in which a process supervisor procedure (which is preferably the top-level procedure) is configured as a modular software structure, with modules which can be revised by a user at any time, without significantly interrupting the operation of the process supervisor. The supervisor can define control parameters for many process control procedures, and can retrieve data from many sources (preferably including a historical database of process data, which can provide time-stamped data). The supervisor can also call on various expert subprocedures. Preferably the expert subprocedures can also be modified by an authorized user at any time, by calling up and editing a set of natural-language rule templates which correspond to the rules being executed by the expert subprocedure.

One of the innovative teachings in the present application is an integrated system for process control in which the user can customize the process supervisor procedure with reference to a standardized data interface. The data values to be used by the supervisor are specified in the standard interface by two identifiers. The first identifies which (software system and type of value is desired. The value of a setpoint in a particular distributed control system, the value of a sensor measurement in a particular process monitoring system, the value of a constraint from a process control or supervisor system, and time averages of sensor measurements from a particular historical database are examples of this. The second identifier specifies which one of that type of value is desired, for example the loop number in the distributed control system.

Data values specified through the standard interface may be used as measured values, manipulated values, or as switch stats values indicating an on/off status. Preferably the interface allows the user to specify data in any of the relevant process control and data collection systems used for the process, or for related processes. Preferably, the interface also allows specification of data (both current and historical) in a historical process database. Since multiple control systems (or even multiple historical databases) may be relevant to the process, the standard interface greatly facilitates the use of relevant data from a wide variety of sources.

BRIEF DESCRIPTION OF THE DRAWING

The present invention will be described with reference to the accompanying drawings, wherein:

FIG. 3 shows the template used for a retrieval rule in the presently referred embodiment, together with a sample of a retrieval rule which has been entered into the template.

FIG. 4 shows an example of a different kind of retrieval rule, known as a calculation rule.

FIG. 5 shows an example of an analysis rule 220.

FIG. 6 shows the presently preferred embodiment of the template for action rules, and an example of one action rule which has been stated in tis format.

FIG. 9 shows a menu which, in the presently preferred embodiment, is presented to the user by the build-supervisor procedure 810 to select a template to provide user inputs to define or modify a block within the supervisor procedure.

FIGS. 10-13 show specific templates which, in the presently preferred embodiment, are presented to the user by the build-supervisor procedure to provide input to define or modify a feedback, feedforward, statistical filtering, or program block, respectively.

DESCRIPTION OF THE PREFERRED EMBODIMENTS

General Organization of Hardware and Procedures

Figure 1:
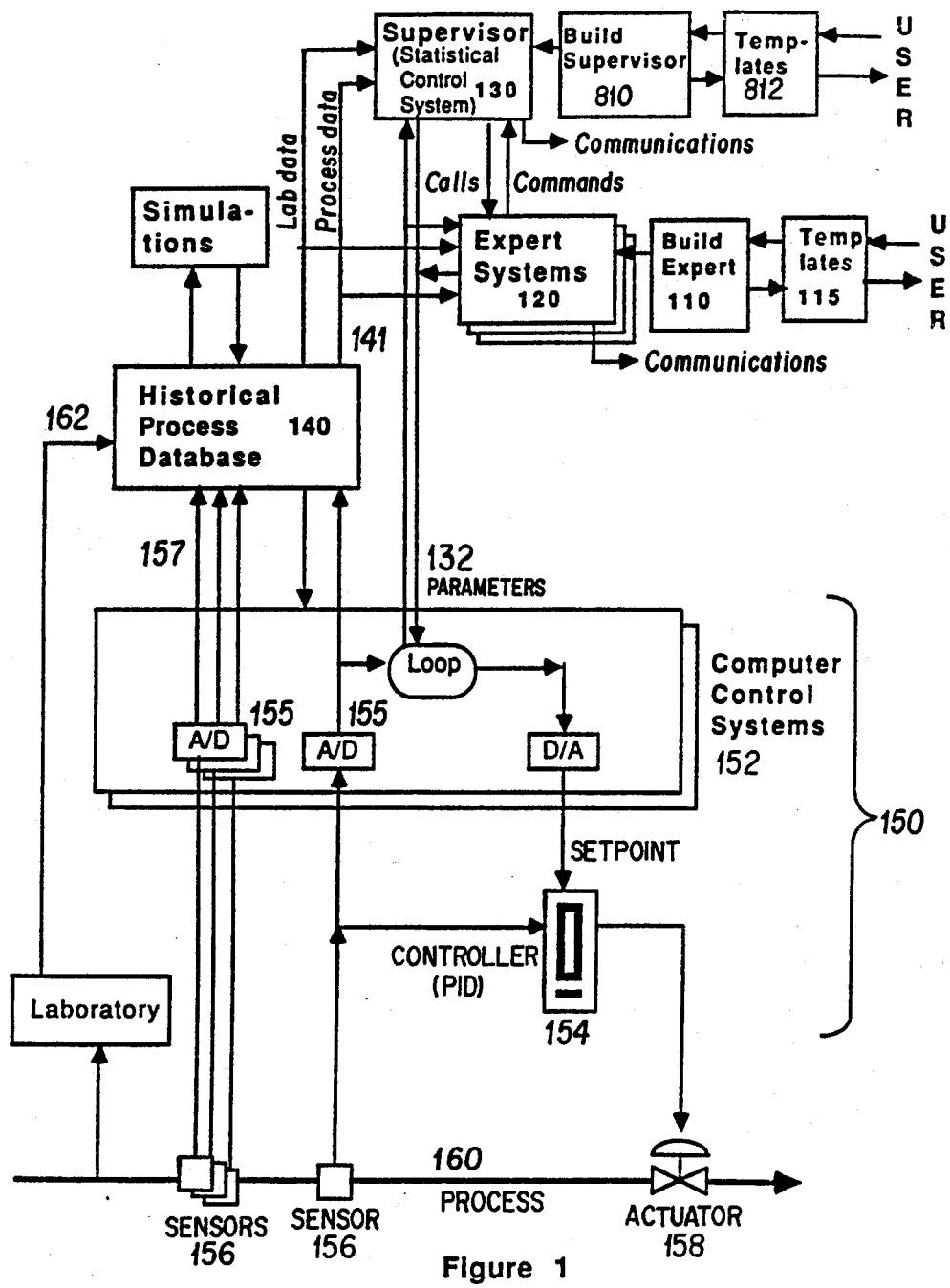
FIG. 1 schematically shows the structure of hardware and procedures preferably used to embody the novel process control system with expert system capabilities provided by various of the innovative features contained in the present application.
Figure 7:
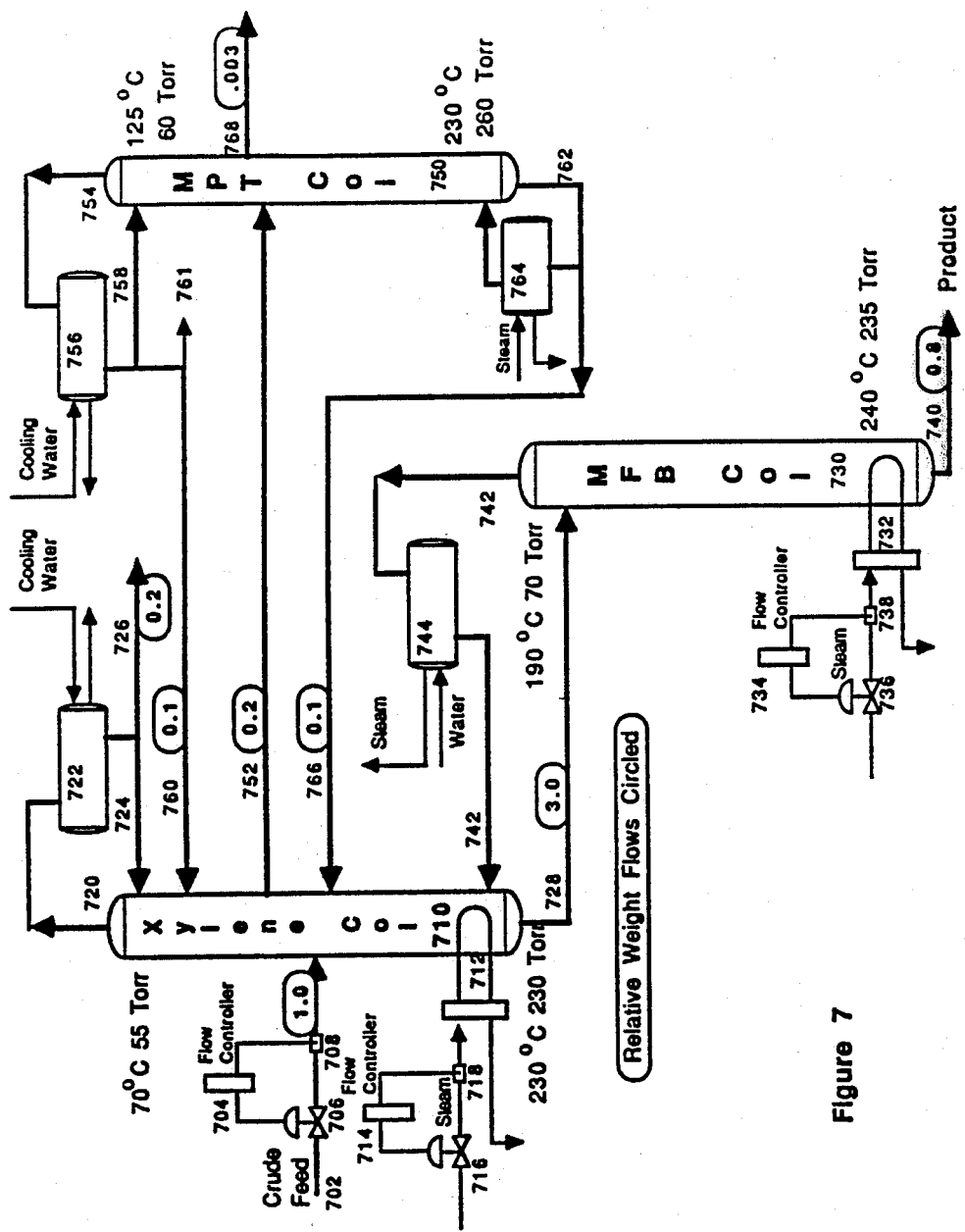
FIG. 7 shows an example of a chemical synthesis processing layout in which the method taught by the present invention has been successfully demonstrated.

FIG. 1 schematically shows the structure of hardware and procedures preferably used to embody the novel process control system (with expert system capabilities) provided by various of the innovative features contained in the present application. An underlying process (for example a chemical process) is very schematically represented as a single pipe 160, on which sensors 156 an one actuator 158 are explicitly shown. Of course, real world examples are substantially more complex; FIG. 7 shows the chemical process flow of a sample system in which the presently preferred embodiment has been successfully demonstrated. The various actuators 158 are controlled, in accordance with feedback signals received from various sensors 156, by one or more controllers 154.

In the presently preferred embodiment, the controller 154 is configured as a pneumatic proportional, integral, derivative (PID) controller. However, a wide variety of other controller technologies and configurations could be used. Pneumatic controllers are used in this example because they are common in the chemical process industry, and match well with the feedback requirements of chemical process control. Alternatively, an all-electronic distributed control system could be used instead. Moreover, the controller functionality could be different, e.g. a proportional/integral controller or a proportional controller could be used instead. In the presently preferred embodiment, the PID controller 154 is directly controlled by a computer control system 52. (This system 152 is referred to, in the various examples of user menus shown, as "PCS" (process control system.) The computer controller system 152 and the PID controller 154 may be regarded together as a single first level controller 150, and could easily be configured in that fashion (as with a distributed digital control system) to implement the present invention.

The control system 150 receives at least some of its parameters 132 (e.g. setpoints or feedforward ratios) from a supervisor procedure 130, which is preferably a higher level of control software. (In many of the sample user menus and forms shown, the supervisor procedure 130 is referred to briefly as "ACS.") The supervisor not only receives inputs 157 indirectly (or directly) from various sensors 156, it also receives lab measurement data 162, and also can issue calls to and receive inputs from the expert system 120, as will be described below.

In the presently preferred embodiment, the supervisor and build-supervisor procedures run on a minicomputer (e.g. a VAX 11/785), while the computer control system 152 is a PDP-11.

The supervisor 130 is preferably also connected to a historical process data base 140, which directly or indirectly receives the inputs from the sensors 157 and the off-line lab measurements 162. Thus, when the supervisor needs to access a value 157 or 162, it is not necessary for it to call on a physical device or read a real-time signal. It can simply call a stored value (together with a time stamp) from the database 140. However, many of the advantages of the present invention could also be obtained without using the historical process data base 140.

In addition, the supervisor 130 preferably also embodies a statistical control system. Statistical control systems, as are well known in the art of chemical processes, are advantageous when the process characteristics and measurement characteristics are subject to significant random variation, as they normally are in the chemical process industry. Statistical filtering tests are preferably performed to filter out statistically normal variation, and ascertain whether a process has significantly deviated from its current goal or average. (Alternatively, the statistical filtering functions could be performed elsewhere in software, e.g. in the database software.)

The supervisor procedure 130 is preferably run as a cycling process, and can call multiple expert systems 120 when indicated. (In many of the sample user menus and forms shown, the expert and build-expert procedures are referred to briefly as "PACE.")

A sample realistic process context (in which numerous innovative features have been successfully demonstrated) will first be described. The operation of the historical process database will next be described, since that provides a standardized data interface to which many of the other functions connect. Next, the functioning of the build-supervisor procedure will be described in detail, since that provides many details of how the supervisor is configured in the presently preferred embodiment, and after that the organization of the supervisor procedure itself will be discussed in greater detail. In later sections, the structure of the expert systems preferably used will be described in detail, and the operation of the build-expert procedure which constructs the expert systems will also be described in detail.

Sample Process Context

FIG. 7 schematically shows a sample embodiment of a chemical process incorporating several novel features described in the present application. The system shown is one in which various novel aspects set forth in the present application have been advantageously demonstrated.

It should be understood that the present invention provides a tool of very broad applicability, which can be used in many processes very different from that of FIG. 7. Thus, for example, various of the claims herein may refer to sensors which sense "conditions" in a process, or to actuators which change "conditions" in a process, without reference to whether one sensor or many sensors is used, whether one or several parameters is sensed by respective ones of the sensors, whether the actuators are valves, motors, or other kinds of devices, etc.

FIG. 7 shows part of the distillation train of a process in which paraxylene is air oxidized to make terephthallic acid, which is then esterified with methanol and refined to dimethyl terephthallate (DMT). DMT is sold as a bulk product, and commonly used as a polyester precursor. The esterification process will produce a significant fraction of the impurity methyl formyl benzoate (MFB). One of the key objectives in a DMT synthesis process is controlling the compositional fraction of MFB, since it affects the properties of products made from DMT. The refining train shown in FIG. 7 will reduce the average MFB fraction to a fairly constant level which is (in this example) about 22 ppm (by weight).

The crude feed 702 will typically have a composition which is (by weight) about 74% DMT about 20% orthoxylene (and related components which tend to recycle with the orthoxylene), about 5% methyl hydrogen terephthallate (MHT), and about 0.2% of methyl formyl benzoate (MFB). The MFB-depleted product 740 is preferably further refined to reduce the MHT fraction.

The crude feed 702 is fed into approximately the middle of a first distillation column 710. The column 710 is heated at its base by a steam reboiler 712. The steam flow is controlled by a flow controller 714 (which is connected to an actuator 716 and a sensor 718.) Similarly, the fed flow controller 704 is connected to an actuator 706, and a sensor 708. The column 710, as operated in the presently preferred embodiment, has internal pressures and temperatures which range from about 230 Torr at about 230° C. at its bottom to about 55 Torr at about 70° C. at its top. The vapor stream 720 is passed through a condenser 722, and some of the resulting condensate is fed back into the column as reflux 724. The product stream 726 has a mass flow rate of about 20% of the crude feed 702, and is recycled. A bottom product 728 is fed to the top of a second distillation column 730. The second distillation column has a steam reboiler 72 near its bottom (controlled by a steam flow controller 734, actuator 736, and sensor 738). The pressures and temperatures in the second column 730 (which in the user screens of the presently preferred embodiment is frequently referred to as the "MFB column") range from about 240° C. at about 235 Torr at the bottom of the column to about 70 Torr and about 190° C. at the top of the column. The bottom product 740 of the column 730 (which has a mass flow of about 0.8 of the crude feed 702) is the MFB-purified product. (In this product the fraction f MFB will on average have been reduced to about 22 ppm, for the conditions given.) The top product 742 of the column 730 is passed through a condenser 744 and reintroduced into column 710 as a bottom feed. (Column 710 is referred to, in the specific example given below, as the "xylene column".) The mass flow in the loop 728/742 is quite large; typically the mass flow of flow 728 will be about three times the mass flow of the crude feed 702.

In addition, a third distillation column, in the presently preferred embodiment, is operated in parallel with a middle section of column 710. This third column 750 is fed a side draw stream 752 from the first column 710. The vapor stream 754 of column 750 is passed through a condenser, and part of the condensate is reintroduced to column 750 as a reflux 758. Most of the remaining condensate is reintroduced to first column 710 as an upper middle feed. Similarly, the liquid stream 762 of third column 750 is partly reintroduced as a bottom feed after being vaporized in the reboiler 764, but is also partly fed back into column 710 as a lower middle feed 766. The additional separation provided by the third column 750 enhances the net compositional segregation of MFB. The middle product 768 of the third column 750 is a low-flow-rate product flow (typically 0.003 times the mass flow of the crude feed 702), and this product flow removes most of the undesired MFB impurity from the system. The temperatures and pressures in the third column 750 range from (in this example) about 230° C. at about 260 Torr at the bottom of the column to about 60 Torr at about 125° C. at the top of the column. Stream 761 is a small purge stream removing intermediate materials.

In the sample embodiment, the three primary control points for control of MFB composition are the steam feed to the MFB column reboiler 730, which is controlled by flow controller 734; the steam feed to the xylene column reboiler 710, which is controlled by flow controller 714; and the feed of crude feed stock to the xylene column 710, which is controlled by flow controller 704. Numerous other controllers, pumps, and other process equipment maintain the temperatures, pressures, and flow rates at other points in the process. In accordance with principles well known in the art of chemical engineering, this serves to maintain mass and energy balances an compositional trends consistent with the ultimate control objective, which is to maintain a high and constant purity in the product stream 740.

Historical Process Database

In the presently preferred embodiment (as shown in FIG. 1), the supervisor 130 receives data primarily through a historical process data base 140, which directly or indirectly receives the inputs from sensors 157 and off-line laboratory measurements 162. Thus, when the supervisor needs to access a value 157 or 162, it is not necessary for it to call on a physical device or read a real-time signal, since it can simply call a stored value (together with a time tamp) from the database 140.

In the preferred embodiment, every data value provided by the historical database has a timestamp attached. Data are received in at least two ways: first, some parameters are received as nearly continuous data flows (more precisely, as high-sampling-rate time series). For example, the data 157 from sensors 156 (e.g. temperature sensors) will be received as a series of digital values from analog-to-digital converters 155. In the presently preferred embodiment, compression algorithms are used to reduce the storage requirements of this data, and permit a usefully long period of time to be represented without requiring impractical amounts of storage space. However, this operation (which includes both compression and decompression algorithms) is essentially invisible to the supervisor procedure 130.

Secondly, lab analysis data 162 can also be stored in the historical database 140. For example, compositional measurements must normally be done offline. A physical sample will be pulled from the physical process flow and sent to the laboratory for analysis. The resulting lab analysis value is entered into the historical database, timestamped with the time the sample was taken.

A third source of data is simulations: running processes can be simulated, using any of a variety of currently available simulation methods, and predicted conditions can be stored in the historical database (together with the proper timestamp). Thus, for example, control strategies can access data generated by complex real-time simulations.

Thus, many of the advantages of the database 140 derive from the fact that it can provide a timestamp to accompany every piece of data it provides. In addition, in the presently preferred embodiment, the database also stores the name and units for each parameter. As presently practiced, the database is also able to perform a variety of other functions, including monitoring, activating alarms if certain sensed measurements reach certain critical levels, output processing (i.e. loading data out to physical devices), generating plots of selected parameters over time, as well as other common database functions (e.g. generating reports).

This structure is quite flexible: for example, in alternative embodiments, one supervisor procedure could interface to multiple databases 140, and/or one database 140 could receive calls from more than one supervisor procedure 130 (which optionally could be running on different systems).

Supervisor and Build-Supervisor Procedures

The present application describes some very advantageous features of novelty in the supervisor procedure 130 and build-supervisor procedure 810, which could optionally and less preferably be incorporated in embodiments which did not include at least some of the innovative features described in the context of the expert and build-expert systems 110 and 120.

The supervisor procedure 130 preferably used contains a modular software structure which greatly facilitates initial setup and also modification. Preferably the supervisor procedure 130 is a cycling procedure constructed as a set of blocks. That is, each block defines a core procedure which (as seen by the user, both initially and whenever called up for modification) is substantially self-contained, and which (in the presently preferred embodiment) is of one of four types. Preferably each block is either a feedforward block, a feedback block, a statistical filter block, or a program block. (That is, preferably each block is configured by user inputs to a template for one of these block types.) Preferably each kind of block also has the capability to call a user subroutine, and in fact the "program blocks" used in the presently preferred embodiment perform no other function.

The functional templates and data interface definitions for the most commonly used functions are predefined, but the user can also add code of his own if he wishes to do so. Providing standardized templates for the most commonly used functions expedites initial functional definition, and also facilitates maintenance, but sophisticated users are not prevented from writing their own customized functions (such as messaging).

Feedback blocks are used when a manipulated parameter must be adjusted to keep a measured parameter near a desired goal. Feedforward blocks are used when two parameters (which are not necessarily in a causal relation) are linked, i.e. when a manipulated parameter must be adjusted to keep it in some ratio (or other relation) to a measured parameter. Statistical filtering blocks are used, in the presently preferred embodiment, to provide the advantages of statistical process control, and to facilitate minimizing the number of control parameter adjustment actions.

Preferably a maximum number of blocks is predefined. (In the presently preferred embodiment, 200 blocks is the preset maximum, and this number is large enough to serve the control needs of several different systems simultaneously.) The imposition of a maximum helps to maintain the software, by limiting the number of functions which can be crowded into any one software structure, and by motivating users to delete obsolete block definitions.

Thus, a software structure like that described can be used to control several systems and/or used by several users. The provision of "ownership" identification for each block, which may optionally be combined with access privilege restrictions, advantageously helps to preserve maintainability in multi-user environments.

Figure 8:
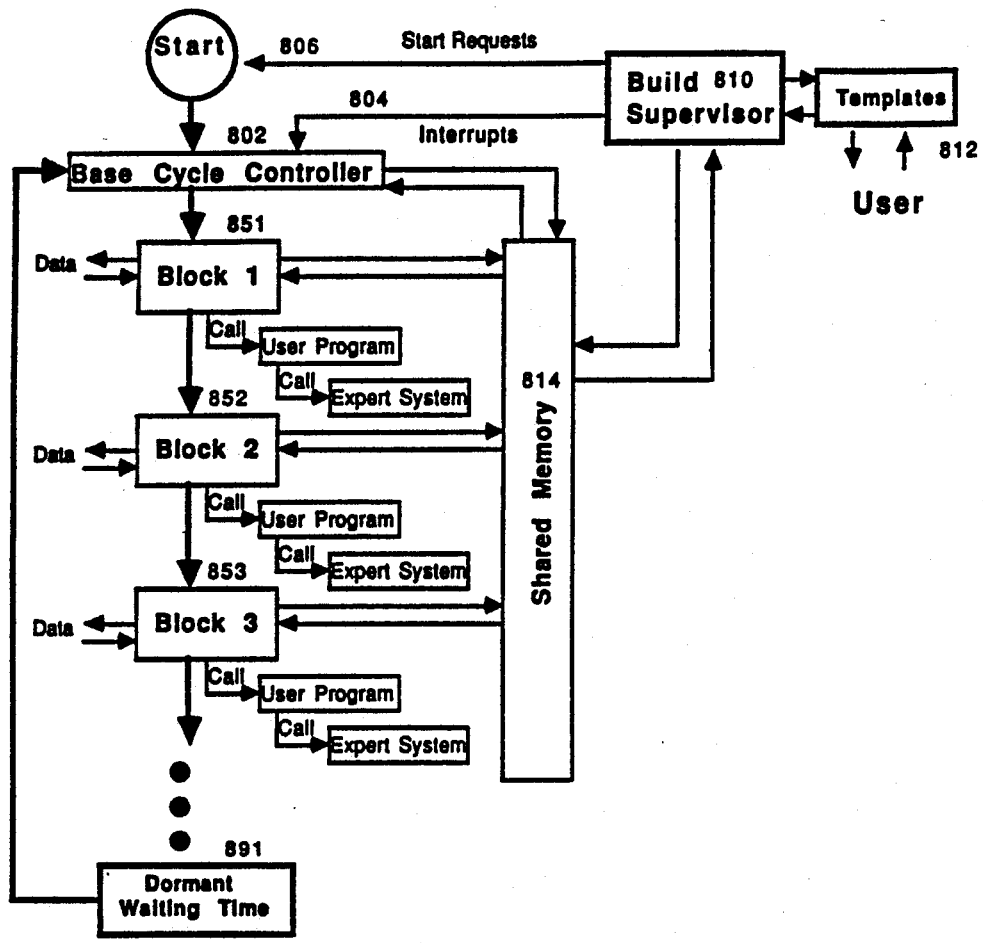
FIG. 8 schematically shows the structure preferably used for the supervisor procedure 130 and the build-supervisor procedure 810.

FIG. 8 shows the preferred organization of the supervisor procedure 130. The top level loop (shown as a base cycle controller procedure 802), which calls the various blocks 851, 852, 853, ..., sequentially, is preferably a cycling procedure. For example, the dormant time waiting block 891 might be set, in the dimethyl terephthalate synthesis application described, so that the base cycle procedure 802 is executed every 15 minutes (and therefore the entire sequence of blocks 851 etc. is called for possible execution every 15 minutes). The base cycle procedure also preferably performs some overhead functions. For example, the base cycle procedure 802 optionally contains the appropriate commands for branching on interrupts 804, and for initialization after a start command 806. Secondly, the base cycle procedure 802, upon calling each block, will preferably look at the header of the block (which is stored as data in shared memory, as discussed below), and usually also at some external information, such as the system clock value or the time stamp of a variable, to see if that block is du to execute. In the presently preferred emodiment, each block will also have status flags which indicate whether it may be executed, and will also have timing options which can be used by the user to specify, for example, that a particular block is to be executed only every 175 minutes.

The base cycle procedure 802 is not the only procedure which is relatively "high-level" with respect to the blocks 851, 852, etc. The build-supervisor procedure 810 is able to present the user with templates 812, and to (effectively) change the operation of the blocks 851, 852, etc., by changing shared memory values in accordance with the user's inputs to the templates 812.

That is, the real time control actions of the supervisor procedure blocks are supervised by the base cycle procedure 802. The base cycle procedure is responsible for determining when blocks are on/off, when blocks should be initialized, and when blocks should be executed. It also controls the timing of the base scan through all blocks.

In the presently preferred embodiment, each time the base cycle procedure executes a block, it checks the block type label (in shared memory) and calls the appropriate subroutine. That is, a single block of executable code is used for all of the feedback blocks, and similarly another block of code is used for all the feedforward blocks, etc., so that all 200 blocks require only four subroutines for their standard functions. Each time the base cycle routine executes a feedback block, it calls up the user-defined parameter set for that particular block, and passes those parameters to the subroutine which performs feedback functions in accordance with those parameters.

Base Cycle Procedure

Figure 15:
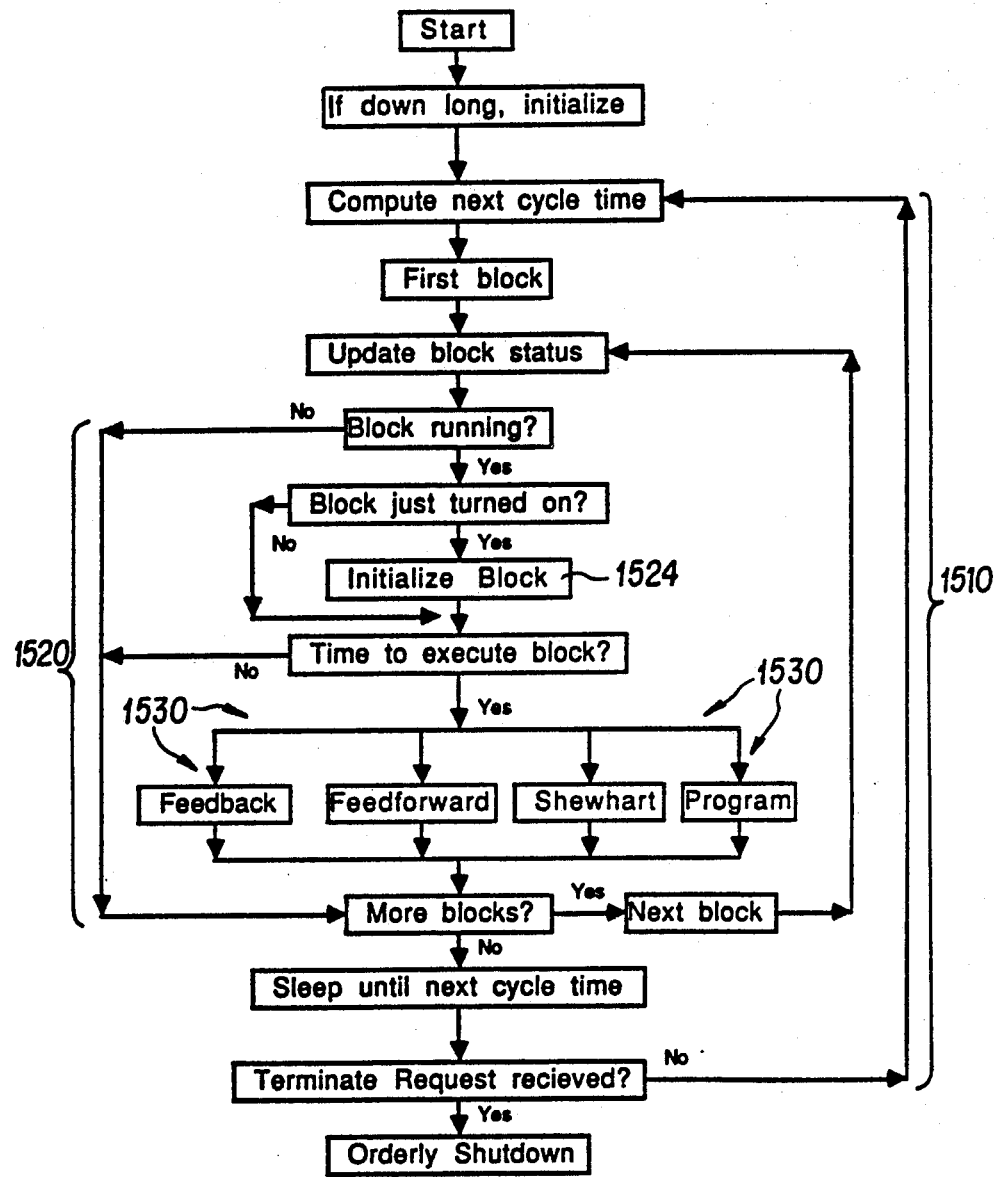
FIG. 15 shows a flow chart for the base cycle procedure used in the supervisor procedure in the presently preferred embodiment.

FIG. 15 shows a flow chart of the logic preferably used in the base cycle procedure 802. The sequence of actions used in the main control program, when it is first started (e.g. by submitting it to a job queue) is:

Check to see if more than 30 minutes has passed since the last control cycle in the supervisor procedure. If so, initialize all blocks whose status is "On", "Active", or "Just turned on". (Initialization sequence is given below).

Start the control cycle loop: (This loop is shown as 1510 in the flow chart of FIG. 15.)

Set the system status to "Running-Computing".

Compute the next cycle time by adding the base scan interval to he current time.

Start a loop through all blocks, starting with block number 1 and counting up to the maximum number of blocks (This loop is shown as 1520 in the flow chart of FIG. 15):

Check block status:

* Get the switch status of the block. If the block is switching with an external switch parameter, get its status. (The switch status will be "On" if the external switch is on, or "Off" if the external switch is off.) If the loop is switched manually, the switch status is the same as the block's current status.

* If the switch status is "On", "Active", "Toggled On", or "Just turned on", the block is on.

* If the block is on, and the current block status is not"On" or "Just turned on", then the block is just being turned on. Set the Block Status to "Just turned on".

* If the block is on, and the current block status is "On" or "Just turned on", then the block is continuing to be on. Set the Block Status to "On".

* If the block is not on, it is off. Set the block status to "Off".

If the block status is "Off", "Inactive", or "Failed", loop back up and start the next block.

If the block status is "Just turned on", INITIALIZE the block (These steps are shown as 1524 in the flow chart of FIG. 15):

* If the block has a measured variable, set the "Last measured time" equal t the current time of the measured variable.

* If the block has a Key block, set the "Key block time" equal to the "Last execution time" of the key block.

* Set the "Last execution time" of the block to the current time.

* If the block is a feedforward block, set the "Old measured value" equal to the current value of the measured variable.

If the block has a measured variable, get its current time.

If the block has a key block, get its last execution time.

If the block timing option includes fixed interval, and if the elapsed time since the "last execution time" of the block is greater than or equal to the execution time interval, set the execute flag for the block.

If the block timing option includes keying off the measured variable, and if the current time of the measured variable is more recent than the "last measured time" of the block, set the "last measured time" for the block equal to the current time of the measured variable, and set the execute flag for the block.

If the block timing option includes keying off another block, and if the last execution time of the key block is more recent than the "key block time", set the "key block time" equal to the last execution time of the key block, and set the execute flag for the block.

If the execute flag for the block is set, set the last execution time for the block equal to the current time, and execute the block. Only execute the block once, even if more than one timing option was satisfied. (The block execution procedures are discussed in greater detail below, and are shown generally as 1530 in the flow chart of FIG. 15.)

If more blocks need to be processed, loop back to the next block.

This is the end of the loop 1520 through all the blocks.

Set the system status to "Running-Sleeping".

Set a wake up timer for the next cycle time computed above, and go to sleep until the timer expires, or until awakened by a request to terminate the program.

Wake up. Check to see if interrupted to terminate. If so, set the system status to "Terminated normally", and stop completely.

If not terminated, branch back to the start of the control cycle loop 1510.

Sample Source Code

The source code for the procedure which actually performs this function, in the presently preferred embodiment, is as follows. Due to the formatting requirements of patent applications, some portions of this and other portions of source code provided herein contain statements which are wrapped across more than one line (and hence would need to be restored to single-line format, or appropriate leaders inserted, before being loaded for execution); but those skilled in the art will readily recognize these instances, and can readily correct them to produce formally perfect code.

TABLE 1

```
C**********************************
C
C         Control.for
C
C       Main control program for the Advanced Control
C               System,
C       a high level optimization and control system
C           running on the Vax, using Vantage facilities.
C
C**********************************
C       Program Control
            Include 'ACS$includes:Block_parameters.inc/nolist'
            Include 'ACS$includes:Van_functions.inc/nolist'
            Include 'ACS$includes:Sys_functions.inc/nolist'
```

TABLE 1-continued

```
              Include 'ACS$includes:Manip_params.inc'
              Include 'ACS$includes:Meas_params.inc'
              Include 'ACS$includes:Filter_params.inc'
              Include 'ACS$includes:ACSserv.inc'
              Include 'ACS$includes:ACS$includes:ACSstatus.inc'
C
              Integer*4       Block
              Integer*4       Integer_Now
              Character*20    Character_now
              Integer*4       Timbuf(2)
              Integer*4       Measured_time_stamp
              Integer*4       Key_block_exec_time
              Logical*2       Execute block
              Logical         Success
              Logical         First
              Character*18    Debug_time
              Logical         Force_initialization
              Parameter       (Force_initialization = .True.)
              Logical         Dont_force_initialization
              Parameter       (Dont_force_initialization = .False. )
C
              Integer*2       Meas_type
              Integer*2       Meas_var
              Integer*2       Filt_type
              Integer*2       Filt_var
C
              Integer*4       Event_flag_state
              Integer*4       Timer_flag
              Integer*4       Interrupt_flag
              Character*9     Cluster_name
              Parameter       ( Cluster_name = 'ACS_FLAGS' )
              Integer*4       Flag_mask
C
              Logical         Interrupt_flag_set
              Interrupt_flag_set( ) = Btest(Event_flag_state,1)
C
              Timer_flag = 64
              Interrupt_flag = 65
              First = .True.
              Flag_mask = 0
              Flag_mask = Ibset ( Flag_mask, 0 )
              Flag_mask = Ibset ( Flag_mask, 1 )
C
C...Record control program startup in the log file
C
              Van_status = Vss$_from_ascii_time ( ' ' , Integer_now )
              Van_status = Vss$_to_ascii_time ( Integer_now ,
       1                                                        Character_now
              Write (6,*) ' Started the ACS control program at ',
       1                                                        Character_now
C
C...Create the event flag cluster , clear interrupt flag
C
              Sys_status = Sys$ascefc ( %Val(Timer_flag ) ,
       1                   %descr(Cluster_name) , 0 , )
              Sys_status = sys$clref ( %val(Interrupt_flag ))
C
C...Check to see if ACS_control has been down for more than
C     30 minutes. If so, initialize all active blocks.
C
              Van_status = Vss$_from_ascii_time ( ' ' , Integer_now )
              If ( Integer_now - Integer_next_cycle .gt. 30*60 ) Then
                  Do 10 Block = 1,Max_blocks
                      If ( ( Block_status(Block)(1:2) .eq. 'On' ) .or.
       1                 ( Block_status(Block)(1:6) .eq. 'Active' ) .or.
       1                 ( Block_status(Block)(1:14) .eq. 'Just turned on' ) )
       1                 Call Initialize_block ( Block )
      10          Continue
              End If
C
C....The main block control loop
       1      Continue
C
C....Set system status to Running
C
              System_status = 'Running-Computing             '
C
C...Set Wake up time to ACS_base_scan minutes from now
C
              Van_status = Vss$_from_ascii_time ( ' ' , Integer_now )
              Van_status = Vss$_to_ascii_time ( Integer_now ,
       1                                                        Character_now )
```

TABLE 1-continued

```
              Integer_next_cycle = Integer_now + ACS_base_scan*60
              Call Vss$_get_systime ( Integer_next_cycle , Timbuf )
C
C....Loop through all the blocks
C
        Do 100 Block = 1,Max_blocks
C
C....Update the block Status from the info coming from PCS
C
              Call Check_block_status ( Block )
C
C...Check the block status, if inactive or off, skip it
C
              If ( ( Block_status(Block)(1:8) .eq. 'Inactive') .or.
     1           ( Block_status(Block)(1:6) .eq. 'Failed' ) .or.
     1           ( Block_status(Block)(1:10) .eq. 'On-holding') .or.
     1           ( Block_status(Block)(1:13) .eq. 'Off'       )       ) Then
                  Go to 100
              End if
d             If ( First )
d     1          write(6,*) ' Block: ',block,' Status = '
              1 block_status(block)
C
C...If the block has just been turned on, initialize it
C
              If (Block_status(Block)(1:14) .eq. 'Just turned on' ) Then
                  Call Initialize_block( Block )
              End if
C
C....Check to see if it is time to execute the block
C
C..... Use appropriate calls for the block type
C
              If (
     1           ( Block_type ( Block )(1:8 ) .eq. 'Feedback' ) .or.
     1           ( Block_type ( Block )(1:11) .eq. 'Feedforward' ) .or.
     1           ( Block_type ( Block )(1:7 ) .eq. 'Program' )
     1           ) Then
                  ACS_status = ACS_get_meas_var_type ( Block , Meas_type )
                  If ( Meas_type .eq. Cur_val_van_var ) Then
                      ACS_status = ACS_get_meas_var_num ( Block , Meas_var )
                      Van_status = Vss$g_curtime ( Meas_var ,
     1
     1                                            Measured_time_stamp )
                  Else
                      Measured_time_stamp = 0
                  End If
C
              Else If (
     1           ( Block_type ( Block )(1:8 ) .eq. 'Shewhart' )
     1                ) Then
                  ACS_status = ACS_get_filtered_var_type ( Block , Filt_type
                  If ( Filt_type .eq. Van_var_filter ) Then
                      ACS_status = ACS_get_filtered_var_num ( Block , Filt_var
                      Van_status = Vss$g_curtim ( Filt_var ,
     1                                            Measured_time_stamp )
                  Else
                      Measured_time_stamp = 0
                  End If
              End If
C
C...Get exec time of key block, if defined
C
              Key_block = Var_num2(Block)
              If ( Key_block .ne. Empty ) Then
                  Key_block_exec_time = Last_execution_time ( Key_block )
              Else
                  Key_block_exec_time = 0
              End If
C
              Execute_block = .False.
d             If ( First .eq. .True. ) Then
d             Van_STATUS = vss$_to_ascii_time ( integer_now , Debug_time )
d             write(6,*) ' Block = ',block
d             write(6,*) 'Integer_now = ',Debug_time
d             Van_STATUS = vss$_to_ascii_time ( last_execution_time(block)
d     1       , Debug_time )
d             write(6,*) 'last_execution_time = ',debug_time
d             Van_STATUS = vss$_to_ascii_time ((-1)*Frequency(block)*60
d     1       , Debug_time )
d             write(6,*) 'Frequency(block) = ',Debug_time
d             Van_STATUS = vss$_to_ascii_time ( last_measured_time(block)
```

TABLE 1-continued

```
d       1 , Debug_time )
d       write(6,*) 'last_measured_time = ',Debug time
d       Van_STATUS = vss$_to_ascii_time ( measured_time_stamp
d       1 , Debug_time )
d       write(6,*) 'measured_time_stamp = ',Debug_time
d       write(6,*) 'timing_option = ', Var_num3(BLock)
d       End If
C
        I_timing_option = Var_num3(Block)
        If ( ( I_timing_option .eq. Interval ) .and.
        1        ( Integer_now - Last_execution_time(Block) .ge.
        1                       Frequency(Block)*60) ) Then
        1                   Last_execution_time(Block) = Integer_now
            Last_measured_time(Block) = Measured_time_stamp
            Execute_block = .True.
C
        Else If ( I_timing_option .eq.
        1                            Key_off_measured_variable )Then
            If ( Measured_time_stamp .gt.
        1                  Last_measured_time(Block) ) Then
                Last_execution_time(Block) = Integer_now
                Last_measured_time(Block) = Measured_time_stamp
                Execute_block = .True.
            End If
C
        Else If ( I_timing_option .eq.
        1                            Key_off_ACS_block ) Then
            If ( Key_block_exec_time .gt.
        1                  Fix_time(Block) ) Then
                Last_execution_time(Block) = Integer_now
                Last_measured_time(Block) = Measured_time_stamp
                Fix_time(block) = Key_block_exec_time
                Execute_block = .True.
            End If
C
        Else If ( I_timing_option .eq.
        1                            Intrvl_and_key_off_ACS_block) Then
            If (
        1           ( Key_block_exec_time .gt.
        1                       Fix_time(Block) ) .or.
        1           ( Integer_now - Last_execution_time(Block) .ge.
        1                       Frequency(Block)*60)
        1         ) Then
                Last_execution_time(Block) = Integer_now
                Last_measured_time(Block) = Measured_time_stamp
                Fix_time(block) = Key_block_exec_time
                Execute_block = .True.
            End If
C
        Else If ( I_timing_option .eq.
        1                            Intrvl_and_key_off_meas_var) Then
            If (
        1           ( Measured_time_stamp .gt.
        1                       Last_measured_time(Block) ) .or.
        1           ( Integer_now - Last_execution_time(Block) .ge.
        1                       Frequency(Block)*60)
        1         ) Then
                Last_execution_time(Block) = Integer_now
                Last_measured_time(Block) = Measured_time_stamp
                Fix_time(block) = Key_block_exec_time
                Execute_block = .True.
            End If
C
        Else If ( I_timing_option .eq.
        1                            Key_off_meas_var_and_block) Then
            If (
        1           ( Key_block_exec_time .gt.
        1                       Fix_time(Block) ) .or.
        1           ( Measured_time_stamp .gt.
        1                       Last_measured_time(Block) )
        1         ) Then
                Last_execution_time(Block) = Integer_now
                Last_measured_time(Block) = Measured_time_stamp
                Fix_time(block) = Key_block_exec_time
                Execute_block = .True.
            End If
C
        Else If ( I_timing_option .eq.
        1                            Intrvl_and_Key_meas_and_block)Then
            If (
        1           ( Key_block_exec_time .gt.
        1                       Fix_time(Block) ) .or.
```

TABLE 1-continued

```
          1              ( Measured_time_stamp .gt.
          1                        Last_measured_time(Block) ) .or.
          1              ( Integer_now - Last_execution_time(Block) .ge.
          1                        Frequency(Block)*60)
          1            ) Then
                     Last_execution_time(Block) = Integer_now
                     Last_measured_time(Block) = Measured_time_stamp
                     Fix_time(block) = Key_block_exec_time
                     Execute_block = .True.
               End If
          End if
C
C...If Time to execute, call the Subroutine for the appropriate block
C
          If ( Execute_block .eq. .True. ) Then
               If ( Block_type(Block)(1:11) .eq. 'Feedforward' ) then
                     Call Feedforward_block(Block)
               Else If ( Block_type(Block)(1:8) .eq. 'Feedback' ) then
                     Call Feedback_block(Block)
               Else if ( Block_type(Block)(1:7) .eq. 'Program' ) then
                     Call Program_block ( Block)
               Else if ( Block_type(Block)(1:8) .eq. 'Shewhart' ) then
                     Call Shewhart_block( Block)
               End if
          End if
C
    100   Continue
C
C...All Blocks checked and executed if needed; go to sleep until neede
C
    102   Continue
C
          Sys_status = Sys$setimr ( %val(Timer_flag) , %ref(Timbuf),, )
          If (Sys_status .eq. %loc(Ss$_normal) ) Then
d              Write(6,*) ' Successfully set timer.'
          Else
               Write(6,*) ' Error return from setimr in Control at ',
          1                                          Character_now
          End If
c
          System_status = 'Running-Sleeping       '
          Sys_status = Sys$wflor ( %val(Timer_flag) , %val(Flag_mask)
          If ( .not. Sys_status ) Call Lib$signal(%val(Sys_status))
c
          Sys_status = sys$readef ( %val(Timer_flag) ,
          1           %ref(Event flag state)
          If ( .not. Sys_status ) Call Lib$signal(%val(Sys_status))
c
          If ( ( Sys_status .ne. %loc(Ss$_wasclr) ) .and.
          1        ( Sys_status .ne. %loc(Ss$_wasset) ) ) Then
               Write(6,*) ' Problem reading event flag status'
          End If
C
C...Test the interrupt bit- if set, process the request
C
          If ( Interrupt flag set() ) Then
d              Write(6,*) 'got an interrupt'
               Call Shutdown ( Event_flag_state )
          Else
d              WRite(6,*) 'Timer expired.'
          End If
C
          First = .False.
          Go To 1
C
          End
```

Copyright (c) 1987 E. I. duPont de Nemours & Co., all rights reserved.

Build-Supervisor Procedure

The build-supervisor procedure 810 presents templates 812 to the user and stores the user responses to these templates in a "global section" portion of memory (i.e. a shared or commonly accessible portion of memory). That is, the user inputs to the templates for the various blocks 851, 852, etc., are stored where the base cycle procedure 802 can access them and the build-supervisor procedure 810 can also access them. Thus, an authorized user can at any time interactively call up data from shared memory space 814, see these parameters in the context of the templates 812, and modify the functions of the various blocks 852, 853, etc. and/or define new blocks (and/or delete existing blocks), while the base cycle procedure 802 continues to call the various blocks on the appropriate schedule. That is, the base cycle procedure 802 is preferably a cycling procedure which satisfies the real-time process control demands of the underlying process, while the build-supervisor procedure 810 retains the capability for reconfiguring the operation of the various blocks in the supervisor, according to user input.

It should be noted that the structural features and advantages of the build-supervisor procedure are not entirely separate from those of the supervisor procedure. The two procedures are preferably operated separately, but they provide an advantageous combination. The features of the supervisor procedure are partly designed to advantageously facilitate use of the build-supervisor procedure, and the features of the build-supervisor procedure are partly designed to advantageously facilitate use of the supervisor procedure.

In the presently preferred embodiment, the nexus between the build-supervisor procedure and the supervisor procedure is somewhat different from the nexus between the build-expert procedure and the operating expert procedures. The user entries made into the more constrained parts of the templates can be transferred fairly directly to the operating supervisor procedure: the build-supervisor procedure stores values (corresponding to the data input by the user in the accessible fields of the templates) in a shared section of memory, which is immediately accessible by the supervisor procedure as soon as the stored status value for the block is changed to "Active". By contrast, if the customized user routines (including the expert routines generated by the build-expert software) are modified, they must be compiled and linked with the supervisor procedure.

The build-supervisor procedure 810 preferably also has the capability to stop or restart the base cycle procedure 802, independently of whether the build-supervisor procedure 810 has updated the shared memory 814 in accordance with user inputs to templates 812.

Too-Level Menu

Figure 16:
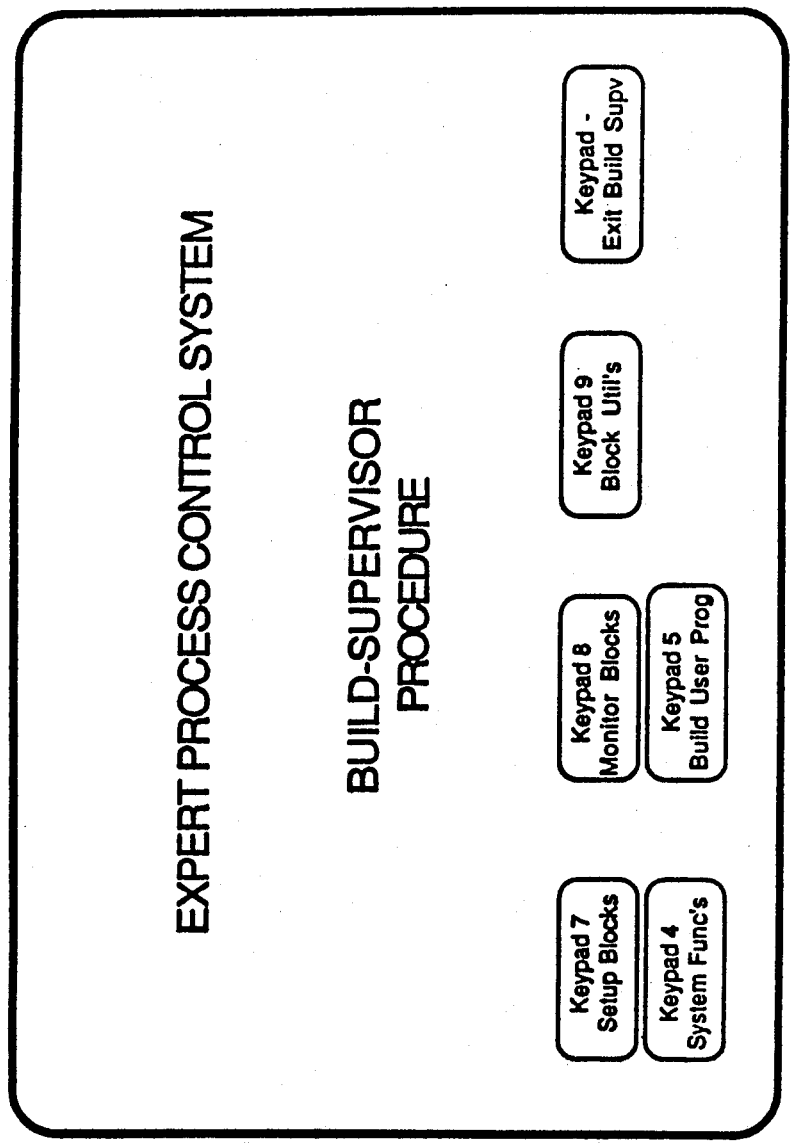
FIG. 16 shows a menu which, in the presently preferred embodiment, is the top-level menu presented to the user by the build-supervisor procedure.

The user who begins an interaction with the build-supervisor procedure is first presented with a menu which (in the presently preferred embodiment) resembles that shown as FIG. 16. This menu provides options which permit the user to setup (or modify) blocks, to monitor blocks, to call block-management utilities, to exit, or to go into a structured environment for writing user programs.

If the user chooses block setup, he next sees a menu like that shown in FIG. 9. This menu is presented to the user by the build-supervisor procedure 810 to select a specific existing template 812' (i.e. a template with the previously defined data values of a particular block are shown in the appropriate fields of the template) or a blank template 812 of a given type to provide user inputs to define or modify a block 851, 852, etc.

This form allows the user to choose which block to enter setup parameters for, and, if the block is a new one, allows a choice of which type block it will be. To go back to the previous form (in this case the top-level menu), he can press the "-" key on the keypad.

To set up a new block, the user can either enter a block number which he knows is not in use, or the build-supervisor procedure will provide him with the lowest number block which is not in use. To enter a block number, the user can simply type the number in the block number field and press the return key. To get the build-supervisor procedure to find the lowest number unused block, the user can press keypad 8. The cursor will move to the block type field and the build-supervisor procedure will request that the user enter the number from the list for the type of block desired. The build-supervisor procedure will then present the user with a block setup form for that block type. If the user mistakenly enters a block number which is already in use, the build-supervisor procedure will go directly to the setup form for that block, but the user can simply press keypad minus on the setup form to go back to the block setup selection form and try again. To enter or modify setup parameters for an existing block, the user can simply enter the block number and press the return key, and the build-supervisor procedure will present the block setup form for that block.

In the best mode as presently practiced, all four block setup forms have some common features. Keypad 9 will move the cursor from anywhere on the form up to the block number field. Keypad 8 will find the lowest number available block and set it up as the same block type as the form showing on the screen. Keypad 7 tests all the parameters on the block and changes the block status to switch it on or off, or requests new data if the user has not yet supplied it. (In addition, many of the parameters are checked for gross error as the user enters them.)

The various block setup forms shown as FIGS. 10 through 13 will be individually described below; but first, some features common to some or all of the block setup forms, and some features characteristic of the operation of the blocks thus defined, will be described.

When a block is turned on, the block status will not go directly to "On." (The full system of block status options (in this embodiment) is described below.) Depending on how the block is set up to be switched on and off, the status will change to "Toggled on" or "Active". The base cycle procedure will update the status as the block is executed, changing to "Just turned on" and then to "On". When turning a block off, the status will change to "Off" or "Inactive", again depending on how the block is set up to switch. These status sequencing rules facilitate use of initialization and/or shutdown steps in controlling block functionality.

Any time a parameter is entered or changed on a setup form, the block status will be set to "Inactive." This means that the block parameters have not been checked to assure that everything needed has been entered and is consistent. If a parameter is changed on a block which is currently on, the block must be toggled from "Inactive" to "Active" or "Toggled On" using Keypad 7.

Data Source Specification

The templates presented to the user for block customization include a standardized data interface. The data values to be used by the supervisor are specified in the standard interface by two identifiers. The first identifies which (software) system and type of value is desired. The value of a setpoint in a particular distributed control system, the value of a sensor measurement in a particular process monitoring system, the value of a constraint from a process control or supervisor system, and time averages of sensor measurements from a particular historical database are examples of this. The second identifier specifies which one of that type of value is desired, for example the loop number in the distributed control system.

Figure 10:
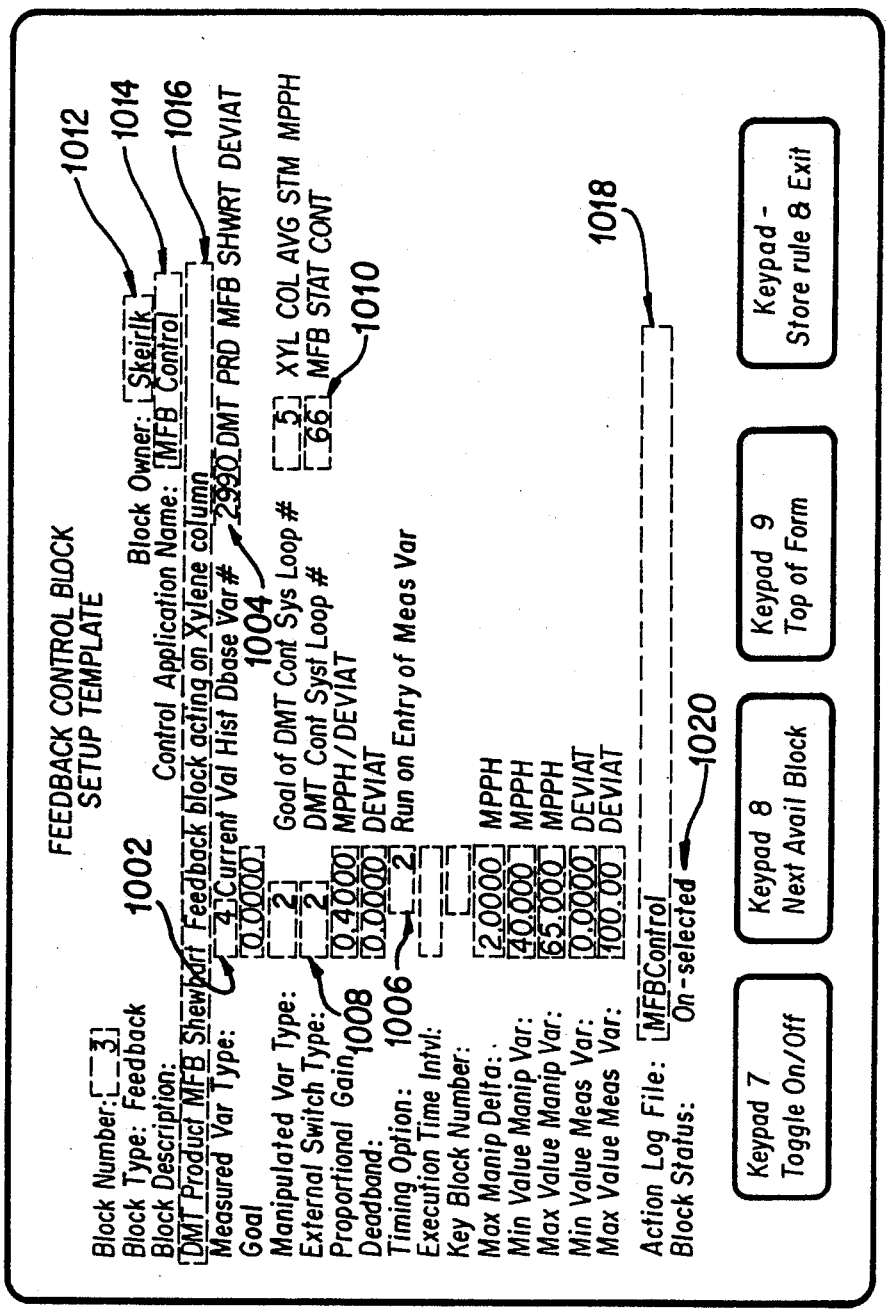

For example, in FIG. 10 the user has entered "4" in the highlighted area 1002 after the phrase "Measured Variable Type:". This particular identifier (i.e. the value entered in this field by the user) indicates that the variable type here is a current value of a variable from the historical database, and the build-supervisor procedure adds an abbreviated indication of this ("Current Val Hist Dbase Var #") onto the user's screen as soon as the user has entered this value in the field 1002. (If the user entered a different code in the field, a different short legend might be shown. For example, as seen in FIG. 10, the user has indicated a variable type of "2" after the phrase "Manipulated Var Type", indicating that the manipulated variable is to be a loop goal of the DMT control system.) As the second identifier, the user has indicated a value of "2990" in field 1004, to indicate (in this example) which particular Database variable's current value is to be used. For this identifier too, the build-supervisor procedure adds an abbreviated indication of its interpretation of this identifier ("DMT PRD MFB SHWRT DEVIAT") onto the user's screen as soon as the user has entered this value in the field 1004.

Data values specified through the standard interface may be used as measured values, manipulated values, or as switch status values indicating an on/off status. Preferably the interface allows the user to specify data in any of the relevant process control and data collection systems used for the process, or for related processes. Preferably, the interface also allows specification of data (both current and historical) in a historical process database. Since multiple control systems (or even multiple historical databases) may be relevant to the process, the standard interface greatly facilitates the use of relevant data from a wide variety of sources.

Block Timing Information

In the presently preferred embodiment, all blocks except the Shewhart block provide the same block timing options. Block timing determines when a block will perform its control actions. The build-supervisor procedure provides three fundamental block timing options, which can be used in any combination, providing a total of 7 block timing options. The three fundamental options are:

Fixed Time Interval: the block will execute at a fixed time interval. The user specifies the time interval, e.g. in minutes. (Note that a combination of this option and the following has been specified in the example of FIG. 13, by the user's entry of "5" into field 1306.)

Key Off Measured Variable: the block will execute every time a new value is entered into the process database for the measured variable. The measured variable must be a "sampled" type variable. (Note that this option has been specified in the example of FIG. 10, by the user's entry of "2" into field 1006.)

Key Off Another ACS Block: the block will execute every time a (specified) lower numbered block executes. The user specifies which block will be the key block. Any combination of one, two or three timing options can be used. Blocks using a combination timing option execute whenever any of the specified timing options are satisfied. (Note tat this option has been specified in the example of FIG. 11, by the user's entry of "3" into field 1006.)

Block timing options are represented on the setup forms by a number code. The user enters the number code corresponding to the desired timing option. If the timing option includes fixed interval timing, an execution time interval must also be specified. If the block is to key off another block, the key block number must be specified.

In future alternative embodiments, the block timing options set forth here may be especially advantageous in multi-processor embodiments the separation of the control action specifications in multiple blocks shows the inherent parallelism of the problem, while the keying options in which one block keys off another show the block sequencing constraints which delimit the parallelism. The standardized data interface used in the presently preferred embodiment may also be advantageous in this context, by allowing block execution to be keyed off events external to the supervisor.

Primary Block Switching

The supervisor procedure provides several ways to switch block actions on and off. If the block needs to be turned on and off by an operator, the build-supervisor procedure allows the user to specify an external switch system and a switchable entity within that system which the block on/off status is to follow. For example, the user may specify a specific control system and a loop number within that system. The block will turn on when that loop is on, and off when that loop is off. The standardized data interface allows any accessible control system to act as the switch system. As a further alternative, the blocks can be set to switch on and off only under the control of the developer (i.e. under the control of the build-supervisor user). In this case, the block can only be switched using the toggle on/off function on the block setup form.

The external switch system is represented on the block setup forms by a number. The user enters the number corresponding to the external switch system he wants to use. The entity within the switch system (e.g. the loop number) is entered in the next field. (In the example of FIG. 10, the user entries in fields 1008 and 1010 have specified an external switching variable.) If the block is to be turned on and off only from the build-supervisor procedure setup form, a zero is entered for the switch system number, and the word "Manual" will show in the field for the switch entity number. (This option has been selected in the example of FIG. 13.)

Secondary Block Switching

The supervisor also provides secondary mean of controlling block execution. Blocks which have been turned "on" by their primary switch controls may be "selected", "de-selected", or "held" by programmatic requests. The status of selected blocks changes to "On-selected". Selected blocks continue to function as if they were "On". The status of blocks which are deselected by programmatic request changes to "On-deselected". De-selected blocks take no control action. However, they differ from block which are "off" because they continue to maintain all their internal information so that they are always ready to execute if "selected". The status of blocks which are held by programmatic request changes to "on-holding". The programmatic request includes the length of time the block s stay on hold. Blocks which are holding act as if they were off. When the holding time expires, the status of holding blocks changes to "Just turned on," and they initialize.

One advantage of these block switching options is that they provide a way to embed alternative control strategies in the supervisor procedure. That is, control strategies can be readily changed merely by selecting some blocks in the supervisor procedure and/or deselecting other blocks. This is advantageous in terms of software documentation, since it means that alternative control strategies can be documented and maintained within the same software structure. It is also advantageous in interfacing to other procedures: for example, the expert systems called by the presently preferred embodiment will frequently take action by selecting and/or deselecting blocks of the supervisor procedure.

These block control options facilitate the use of one supervisor procedure to interface to multiple controllers, and the use of one supervisor procedure by different users to control different processes. The block status system permits one or more blocks to be updated without interfering with the running supervisor process; in fact, in optional environments, multiple users could be permitted to update different blocks at the same time.

Block Description Fields

Figure 11:
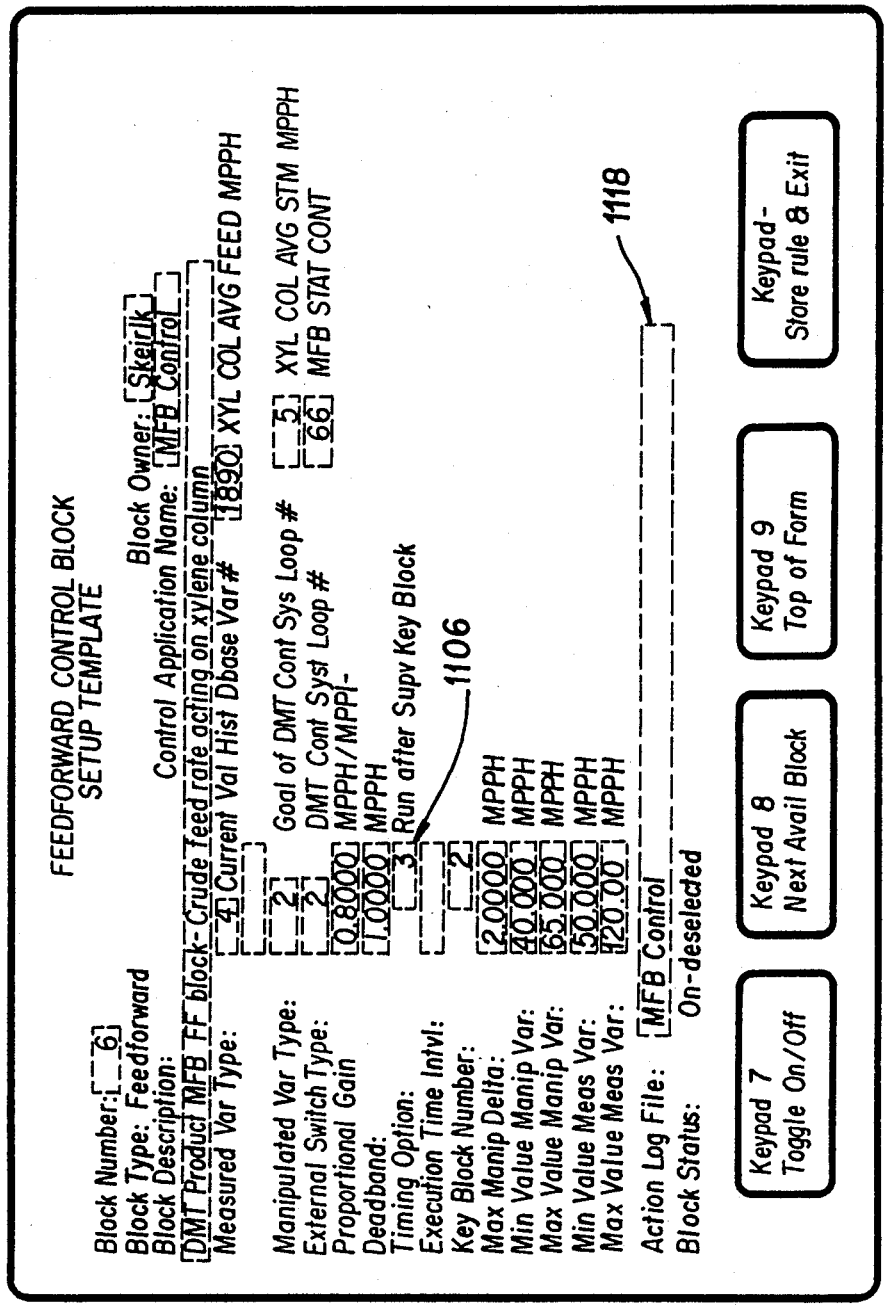
Figure 13:
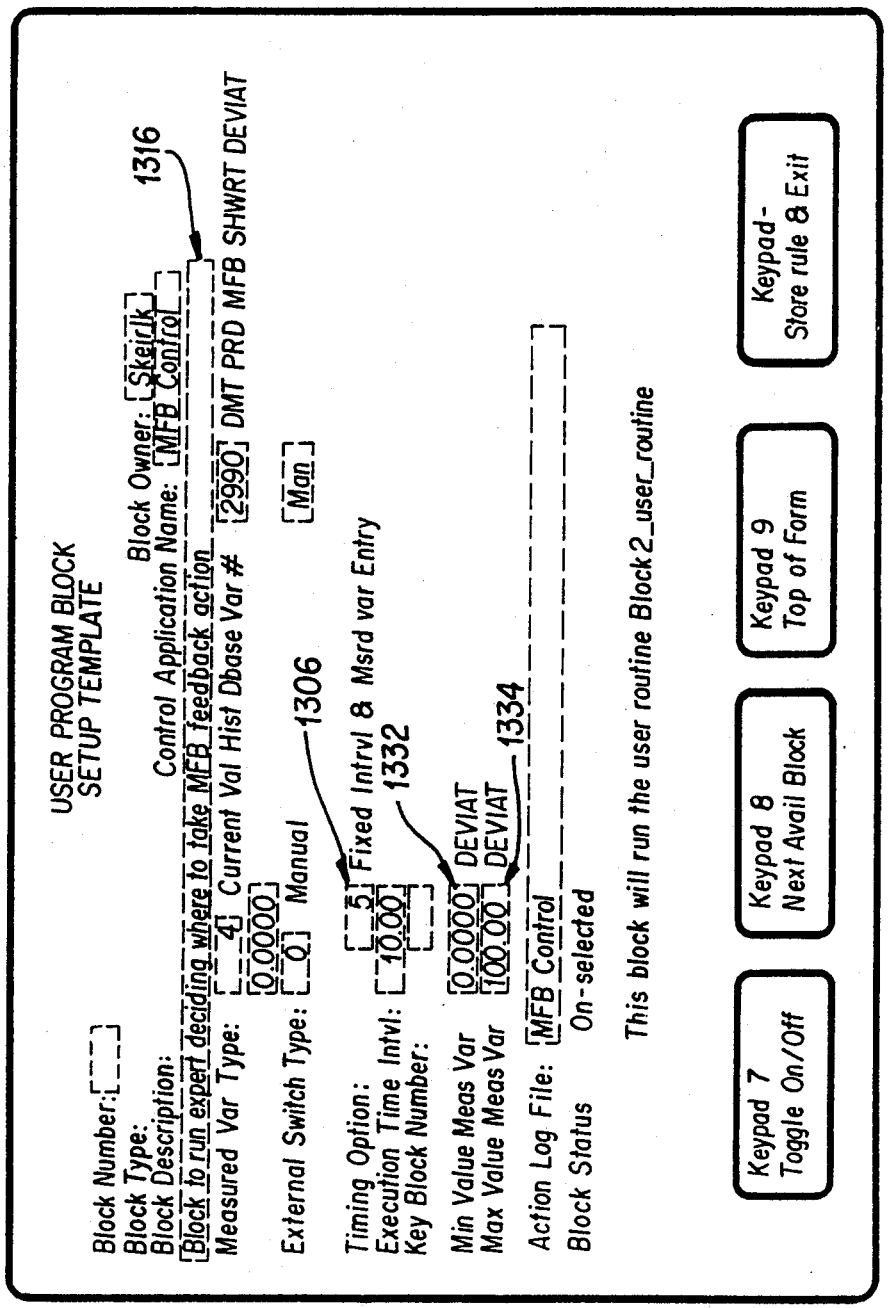

All blocks allow the user to enter three descriptive fields. These fields are for user reference and can be searched when printing lists of block parameters. They have no effect on block actions. The "control application name" field allows the user to group blocks that are part of the same control application by giving them all the same application name. (In the example of FIG. 10, the user entry in field 1044 has specified "MFB Control". Note that the examples of FIGS. 11, 12, and 13 show corresponding entries in this field.) The block description field allows the user to describe the block's specific action or purpose. (In the example of FIG. 13, the user entry in field 1316 has explained that this is a "Block to run expert deciding where to take MFB feedback action".) The ownership field specifies which user has control of the block. (In the example of FIG. 10, the user entry in field 1012 has specified "Skeirik". Note that the examples of FIGS. 11, 12, and 13 show corresponding entries in this field.) This field facilitates use of the organization described in environments where multiple users are defining blocks which run within the same supervisor procedure.

Of course, in multi-user environments it may be desirable to allow some users a greater degree of access than others. Thus, for example, some users may be authorized to edit a bock, while others may be authorized to toggle the block on or off but not to edit it, and others may be authorized to monitor block operation but not authorized to change it. Similarly, access to expert systems may be constrained by giving greater authorization to some users than to others; some users may be permitted to make calls to the expert system but not to edit the rulebase, and other users may not be permitted to do either. In the presently preferred embodiment, all of these choices can readily be implemented by using the file ownership and access control list options available in the VMS operating systems, but of course this functionality could be implemented in many other ways instead.

Action Logging

The supervisor procedure provides a means of reporting control actions and/or logging them in a file for recall. Control action messages are written by a user routine. Control blocks call user routines after their control actions are complete, and pass data regarding their actions. The action log file field allows the user to enter the name of the file to which logging messages will be written. The same log file can be used for more than one block (e.g. if the two blocks' actions are part of the same control application). (For example, note that field 1018 in the example of FIG. 10 and field 1118 in the example of FIG. 11 both specify "MFBCONTROL" as the action logging file.) The log file name is limited to letter and number characters, and no spaces are allowed (except after the end of the name).

Block Status

Note that, in the example of FIG. 10, a block status of "On-selected" is displayed in area 1020. This is not a field into which the user can directly enter data, but it will change in response to user actions (e.g. the user can toggle the block on or off by hitting keypad 7). The block status codes used in the presently preferred embodiment reflect several aspects of block setup and execution, including:

Proper configuration of block parameters;
On/off status of block;
Failure of block actions; and
Failure of user routines.
Some common block status values are:

"Inactive:" this indicates that the block has not been properly configured and toggled on, or that parameter was changed. This is also the normal "off" status of a block which has been configured to switch on and off with a switch system variable, if the user toggles it off from the setup form.

"On:" this is the normal status for blocks which are performing their control actions.

"Off:" this is the normal status, for a block which has been configured to switch on and off with a switch system variable, when that variable is in its off state. This is also the normal status for blocks which are configured to switch on and off through the setup form only and have been toggled off from the setup form.

"Active:" this is the status to which a block is toggled on if it is configured to switch on and off with a switch system variable. This status will change on the next cycle of the control program, to "On" or to another value, depending on the state of the switch system variable.

"Toggled on:" this is the status to which a bock is toggled on if it is configured to switch on and off through the setup form only. This status will change on the next cycle of the control program.

"Just turned on:" this is a normal transition state for blocks going from an "off" status (e.g.: off, inactive) to "On" status. Blocks whose status is "Just turned on" will be initialized by the base cycle procedure, which resets the last execution time and the measured variable and key lock times used for block timing. Feedforward blocks initialize the "old" measured variable value to the current value.

"On-selected": indicates that a block which is on has been selected by a programmatic request. The block continues to function as if it were On.

"On-deselected": indicates that a block which is on has been de-selected by a programmatic request. The block takes no control actions, but continues to maintain its internal parameters as if it were On. This keeps the block ready to act if selected.

"On-holding": indicates that a block has been put on hold for a specified length of time by a programmatic request. The block takes no control action. A block that has been holding will re-initialize and go back to "On" status when the holding period expires.

"On-Failed usr routin:" this status indicates that a user routine called by this block had a fatal error which was bypassed by the supervisor procedure on the most recent execution of the block. Fatal errors in user routines are reported in the control program log file (not the same as action log files), and can be reviewed using the "List log file" option on the System Functions screen, described in the section on block monitoring.

"On-Recovrd usr Error:" this indicates that a fatal error was bypassed in the user routine, but that the user routine ran successfully on a later execution. Again, the log file will give more details about what happened.

"On-Err . . . :" many abnormal status values can indicate that problems were encountered in block execution, e.g. problems in the input or output of data to control systems. The latter part of the status field gives some indication of the problem. Most such errors are also recorded in the control program log file.

Various other block status values can readily be inserted, along the lines demonstrated by these examples.

Feedback Blocks

FIG. 10 shows a sample of a template 812 presented to the user to define a feedback block. In the specific example shown, the block being worked on is block number three of the 200 available blocks 851, 852, etc., and the various data values shown in this Figure reflect the entries which have been made at some time to define this particular block.

The feedback block provides proportional feedback action. In feedback action, the user specifies a measured value (called the "measured variable") and a goal value (setpoint) at which he wants to maintain it. Feedback action calculates the "error" in the measured variable (measured variable value—goal), and computes its action by multiplying the error times the "proportional gain". The current value of the "manipulated variable" is changed by the amount of the calculated action.

The basic feedback action can be altered by several additional parameters. A deadband around the goal can be specified. If the measured value falls within plus or minus the deadband of goal, no action is taken. The amount of action taken can be limited to a fixed amount. The range over which the value of the manipulated variable can be changed can be limited to keep it within operable limits. Screening limits can be specified on the measured variable value, in which case measured values outside the screening limits will be ignored. Block timing and switching and the block description fields follow the general outlines given above.

Specifying a feedback block on the block setup selection form (FIG. 9) brings up a feedback block setup form, as shown in FIG. 10.

Parameters

The parameters which the user is asked to specify include:

Measured variable type: a number code representing the software system and the type of entity which the block should use for the measured variable. (A sample response might be a number code indicating a Historical database variable.)

Measured variable number: the number of the entity within the specified system which the block will use for the measured variable. For example, if the measured variable type is a historical database variable, the measured variable number is the number of the variable in the historical database. After the measured variable type is entered, the label next to this field will show what type of data is needed. When the measured variable number is entered, other fields will also be filled in: the name and units for the measured variable, deadband and goal; units and default values for the max and min measured values. If block timing is to key off entry of new data into the measured variable, only discretely sampled variable types can be used.

Goal: the value at which the measured variable is to be "held". The value is entered in entered in the units of the measured variable.

Manipulated variable type: a number code representing the "target system"—the software package and the type of entity which the block should manipulate. Examples are: control system loop goal, historical database variable, a setpoint in a distributed control system, or a setpoint for a programmable loop controller.

Manipulated variable number: the number of the entity within the target system which the block will manipulate. For example, if the manipulated variable type is a control system loop goal, the manipulated variable number would be the number of the loop whose goal is to be changed. The label next to this field will show what type of information is needed; in this case the label would show "Cont Sys loop #".

Proportional gain: the constant relating the change in the manipulated variable to the error. The units of the gain are shown to the right of the field after the measured and manipulated variable have been specified. Control action is calculated:

$$\text{Error} = [\text{Measured variable value} - \text{goal value}]$$

$$\text{Manipulated delta} = \text{Error} * [\text{Proportional gain}]$$

The manipulated delta is added (subject to limits) to the current value of the manipulated variable.

Deadband: A range around the goal value. If the value of the measured variable falls within a range defined by the goal plus or minus the deadband, no action is taken.

Timing option, execution time interval, and Key block number: these parameters are those described above.

External switch system and switch number: these parameters are described above.

Maximum manip delta: the maximum change that can be made in the manipulated variable's value in one control action.

Minimum and maximum value of the manipulated variable: limit values outside which control action will not move the value of the manipulated variable. If a computer control action would put the manipulated value outside the limits, the value is set equal to the limit. If the manipulated value is moved outside the limits (by operator action, for example) the next control action will return the value to within the limits.

Minimum and maximum value of measured variable: Screening limits for reasonable values of the measured variable. Any time the measured variable value falls outside these limits, the value will be ignored and no action is taken.

Action log file: this specifies the name of the log file for action logging.

Feedback Block Operation

The sequence of actions performed by each feedback block, when executed by the base cycle routine, is:

If block status is "On-deselected", do no further actions;

Get the current value of the measured variable (If not accessible set status to "On-err . . . " and do no further actions);

Get the current time stamp of the measured variable;

Test the value of the measured variable. If it is outside the minimum and maximum allowed values, set status to "On-msrd out of lims" and do no further actions.

Get the current value of the manipulated variable. If not accessible, set status to "On-err . . . " and do no further actions.

Compute the error (=Measured value—Goal). If absolute value is less than the deadband, do no further actions.

Compute the change in the manipulated variable:

Delta_manip = Error * proportional Gain

If the absolute delta is greater that the maximum allowed delta, set it equal to the maximum (maintaining proper sign).

Compute the new value of the manipulated variable:

New manip value = Current manip value + delta_manip

If the value is outside the max/min limits, set it equal to the nearest limit. If limited, recompute the delta using the limit.

Change the manipulated variable value to the new value computed. If not accessible, change status to "On-err . . . " and do no further actions.

Load user array values for use by the user routine.

If delta_manip is not zero, update the past action values and times.

Call the user routine.

Data passed to the user routine

In the presently preferred embodiment, each feedback block is able to pass information about its actions to the user routine, by using a commonly accessible memory block named "User_vars." (The use of this data by the user routines is described in more detail below.) The data passed by the feedback block may include:

"User_integer (1)"—the time stamp of the measured variable (from the database);

"User_integer (2)"—the time the action was taken;

"User_real(1)"—the change in the value of the manipulated variable;

"User_real(2)"—the computed error; and

"User_character(1)"—a string (alphanumeric) sequence which describes the block type; for feedback blocks this is set to be='Feedback'.

Sample Source Code

The source code for the procedure which actually performs this function, in the presently preferred embodiment, is as follows.

TABLE 2

```
C************************************
C
C       Feedback_block.for
C
C       ACS subroutine to do feedback action on the Vax, communicating
C       directly with the target system.
C
C
C************************************
C
        Subroutine Feedback_block ( Block )
C
        Include 'ACS$includes:Block_parameters.inc/nolist'
        Include 'ACS$includes:Van_functions inc/nolist'
        Include 'ACS$includes:User_vars.inc/nolist'
        Include 'ACS$includes:ACSstatus.inc/nolist'
        Include 'ACS$includes:ACSserv.inc'
        Include 'Acs$includes:TIserv.inc'
        Include 'Acs$includes:TIstatus.inc'
        Include 'ACS$includes:Manip_params.inc'
        Include 'ACS$includes:Meas_params.inc'
C
C
        Integer*2       Meas_var_system
        Integer*2       Meas_var_number
        Integer*2       Manip_var_system
        Integer*2       Manip_var_number
        Integer*4       Block
        Integer*4       Measured_time_stamp
        Integer*4       Integer_Now
        Character*20    now_time
        Real*4          Measured_value
        Real*4          Current_manipulated_value
        Real*4          New_manipulated_value
C
C...Special handling for 'On-deselected' status - do nothing
C
        If ( Block_status(Block)(1:13) .eq. 'On-deselected') Then
            Return
        End If
C
        ACS_status = ACS_get_meas_var_type ( Block , MEAS_VAR_system )
        Manip_var_system = Manipulated_variable(Block)
        Manip_var_number = New_manipulated_variable(Block)
D       Write(6,*) ' Calling new_feedback - block = ',block
C
C...Get the measured value
C
        Van_status = Vss$_from_ascii_time ( ' ', Integer_now )
```

TABLE 2-continued

```
                van_status = Vss$_to_ascii_time( Integer_now , now_time )
C
C...Measured Value is TPA PCS loop goal
C
            If ( Meas_var_system .eq. PCS_TPA_Loop_goal   ) Then
                ACS_status = ACS_get_pcs_goal( 'TPA        ',
        1                Measured_variable(Block) , Measured_value )
                If ( ACS_Status .ne. %loc(ACS_success) ) Then
C.............If PCS goal value not available, don't execute
                    Block_status(Block) = 'On-Err-PCS goal get'
                    Write( 6, *) 'Feedback exit due to measured var not availa
                    write(6,*)' ACS Block: ',block,' at: ',now_time
                    Return
                End If
C
C...Measured Value is DMT PCS loop goal
C
            Else If ( MEAS_var_system .eq. PCS_DMT_loop_goal ) Then
                ACS_status = ACS_get_pcs_goal( 'DMT ' ,
        1                Measured_variable(Block) , Measured_value )
                If ( ACS_Status .ne. %loc(ACS_success) ) Then
C.............If PCS goal value not available, don't execute
                    Block_status(Block) = 'On-Err-PCS goal get'
                    Write( 6, *) 'Feedback exit due to measured var not availa
                    write(6,*)' ACS Block: ',block,' at: ',now_time
                    Return
                End If
C
C...Measured Value is ACS block goal
C
            Else If ( MEAS_var_system .eq. ACS_block_goal ) Then
                ACS_status = ACS_get_goal (
        1                Measured_variable(Block) , Measured_value )
                If ( ACS_Status .ne. %loc(ACS_success) ) Then
C.............If ACS goal Value not available, don't execute
                    Block_status(Block) = 'On-Err-ACS goal get'
                    Write( 6, *) 'Feedback exit due to measured var not availa
                    write(6,*)' ACS Block: ',block,' at: ',now_time
                    Return
                End If
C
C...Measured Value is Vantage variable
C
            Else If ( Meas_var_system .eq. cur_val_Van_var ) Then
                Van_Status = Vss$g_current( Measured_variable(Block) ,
        1                Measured_value )
                If ( Van_Status .ne. %loc(vss_normal) ) Then
C...........If Variable Value not available, don't execute
                    Block_status(Block) = 'On-Failed Msrd var '
                    Write( 6, *) 'Feedback exit due to measured var not availa
                    write(6,*)' ACS Block: ',block,' at: ',now_time
                    Return
                End If
C
            end if
            Van_status = Vss$g_curtime ( Measured_variable(Block) ,
        1                                   Measured_time_stamp )
C
C....Check the Measured variable to see if it is within limits
C
            If ( (Measured_value .lt. Measured_min(block) ) .or.
        1           (Measured_value .gt. Measured_max(block) ) ) Then
C...........Reject the data point
                Write( 6, *) 'Feedback exit due to out of limits measured'
                write(6,*)' ACS Block: ',block,' at: ',now_time
                Block_status(Block) = 'On-Msrd out of lims '
                Return
            End if
C
C
C...Get the current manipulated value
C
C
C
C...Target is TPA PCS loop goal
C
            If ( Manip_var_system .eq. PCS_TPA_Loop ) Then
                ACS_status = ACS_get_pcs_goal( 'TPA        ',
        1       Manip_var_number , Current_manipulated_value , )
                If ( ACS_Status .ne. %loc(ACS_success) ) Then
C.............If PCS goal value not available, don't execute
                    Block_status(Block) = 'On-Err-PCS goal get'
```

TABLE 2-continued

```
                    Return
                End If
C
C...Target is DMT PCS loop goal
C
                Else If ( Manip_var_system .eq. PCS_DMT_loop ) Then
                    ACS_status = ACS_get_pcs_goal( 'DMT           ',
            1           Manip_var_number , Current_manipulated_value )
                    If ( ACS_Status .ne. %loc(ACS_success) ) Then
C.............If PCS goal value not available, don't execute
                        Block_status(Block) = 'On-Err-PCS goal get'
                        Return
                    End If
C
C...Target is ACS block goal
C
                Else If ( Manip_var_system .eq. ACS_block ) Then
                    ACS_status = ACS_get_goal ( Manip_var_number ,
            1                                   Current_manipulated_value )
                    If ( ACS_Status .ne. %loc(ACS_success) ) Then
C.............If ACS goal Value not available, don't execute
                        Block_status(Block) = 'On-Err-ACS goal get'
                        Return
                    End If
C
C...Target is Vantage variable
C
                Else If ( Manip_var_system .eq.
            1                                       Vantage_variable ) Then
                    Van_status = Geteuval ( Manip_var_number ,
            1                                Current_manipulated_value )
                    If ( Van_Status .ne. %loc(vss_success) ) Then
C..........If Variable Value not available, don't execute
                        Block_status(Block) = 'On-Err-Vant var get '
                        Return
                    End If
C
C...Target is Texas Instruments PM550 controller setpoint in CRD
C
                Else If ( ( Manip_var_system .ge. Low_PM550 ) .and.
            1              ( Manip_var_system .le. Hi_PM550 ) ) Then
C
                    If ( Manip_var_system .eq. CRD_ESCHS_PM550_01 ) Then
                        ACS_status = TI_get_loop_setpoint ( 'TI_PM550_01_PORT' ,
            1               Manip_var_number , Current_manipulated_value )
                    Else If ( Manip_var_system .eq. CRD_ESCHS_PM550_02 ) Then
                        ACS_status = TI_get_loop_setpoint ( 'TI_PM550_02_PORT' ,
            1               Manip_var_number , Current_manipulated_value )
                    Else If ( Manip_var_system .eq. CRD_ESCHS_PM550_03 ) Then
                        ACS_status = TI_get_loop_setpoint ( 'TI_PM550_03_PORT' ,
            1               Manip_var_number , Current_manipulated_value )
                    Else If ( Manip_var_system .eq. CRD_ESCHS_PM550_04 ) Then
                        ACS_status = TI_get_loop_setpoint ( 'TI_PM550_04_PORT' ,
            1               Manip_var_number , Current_manipulated_value )
                    Else If ( Manip_var_system .eq. CRD_ESCHS_PM550_05 ) Then
                        ACS_status = TI_get_loop_setpoint ( 'TI_PM550_05_PORT' ,
            1               Manip_var_number , Current_manipulated_value )
                    Else If ( Manip_var_system .eq. CRD_ESCHS_PM550_06) Then
                        ACS_status = TI_get_loop_setpoint ( 'TI_PM550_06_PORT' ,
            1               Manip_var_number , Current_manipulated_value )
                    Else If ( Manip_var_system .eq. CRD_ESCHS_PM550_07) Then
                        ACS_status = TI_get_loop_setpoint ( 'TI_PM550_07_PORT' ,
            1               Manip_var_number , Current_manipulated_value )
                    End If
                    If ( ACS_Status .ne. %loc(TI_success) ) Then
C.............If PM550 setpoint value not available, don't execute
                        Block_status(Block) = 'On-Err-TI setpnt get'
                        Write( 6, *)
            1           ' Feedback exit - TI PM550 Manip var not gettable.'
                        Write (6, *) ' ACS Block: ',block,' at: ',now_time
                        Return
                    End If
                Else ! Other Manip device type
                End If
C
C...Value is within limits - Test to see if the error is less th
deadband
C
                Error = Measured_value - Goal(Block)
                If ( Abs(Error) .lt. Absolute_deadband(Block) ) Then
            d           Write( 6, *) 'Feedback error less than deadband'
                    Return
```

TABLE 2-continued

```
            End If
C
C.....Compute proportional Feedback Response-Test Delta to see if too
C
            Delta = Error * Proportional_gain(Block)
            If ( Abs(Delta) .gt. Max_manip_delta(Block) ) Then
                Delta = Sign(Max_manip_delta(Block),Delta)
            End If
C
C...Calculate new manipulated value, check to see it within limits
C
            New_manipulated_value = Current_manipulated_value + Delta
C
            If ( New_manipulated_value .gt. Manipulated_max(Block) ) Then
                New_manipulated_value = Manipulated_max(Block)
            Else If ( New_manipulated_value .lt. Manipulated_min(Block) )
                New_manipulated_value = Manipulated_min(Block)
            End If
            Delta = New_manipulated_value - Current_manipulated_value
C
C... Transmit the new Manipulated Value to the manip variable
C
C...Target is TPA PCS loop goal
C
            If ( Manip_var_system .eq. PCS_TPA_Loop ) Then
                ACS_status = ACS_put_pcs_goal( 'TPA        ',
         1            Manip_var_number , New_manipulated_value )
                If ( ACS_Status .ne. %loc(ACS_success) ) Then
C.............If PCS goal value not available, don't execute
                    Block_status(Block) = 'On-Err-PCS goal put'
                    Write( 6, *) 'Feedback exit due to failed manip var put.
                    Write(6,*)' ACS Block: ',block,' at: ',now_time
                    Return
                End If
C
C...Target is DMT PCS loop goal
C
            Else If ( Manip_var_system .eq. PCS_DMT_loop ) Then
                ACS_status = ACS_put_pcs_goal( 'DMT        ',
         1            Manip_var_number , New_manipulated_value )
                If ( ACS_Status .ne. %loc(ACS_success) ) Then
C.............If PCS goal value not available, don't execute
                    Block_status(Block) = 'On-Err-PCS goal put'
                    Write( 6, *) 'Feedback exit due to failed manip var put.
                    Write(6,*)' ACS Block: ',block,' at: ',now_time
                    Return
                End If
C
C...Target is ACS block goal
C
            Else If ( Manip_var_system .eq. ACS_block ) Then
                ACS_status = ACS_put_goal ( Manip_var_number ,
         1                       New_manipulated_value )
                If ( ACS_Status .ne. %loc(ACS_success) ) Then
C.............If ACS goal Value not available, don't execute
                    Block_status(Block) = 'On-Err-ACS goal put'
                    Write( 6, *) 'Feedback exit due to failed manip var put.
                    Write(6,*)' ACS Block: ',block,' at: ',now_time
                    Return
                End If
C
C...Target is Vantage variable
C
            Else If ( Manip_var_system .eq.
         1                                   Vantage_variable ) Then
                Van_status = Puteugen ( Manip_var_number ,
         1                               New_manipulated_value )
                If ( Van_Status .ne. %loc(vss_success) ) Then
C........... If Variable Value not available, don't execute
                    Block_status(Block) = 'On-Err-Vant var put '
                    Write( 6, *) 'Feedback exit due to failed manip var put.
                    Write(6,*)' ACS Block: ',block,' at: ',now_time
                    Return
                End If
C
C...Target is Texas Instruments PM550 controller setpoint in CRD
C
            Else If ( ( Manip_var_system .ge. Low_PM550 ) .and.
         1              ( Manip_var_system .le. Hi_PM550 ) ) Then
C
                If ( Manip_var_system .eq. CRD_ESCHS_PM550_01 ) Then
                    ACS_status = TI_put_loop_setpoint ( 'TI_PM550_01_PORT' ,
```

TABLE 2-continued

```
        1       Manip_var_number , New_manipulated_value )
                Else If ( Manip_var_system .eq. CRD_ESCHS_PM550_02 ) Then
                    ACS_status = TI_put_loop_setpoint ( 'TI_PM550_02_PORT',
        1       Manip_var_number , New_manipulated_value )
                Else If ( Manip_var_system .eq. CRD_ESCHS_PM550_03 ) Then
                    ACS_status = TI_put_loop_setpoint ( 'TI_PM550_03_PORT',
        1       Manip_var_number , New_manipulated_value )
                Else If ( Manip_var_system .eq. CRD_ESCHS_PM550_04 ) Then
                    ACS_status = TI_put_loop_setpoint ( 'TI_PM550_04_PORT',
        1       Manip_var_number , New_manipulated_value )
                Else If ( Manip_var_system .eq. CRD_ESCHS_PM550_05 ) Then
                    ACS_status = TI_put_loop_setpoint ( 'TI_PM550_05_PORT',
        1       Manip_var_number , New_manipulated_value )
                Else If ( Manip_var_system .eq. CRD_ESCHS_PM550_06 ) Then
                    ACS_status = TI_put_loop_setpoint ( 'TI_PM550_06_PORT',
        1       Manip_var_number , New_manipulated_value )
                Else If ( Manip_var_system .eq. CRD_ESCHS_PM550_07) Then
                    ACS_status = TI_put_loop_setpoint ( 'TI_PM550_07_PORT',
        1       Manip_var_number , New_manipulated_value )
                End If
                If ( ( ACS_Status .ne. %loc(TI_success) .and.
        1            ( ACS_status .ne. %loc(TI_clamped) ) Then
C.............If PM550 setpoint value not accessible, dont execute
                    Block_status(Block) = 'On-Err-TI setpnt put'
                    Write( 6, *) ' Feedback exit - TI PM550 Manip v
puttable.'
                    Write (6, *) ' ACS Block: ',block,' at: ',now_time
                    Return
                End If
            Else ! Other manip device types
            End If
C
C....Load special arrays for user programs to log messages.
C
                User_integer(1) = Measured_time_stamp
                User_integer(2) = Integer_now
                User_real(1) = Delta
                User_real(2) = Error
                User_character(1) = 'Feedback       '
C
C...If Delta is non-zero, update past actions
C
            If ( Delta .ne. 0 ) Then
                Do 90 J = 5,2,-1
                    Past_action_value(Block,J) = Past_action_value(Block,J-1)
    90              Past_action_time (Block,J) = Past_action_time (Block,J-1)
                Past_action_value(Block,1) = Delta
                Past_action_time (Block,1) = Integer_now
            End If
C
C....Call User subprograms for this block
C
            Call User_programs(Block)
C
C...All done
C
            Return
            End
```

Copyright (c) 1987 E. I. duPont de Nemours & Co., all rights reserved.

Feedforward Block

FIG. 11 shows a sample f a template 812 presented to the user by the build-supervisor procedure to define a feedforward block. In the specific example shown, the block being worked on is block number six of the 200 available blocks 851, 852, etc., and the various data values shown in this Figure reflect the entries which have been made at some time to define this particular block.

The feedforward block provides proportional feedforward action. In feedforward action, the user specifies a measured value (called the "measured variable") and a manipulated variable whose value is to be changed in proportion to (or, more generally, in accordance with) the change in value of the measured variable. Feedforward action begins when the "old measured value" is set equal to a current value (usually when the block is first turned on). The measured variable is then monitored for changes in value and the manipulated variable value is changed in proportion. The "old measured value" is then updated to the value at the time of this action. (The use of the "old measured value" in feedforward rules is one reason why an initialization stage is needed: if a feedforward block were switched from inactive status directly to on status, it might indicate a very large change to the manipulated variable if the delta were calculated from an out-of-date "old measured value.")

In the presently preferred embodiment, the basic feedforward action can be altered by several additional parameters. A deadband can be specified, so that, if the measured value changes by less than the deadband, no action is taken. The amount of action taken can be limited to a fixed amount. The range over which the value of the manipulated variable can be changed can be limited to keep it within operable limits. Screening limits can be specified on the measured variable value, so that measured values outside the screening limits are ignored. Block timing and switching options and the block description fields follow the general outlines given above.

In the presently preferred embodiment, specifying a feedforward bock on the block setup selection form (FIG. 9) brings up a feedforward block setup form like that shown in FIG. 11.

Parameters

The parameters are:

Measured variable type: a number code representing the software system and the type of entity which the bloc should use for the measured variable.

Measured variable number: the number of the entity within the specified system which the block will use for the measured variable. For example, if the measured variable type is a historical database variable, the measured variable number is the number of the variable in the historical database. After the measured variable type is entered, the label next to this field will show what type of data is needed. When the measured variable number is entered, other fields will also be filled in: the name and units for the measured variable, deadband; units and default values for the max and min measured values. If block timing to key off entry of new data into the measured variable, only discretely sampled variable types can be used.

Goal: the goal field cannot be used for feedforward blocks.

Manipulated variable type: a number code representing the software package and the type of entity which the block should manipulate. Examples are: control system loop goal, historical database variable.

Manipulated variable number: the number of the entity within the specified system which the block will manipulate. For example, if the manipulated variable type is a control system loop goal, the manipulated variable number would be the number of the loop whose goal is to be changed. The label next to this field will show what type of information is needed; in this case the label would show "Cont Sys loop #".

Proportional gain: the constant relating the change in the manipulated variable's value to the change in the measured variable's value. The nits of the gain are shown to the right of the field after the measured and manipulated variable have been specified. Control action is calculated as:

Measured delta = [Measured variable value − Old value]

Manipulated delta = Measured delta * [Proportional gain]

The manipulated delta is added (subject to limits) to the current value of the manipulated variable.

Deadband: A range around the "old measured value" (i.e. the measured value at the time of the last block action). If the value of the measured variable is within plus or minus the deadband of the old measured value, no action is taken and the old measured value is not changed.

Timing option, execution time interval, and Key block number: these parameters are described above.

Switch system and switch number: these are described above.

Maximum output delta: the maximum change that can be made in the manipulated variable's value in one control action.

Minimum and maximum value of the manipulated variable: limit values outside which control action will not move the value of the manipulated variable. If a computer control action would put the manipulated value outside the limits, the value is set equal to the limit. If the manipulated value is moved outside the limits (by operator action, for example) the next control action will return the value to within the limits.

Minimum and maximum value of measured variable: These define screening limits for reasonable values of the measured variable. Whenever the measured variable value falls outside these limits, the value will be ignored and no action is taken.

Action log file: this field is described above.

The use of a deadband in feedforward blocks is one of the features which tend to force process control into discrete steps, rather than continuous small changes. One advantage of this novel teaching is that full logging can be used: every single change made by the supervisor procedure can be logged, without generating an excessive number of messages. This in turn means that monitoring, diagnosis, and analysis of processes (and of process control systems) becomes much easier.

Block Operation

The sequence of actions performed by a feedforward block is:

Get the current value of the measured variable (If not accessible, set status to "On-err . . . " and do no further actions);

Test the value of the measured variable. If it falls outside the allowed range of values, set status to "On-msrd out of lims" and do no further actions.

Compute the change in the value of the measured variable: Delta measured = Measured value − Old measured value. If the absolute value of the change is less than the deadband do no further actions.

Compute the change in the manipulated variable:

Delta__manip = Delta measured * Proportional gain.

Set "old measured value" equal to the current value of the measured variable.

If block status is "On-deselected", do no further actions:

Check the magnitude of the manipulated value delta. If greater than the maximum allowed delta, set magnitude equal to the maximum.

Get the current value of the manipulate variable. If not accessible, set status to "On-err . . . " and do no further actions.

Compute the new value of the manipulated variable:

New manip value = Current manip value + delta__manip.

If the value is outside the max/min limits, set it equal to the nearest limit. If limited, recompute the delta using the limit.

Change the manipulated variable value to the new value computed. If not accessible, change status to "On-err ..." and do no further actions.

Load user array values for use by the user routine.

If delta_manip is not zero, update the past action values and times.

Call the user routine.

Data passed to the user routine

The feedforward block passes information about its actions to the user routine through the User_vars common block. The use of this data is described in more detail in the chapter covering User routines. In the presently preferred embodiment, the data passed by the feedforward block includes:

User_integer(1)—the time stamp of the measured variable;
User_integer(2)—the time the action was taken;
User_real(1)—the change in the value of the manip variable;
User_real(2)—the change in the value of the measured variable from the last time the "old measured value" was updated;
User_character(1)—='Feedforward'.

Sample Source Code

The source code for the procedure which actually performs this function, in the presently preferred embodiment, is as follows.

TABLE 3

```
C************************************
C
C       FEEDFORWARD_block.FOR
C
C       Subroutine to do feedforward calculations on the Vax,
C       communicating directly with the target system.
C
C
C
C************************************
C
        Subroutine Feedforward_block ( Block )
        Include 'ACS$includes:Block_parameters.inc/nolist'
        Include 'ACS$includes:Van_functions.inc/nolist'
        Include 'ACS$includes:User_vars.inc/nolist'
        Include 'ACS$includes:ACSstatus.inc/nolist'
        Include 'ACS$includes:ACSserv.inc'
        Include 'Acs$includes:TIserv.inc'
        Include 'Acs$includes:TIstatus.inc'
        Include 'ACS$includes:Manip_params.inc'
        Include 'ACS$includes:Meas_params.inc'
C
        Integer*2       Manip_var_type
        Integer*2       Manip_var_num
        Integer*2       Meas_var_type
        Integer*2       Meas_var_num
        Integer*4       Block
        Real*4          Measured_value
        Real*4          Current_manipulated_value
        Real*4          New_manipulated_value
        Integer*4       Integer_Now
        Character*20    Character_now
        Integer*4       Measured_time_stamp
C
        Van_status = Vss$_from_ascii_time ( ' ' , Integer_now )
        Van_status = Vss$_to_ascii_time( Integer_now , Character_now )
C
C...Get the measured value
C
        ACS_status = ACS_get_meas_var_type ( Block , Meas_var_type )
        ACS_status = ACS_get_meas_var_num ( Block , Meas_var_num )
        Measured_time_stamp = 0
C
C...Measured Value is TPA PCS loop goal
C
        If ( Meas_var_type .eq. PCS_TPA_Loop_goal ) Then
            ACS_status = ACS_get_pcs_goal( 'TPA        ',
     1          Meas_var_num , Measured_value)
            If ( ACS_Status .ne. %loc(ACS_success) ) Then
C...........If PCS goal value not available, don't execute
                Block_status(Block) = 'On-Err-PCS goal get'
                Write( 6, *) 'Feedback exit due to measured var not availa
                write(6,*) ' ACS Block: ',block,' at: ',Character_now
                Return
            End If
        End If
C
C...Measured Value is DMT PCS loop goal
C
        Else If ( Meas_var_type .eq. PCS_DMT_loop_goal ) Then
            ACS_status = ACS_get_pcs_goal( 'DMT        ',
     1          Meas_var_num , Measured_value )
            If ( ACS_Status .ne. %loc(ACS_success) ) Then
C...........If PCS goal value not available, don't execute
                Block_status(Block) = 'On-Err-PCS goal get'
```

TABLE 3-continued

```
                    Write( 6, *) 'Feedback exit due to measured var not availa
                    write(6,*)' ACS Block: ',block,' at: ',Character_now
                      Return
                    End If
C
C...Measured Value is ACS block goal
C
             Else If ( Meas_var_type .eq. ACS_block_goal ) Then
                  ACS_status = ACS_get_goal (
             1             Meas_var_num , Measured_value )
                  If ( ACS_Status .ne. %loc(ACS_success) ) Then
C............If ACS goal Value not available, don't execute
                    Block_status(Block) = 'On-Err-ACS goal get'
                    Write( 6, *) 'Feedback exit due to measured var not avai
                    write(6,*)' ACS Block: ',block,' at: ',Character_now
                      Return
                    End If
C
C...Measured Value is Vantage variable
C
             Else If ( Meas_var_type .eq. cur_val_Van_var ) Then
                  Van_Status = Vss$g_current( Meas_var_num ,
             1             Measured_value )
                  If ( Van_Status .ne. %loc(vss_normal) ) Then
C...........If Variable Value not available, don't execute
                    Block_status(Block) = 'On-Failed Msrd var '
                    Write( 6, *) 'Feedback exit due to measured var not availa
                    write(6,*)' ACS Block: ',block,' at: ',Character_now
                      Return
                    End If
                  Van_status = Vss$g_curtime ( Meas_var_num ,
             1                                  Measured_time_stamp )
C
             End If
C
C....Check the Measured variable to see if it is within limits
C
             If ( (Measured_value .lt. Measured_min(block) ) .or.
             1        (Measured_value .gt. Measured_max(block) )        ) Then
C.....Reject the data point
                    Return
             End if
C
C...Test to see if the change in the measured value is less th
deadband
C
             Delta_meas = Measured_value - Old_measured_value(Block)
             If ( Abs( Delta_meas ) .lt.
             1                   Absolute_deadband(Block)         ) Then
                  Return
             End If
C
C...Special action for 'On-deselected' status - update old_meas_valu
exit.
C
             Old_measured_value(Block) = Measured_value
             If ( Block_status(Block)(1:13) .eq. 'On-deselected' ) Then
                  Return
             End If
C
C...Value is within limits - Compute Feedforward Response
C
             Delta_manip = Delta_meas * Proportional_gain(Block)
C
C...Test Delta_manip to see if too great
C
             If ( Abs(Delta_manip) .gt. Max_manip_delta(Block) ) Then
                  Delta_manip = Sign(Max_manip_delta(Block),Delta_manip)
             End If
C
C...Get the current manipulated value
C
             ACS_status = ACS_get_manip_var_sys ( Block , Manip_var_type )
             ACS_status = ACS_get_manip_var_num ( Block , Manip_var_num )
C
C...Target is TPA PCS loop goal
C
             If ( Manip_var_type .eq. PCS_TPA_Loop ) Then
                  ACS_status = ACS_get_pcs_goal( 'TPA         ',
             1       Manip_var_num , Current_manipulated_value , )
                  If ( ACS_Status .ne. %loc(ACS_success) ) Then
C............If PCS goal value not available, don't execute
```

TABLE 3-continued

```
                Block_status(Block) = 'On-Err-PCS goal get'
                Return
            End If
C
C...Target is DMT PCS loop goal
C
            Else If ( Manip_var_type .eq. PCS_DMT_loop ) Then
                ACS_status = ACS_get_pcs_goal( 'DMT       ',
        1       Manip_var_num , Current_manipulated_value )
                If ( ACS_Status .ne. %loc(ACS_success) ) Then
C.............If PCS goal value not available, don't execute
                Block_status(Block) = 'On-Err-PCS goal get'
                Return
            End If
C
C...Target is ACS block goal
C
            Else If ( Manip_var_type .eq. ACS_block ) Then
                ACS_status = ACS_get_goal ( Manip_var_num ,
        1                       Current_manipulated_value )
                If ( ACS_Status .ne. %loc(ACS_success) ) Then
C.............If ACS goal Value not available, don't execute
                Block_status(Block) = 'On-Err-ACS goal get'
                Return
            End If
C
C...Target is Vantage variable
C
            Else If ( Manip_var_type .eq.
        1                               Vantage_variable ) Then
                Van_Status = Geteuval ( Manip_var_num ,
        1                       Current_manipulated_value )
                If ( Van_Status .ne. %loc(vss_success) ) Then
C........... If Variable Value not availabl, don't execute
                Block_status(Block) = 'On-Err-Vant var get '
                Return
            End If
C
C...Target is Texas Instruments PM550 controller setpoint in CRD
C
            Else If ( ( Manip_var_type .ge. Low_PM550 ) .and.
        1               ( Manip_var_type .le. Hi_PM550 ) ) Then
C
                If ( Manip_var_type .eq. CRD_ESCHS_PM550_01 ) Then
                    ACS_status = TI_get_loop_setpoint ( 'TI_PM550_01_PORT',
        1           Manip_var_num , Current_manipulated_value )
                Else If ( Manip_var_type .eq. CRD_ESCHS_PM550_02 ) Then
                    ACS_status = TI_get_loop_setpoint ( 'TI_PM550_02_PORT',
        1           Manip_var_num , Current_manipulated_value )
                Else If ( Manip_var_type .eq. CRD_ESCHS_PM550_03 ) Then
                    ACS_status = TI_get_loop_setpoint ( 'TI_PM550_03_PORT',
        1           Manip_var_num , Current_manipulated_value )
                Else If ( Manip_var_type .eq. CRD_ESCHS_PM550_04 ) Then
                    ACS_status = TI_get_loop_setpoint ( 'TI_PM550_04_PORT',
        1           Manip_var_num , Current_manipulated_value )
                Else If ( Manip_var_type .eq. CRD_ESCHS_PM550_05 ) Then
                    ACS_status = TI_get_loop_setpoint ( 'TI_PM550_05_PORT',
        1           Manip_var_num , Current_manipulated_value )
                Else If ( Manip_var_type .eq. CRD_ESCHS_PM550_06) Then
                    ACS_status = TI_get_loop_setpoint ( 'TI_PM550_06_PORT',
        1           Manip_var_num , Current_manipulated_value )
                Else If ( Manip_var_type .eq. CRD_ESCHS_PM550_07) Then
                    ACS_status = TI_get_loop_setpoint ( 'TI_PM550_07_PORT',
        1           Manip_var_num , Current_manipulated_value )
                End If
                If ( ACS_Status .ne. %loc(TI_success ) Then
C.............If PM550 setpoint value not available. don't execute
                    Block_status(Block) = 'OnErr-TI setpnt get'
                    Write( 6, *)
        1               'Feedforward exit - TI PM550 Manip var not accessible
                    Write (6, *) ' ACS Block: ',block,' at: ',now_time
                    Return
                End If
            Else        ! Other Manip device type
            End If
C
C...Calculate new manipulated value, check to see it within limits
C
            New_manipulated_value = Current_Manipulated_value + Delta_mani
C
                If ( New_manipulated_value .gt. Manipulated_max(Block) ) Then
                    New_manipulated_value = Manipulated_max(Block)
```

TABLE 3-continued

```
              Else If ( New_manipulated_value .lt. Manipulated_min(Block) )
                   New_manipulated_value = Manipulated_min(Block)
              End If
              Delta_manip = New_manipulated_value - Current_Manipulated_valu
C
C... Transmit the New Manipulated Value to the manipulated variable
C
C...Target is TPA PCS loop goal
C
              If ( Manip_var_type .eq. PCS_TPA_Loop ) Then
                   ACS_status = ACS_put_pcs_goal( 'TPA          ',
     1                    Manip_var_num , New_manipulated_value )
                   If ( ACS_Status .ne. %loc(ACS_success) ) Then
C.............If PCS goal value not available, don't execute
                        Block_status(Block) = 'On-Err-PCS goal put'
                        Write( 6, *) 'Feedback exit due to failed manip var put.
                        Write(6,*)' ACS Block: ',block,' at: ',now_time
                        Return
                   End If
C
C...Target is DMT PCS loop goal
C
              Else If ( Manip_var_type .eq. PCS_DMT_loop ) Then
                   ACS_status = ACS_put_pcs_goal( 'DMT ',
     1                    Manip_var_num , New_manipulated_value )
                   If ( ACS_Status .ne. %loc(ACS_success) ) Then
C.............If PCS goal value not available, don't execute
                        Block_status(Block) = 'On-Err-PCS goal put'
                        Write( 6, *) 'Feedback exit due to failed manip var put.
                        Write(6,*)' ACS Block: ',block,' at: ',now time
                        Return
                   End If
C
C...Target is ACS block goal
C
              Else If ( Manip_var_type .eq. ACS_block ) Then
                   ACS_status = ACS_put_goal ( Manip_var_num,
     1                                       New_manipulated_value )
                   If ( ACS_Status .ne. %loc(ACS_success) ) Then
C.............If ACS goal Value not available, don't execute
                        Block_status(Block) = 'On-Err-ACS goal put'
                        Write( 6, *) 'Feedback exit due to failed manip var put.
                        Write(6,*)' ACS Block: ',block,' at: ',now_time
                        Return
                   End If
C
C...Target is Vantage variable
C
              Else If ( Manip_var_type .eq.
     1                                          Vantage_variable ) Then
                   Van_status = Puteugen ( Manip_var_num ,
     1                              New_manipulated_value )
                   If ( Van_Status .ne. %loc(vss_success) ) Then
C........... If Variable Value not available, don't execute
                        Block_status(Block) = 'On-Err-Vant var put'
                        Write( 6, *) 'Feedback exit due to failed manip var put.
                        Write(6,*)' ACS Block: ',block,' at: ',now time
                        Return
                   End If
C
C...Target is Texas Instruments PM550 controller setpoint in CRD
C
              Else If ( ( Manip_var_type .ge. Low_PM550 ) .and.
     1                ( Manip_var_type .le. Hi_PM550 ) ) Then
C
                   If ( Manip_var_type .eq. CRD_ESCHS_PM550_01 ) Then
                        ACS_status = TI_put_loop_setpoint ( 'TI_PM550_01_PORT',
     1           Manip_var_num , New_manipulated_value )
                   Else If ( Manip_var_type .eq. CRD_ESCHS_PM550_02 ) Then
                        ACS_status = TI_put_loop_setpoint ( 'TI_PM550_02_PORT',
     1           Manip_var_num , New_manipulated_value )
                   Else If ( Manip_var_type .eq. CRD_ESCHS_PM550_03 ) Then
                        ACS_status = TI_put_loop_setpoint ( 'TI_PM550_03_PORT',
     1           Manip_var_num , New_manipulated_value )
                   Else If ( Manip_var_type .eq. CRD_ESCHS_PM550_04 ) Then
                        ACS_status = TI_put_loop_setpoint ( 'TI_PM550_04_PORT',
     1           Manip_var_num , New_manipulated_value )
                   Else If ( Manip_var_type .eq. CRD_ESCHS_PM550_05 ) Then
                        ACS_status = TI_put_loop_setpoint ( 'TI_PM550_05_PORT',
     1           Manip_var_num , New_manipulated_value )
                   Else If ( Manip_var_type .eq. CRD_ESCHS_PM550_06) Then
                        ACS_status = TI_put_loop_setpoint ( 'TI_PM550_06_PORT',
```

TABLE 3-continued

```
    1          Manip_var_num , New_manipulated_value )
               Else If ( Manip_var_type .eq. CRD_ESCHS_PM550_07) Then
                  ACS_status = TI_put_loop_setpoint ( 'TI_PM550_07_PORT',
    1             Manip_var_num , New_manipulated_value )
               End If
               If ( ACS_Status .ne. %loc(TI_success) ) Then
C...........If PM550 setpoint value not available, don't execute
                  Block_status(Block) = 'On-Err-TI setpnt put'
                  Write( 6, *)
    1             'Feedforward exit - TI PM550 Manip var not puttable.'
                  Write (6, *) ' ACS Block: ',block,' a: ',now_time
                  Return
               End If
            Else ! Other Manip device type
            End If
C
C....Load special arrays for user programs to log messages.
C
               User_integer(1) = Measured_time_stamp
               User_integer(2) = Integer_now
               User_real(1) = Delta_manip
               User_real(2) = Delta_meas
               User_character(1) = 'Feedforward '
C
C...If Delta is non-zero, update past actions
C
            If ( Delta_manip .ne. 0 ) Then
               Do 90 J = 5,2,−1
                  Past_action_value(Block,J) = Past_action_value(Block,J-1)
   90             Past_action_time (Block,J) = Past_action_time (Block,J-1)
               Past_action_value(Block,1) = Delta_manip
               Past_action_time (Block,1) = Integer_now
            End If
C
C....Call User subprograms for this block
C
            Call User_programs(Block)
            Return
            End
```

Copyright (c) 1987 E. I. duPont de Nemours & Co., all rights reserved.

Statistical Filtering Blocks

FIG. 12 shows a sample of a template 812 presented to the user by the build-supervisor procedure to define a statistical filtering block. In the specific example shown, the block being worked on is block number one of the 200 available blocks 851, 852, etc., and the various data values shown in this Figure reflect the entries which have been made at some time to define this particular block.

The Shewhart block provides statistical filtering of a sampled measurement using Shewhart tests. The user specifies an aim value (field 1222 in FIG. 12) and a standard deviation (sigma) (field 1224 in FIG. 12) which characterizes the normal variability in the measurement. The Shewhart tests a series of rules to determine whether the sequence of measurements are statistically the same as ("on aim") or different from ("off aim") the normal variability with the average at the aim. After each test, the Shewhart block stores in the process database an estimate of the deviation from aim and a value indicating what rule was broken.

In the presently preferred embodiment, Shewhart blocks do not allow timing options to be specified. They perform their tests only when a new measurement is entered into the database for the filtered variable. In the presently preferred embodiment, the conditions tested for by the Shewhart block are:

Was the last point more than 3 sigma different from aim?

Were two of the last three points more than 2 sigma different from aim in the same direction?

Were four of the last five points more than 1 sigma different from aim in the same direction?

Were the last seven points all off aim on the same side of aim?

The rules are tested in the order shown. For the second and third rules, the test is first applied to the last two (or four) points in a row, then to the last three (or five) points. If any rule is violated, the process is off aim, and a deviation from aim is calculated by averaging the points which broke the rule. For example, if the last four points were outside the 1 sigma limit, the average of the four is taken as the deviation. If four of the last five points were outside the 1 sigma limits, the average of the last five points is taken.

The basic Shewhart action can be altered by several additional parameters. A fix time interval can be specified (in field 1226), so that, if one of the Shewhart tests shows a rule violation, Shewhart tests will be suspended for this interval after the time of the sample that violated the rule. This is useful in process control to allow control action in response to a rule violation to have time to move the process back to a statistically "on aim" position before taking any further actions. The range of calculated deviations can be limited, as specified by the data entered into fields 1228 and 1230. Screening limits can be applied to the filtered variable, so that measurements falling outside the range defined in fields 1232 and 1234 are ignored.

The Shewhart block differs from the feedback and feedforward blocks in that it requires resources outside of the supervisor procedure. It uses two process database variables to store its computed deviation from aim and its rule value. To configure a Shewhart block, in this sample embodiment, the user must get database variables allocated and properly configured. Since this is usually a database system manger's function, the details are not covered here.

Specifying a "Shewhart" (i.e. statistical filtering) block on the block setup selection form (FIG. 9) brings up the Shewhart block setup form shown in FIG. 12.

Parameters

The parameters shown on this form include:

Filtered variable type: a number code representing the software system and the type of entity which the block should use for the filtered variable.

Filtered variable number: the number of the entity within the specified system which the block will use for the filtered variable. For example, if the filtered variable type is a historical database variable, the filtered variable number is the number of the variable in the historical database. After the filtered variable type is entered, the label next to this field will show what type of data is needed. When the filtered variable number is entered, other fields will also be filled in: the name and units for the filtered variable, aim, and sigma; units and default values for the max and min filtered values. Since Shewhart block timing always keys off entry of new data into the filtered variable, only discretely sampled variable types can be used.

Deviation variable type: a number code representing the software system and the type of entity into which the block should store the computed value of deviation from aim.

Deviation variable number: the number of the entity within the specified system into the block will store the computed deviation from aim. For example, if the deviation variable type is a historical database variable, the deviation variable number is the number of the variable in the historical database. After the deviation variable type is entered, the label next to this field will show what type of data is needed. When the deviation variable number is entered, other information will be automatically filled in by the build-supervisor procedure; in the example of FIG. 12, region 1236 indicates the prestored designation of historical database variable 2084. Such automatically completed information will preferably include the name and units for the deviation variable; units and default values for the max and min deviation values. Since Shewhart blocks execute on entry of new data into the filtered variable, only discretely stored deviation variable types can be used.

Rule variable type: a number code representing the software system and the type of entity into which the block should store a number code indicating which rule was broken.

Rule variable number: the number of the entity within the specified system into the block will store a number code indicating which rule was broken. For example, if the rule variable type is a historical database variable, the rule variable number is the number of the variable in the historical database. After the rule variable type is entered, the label next to this field will show what type of data is needed. When the rule variable number is entered, the name and units for the rule variable will also be filled in. Since Shewhart blocks execute on entry of new data into the filtered variable, only discretely stored rule variable types can be used.

Aim: the "on aim" value of the filtered variable.

Sigma: the standard deviation of the value of the filtered variable when the measurement is "on aim".

Fix time: A time interval after rule violations during which no rule tests are done. New measurements entered during the fix time interval are ignored. The fix time is entered as a delta time character string: "ddd hh:mm:ss" where "ddd" is the number of days, "hh" is the number of hours, "mm" is the number of minutes, and "ss" is the number of seconds. The fix time is taken from the timestamp of the filtered variable value which caused the deviation to be identified. The timestamp of later samples is compared against this, and if the difference is less than the fix time interval the sample is ignored.

Switch system and switch number: these are described above.

Minimum and maximum value of the calculated deviation: limits on the allowed value of the calculated deviation from aim. Deviations outside this range are set equal to the closest limit.

Minimum and maximum value of filtered variable: Screening limits for reasonable values of the filtered variable. Any time the filtered variable value falls outside these limits, the value will be ignored and no action is taken.

Action log file: this field is described above.

Block Operation

In the presently preferred embodiment, the sequence of actions performed by the Shewhart block is:

If the block status is "On-deselected", to no further calculations.

Retrieve the last 7 values of the filtered variable. If not available, do no further calculations.

Check the last value of the filtered variable. If it is outside the allowed limits, do no further calculations.

Search backward through the stored values of the deviation variable for the most recent non-zero value. If a non-zero value is found within one fix time interval before the present instant, do no further calculations.

Compute the cutoff time=time of last non-zero deviation plus the fix time.

Initialize the deviation and rule values (to zero).

Begin testing Shewhart rules:

\* If the last point is older than the cutoff time, do no further calculations.

\* If the last point is outside the 3 sigma limits ( i.e. Abs(point-aim) is greater than 3 sigma), then:

Deviation=Last point−aim

Rule=1

Skip remaining rules.

\* If the second newest point is older than the cutoff time, Skip remaining rules.

\* If the last 2 points are both either greater than aim+2 sigma or less than aim−2 sigma, then:

Deviation=Sum(last 2 points)/2−Aim

Rule=3

Skip remaining rules.

\* If 2 out of the last 3 points are both either greater than aim+2 sigma or less than aim−2 sigma, then:

Deviation=Sum(last 3 points)/3−Aim

Rule=3

Skip remaining rules.
* If the last 4 points are all either greater than aim+-sigma or less than aim—sigma, then:

Deviation=Sum(last 4 points)/4—Aim

Rule=5

Skip remaining rules.
* If 4 of the last 5 points are all either greater than aim+sigma or less than aim—sigma, then:

Deviation=Sum(last 5 points)/5—Aim

Rule=5

Skip remaining rules.
* If all of the last 7 points are greater than aim or all less than aim, then Deviation=Sum(last 7 point)/7—Aim Rule=7

Skip remaining rules.
Check and store result:
* If the deviation is outside the allowable limits, set equal to the closest limit.
* Store the deviation value and rule value in the respective variables. These values are time stamped the same as the last filtered value.
If the deviation is non-zero, update past actions.
Call the user routine.

Of course, other statistical filtering methods could be used instead. It is generally realized that statistical filtering is highly advantageous, and that numerous algorithms can be used to accomplish statistical filtering. The Shewhart algorithm used in the presently preferred embodiment could be replaced by any of a wide variety of other known algorithms.

Sample Source Code

The source code for the procedure which actually performs this function, in the presently preferred embodiment, is as follows.

TABLE 4

```
C*******************************
C
C       Shewhart_block.for
C
C
C*******************************
C
        Subroutine Shewhart_block ( Block)
C
        Include 'ACS$includes:Block_parameters.inc/nolist'
        Include 'acs$includes:ACSserv.inc/nolist'
        Include 'acs$includes:ACSstatus.inc/nolist'
        Include 'ACS$includes:Van_functions.inc/nolist'
        Include 'ACS$includes:Filter_params.inc/nolist'
        Include 'ACS$includes:dev_params.inc/nolist'
        Include 'ACS$includes:rule_params.inc/nolist'
        Include 'AC$includes:User_vars.inc'
        Integer*4       Block
        Integer         Error_lun
        Parameter       ( Error_lun = 6 )
        Character*20    Store_time
        Character*20    now_time
C
        Integer*2       Filtered_variable
        Integer*2       Deviation_variable
        Integer*2       Rule_variable
        Integer*2       Filtered_variable_type
        Integer*2       Deviation_variable_type
        Integer*2       Rule_variable_type
        Integer*4       I4_deviation_variable
        Integer*4       I4_rule_variable
        Real*4          Aim
        Real*4          Sigma
        Integer*4       Integer_fix_time
        Integer*4       Cutoff_time
        Integer*4       Safe_time
        Real*4          Deviation
        Real*4          Rule
        Real*4          Last_filtered_value
        Logical         All_same_sign
        Logical         Need_violation
C
        Integer*4       Num_points
        Parameter       (Num_points = 7)
        Real*4          Point(Num_points)
        Integer*4       Times(Num_points)
        Character*18    Char_times(Num_points)
        Integer*4       Num_points1
        Parameter       (Num_points1 = 8)
        Real*4          Point1(Num_points1)
        Integer*4       Times1(Num_points1)
        Character*18    Char_times1(Num_points1)
        Real*4          Violation_value(1)
        Integer*4       Violation_time(1)
```

TABLE 4-continued

```
              Integer*4    Newest_time
              Integer*4    Oldest_time
              Integer*4    Buffer_size
              Logical*1    First_request
              Integer*4    Block_location
              Integer*4    Entry_count
              Integer*4    Begin_span_status
              Byte         Interp_flags
              Integer*4    Begin_span_time
              Integer*4    End_span_time
              Integer*4    Num_points_retrieved
              Integer*4    Integer_Now
              Integer*2    Start_point
C
C . . . Special case for 'On-deselected' status
C
              If ( Block_status(Block)(1:13) .eq. 'On-deselected' ) Then
                  Return
              End If
C
C . . . Set the value of the local variables
C
              ACS_status = ACS_get_filtered_var_type(Block,filtered_variable
              Filtered_variable = Measured_variable(Block)
              ACS_status = ACS_get_dev_var_type ( Block , deviation_variabl
     )
              Deviation_variable = Manipulated_variable(Block)
              ACS_status = ACS_get_rule_var_type ( Block , rule_variable_typ
              Rule_variable = New_manipulated_variable(Block)
              Aim = Goal(Block)
              Sigma = Absolute_deadband(Block)
              Integer_fix_time = Fix_time(Block)
C
              Van_status = Vss$_from_ascii_time ( ' ', Integer_now )
              Van_status = Vss$_to_ascii_time ( Integer_now , now_time )
d             Van_status = Vss$_to_ascii_time ( Integer_now , Store_time )
d             write(6,202) 'Calling Shewhart on var ',filtered_variable,'a
d             1 Store_time
d 202         format(//,a,'',i5,'',a,'',a)
C
C . . . Retrieve enough points to test all the rules
C
       If ( Filtered_variable_type .eq. Van_var_filter ) Then
C
              Newest_time = Integer_now
              Oldest_time = Newest_time - 365*24*60*60
              Buffer_size = Num_points
              First_request = .True.
              Num_points_retrieved = 0
              Start_point = 1
C
              Do 777 j = 1,Num_points
              Times(j) = 0
777           Point(j) = 0.0
C
              Van_status = %loc(vss_systemdown)
              Do While ( (Van_status .eq. %loc(vss_systemdown)) .or.
     1                    (Van_status .eq. %loc(vss_unavaildata)) )
c
              Van_status = Vss$_Retrieve ( Filtered_variable , Newest_tim
     1         Oldest_time , Buffer_size , Times(start_point) ,
     1         Point(Start_point) ,
     1         First_request , Block_location , Entry_count ,
     1         Begin_span_status , Interp_flags , Begin_span_time ,
     1         End_span_time )
              Num_points_retrieved = Num_points_retrieved + Entry_count
              If ( Num_points_retrieved .lt. Num_points ) then
                  Buffer_size = Buffer_size - Num_points_retrieved
                  Start_point = Start_point + Entry_count
              End If
d             write(6,*) 'Finished data retr.'
c
              End Do
c
d             do 11 J =1,Num_points
d  11         Van_status = Vss$_to_ascii_time ( Times(j) , Char_times(j))
d             Write(6,12) (Char_times(j),Point(j),j=1,num_points)
d  12         Format( /,'Here are the times and points:',//
d             1          ('',a18,'',f12.4 , / ) )
d             write(6,*) 'Got ',Num_points_retrieved,'points.'
              If ( Num_points_retrieved .lt. Num_points ) then
                  Write(Error_lun,*)
```

TABLE 4-continued

```
             1     'Shewhart Failed to get enough data on Variable ',
             1            Filtered_variable
                   write(error_lun,*)'from ACS block:',block,'at:',now_time
                   Write(Error_lun,*) 'Wanted ',Num_points,'; Got ',
             1            Num_points_retrieved
                   Return
             End If
d            write(6,*) 'Got enough points.'
C
C
C . . . Check the Measured variable to see if it is within limits
C
             Last_filtered_value = Point(1)
             If ( (Last_filtered_value .lt. Measured_min(block) ) .or.
             1       (Last_filtered_value .gt. Measured_max(block) )        ) T
C . . . Reject the data point
                   Write( 6, *) 'Shewhart exit due to out of limts filtered.'
                   write(6,*)' ACS Block: ',block,' at: ',now_time
                   Return
             End if
         Else if ( Filtered_variable_type .eq. Van_run_2_filter ) Then
C
             Newest_time = Integer_now
             Oldest_time = Newest_time - 365*24*60*60
             Buffer_size = Num_points1
             First_request = .True.
             Num_points_retrieved = 0
             Start_point = 1
C
             Do 1777 j = 1,Num_points1
                Times1(j) = 0
1777         Point1(j) = 0.0
C
             Van_status = %loc(vss_systemdown)
             Do While ( (Van_status .eq. %loc(vss_systemdown)) .or.
             1          (Van_status .eq. %loc(vss_unavaildata)) )
c
                Van_status = Vss$_Retrieve ( Filtered_variable , Newest_tim
             1     Oldest_time , Buffer_size , Times1(start_point) ,
             1     Point1(Start_point) ,
             1     First_request , Block_location , Entry_count ,
             1     Begin_span_status , Interp_flags , Begin_span_time ,
             1     End _span_time )
                Num_points_retrieved = Num_points_retrieved + Entry_count
                If ( Num_points_retrieved .lt. Num_points1 ) then
                   Buffer size = Buffer_size − Num_points_retrieved
                   Start_point = Start_point + Entry_count
                End If
d            write(6,*) 'Finished data retr.'
c
             End Do
c
d            do 111 J = 1,Num_points1
d     111    Van_status = Vss$_to_ascii_time ( Times1(j) , Char_times1(j))
d            write(6,112) (Char_times1(j),Point1(j),j=1,num_points1)
d     112    Format( /,' Here are the times and points:',//
d             1       (' ',a18,' ',f12.4 , /) )
d            write(6,*) ' Got ',Num_points_retrieved,' points.'
             If ( Num_points_retrieved .lt. Num_points1 ) then
                   Write(Error_lun,*)
             1     'Shewhart Failed to get enough data on Variable ',
             1            Filtered_variable
                   write(error_lun,*)'from ACS block:',block,' at:',now_time
                   Write(Error_lun,*) 'Wanted ',Num_points1,'; Got ',
             1            Num_points_retrieved
                   Return
             End If
d            write(6,*) 'Got enough points.'
C
C
C . . . Check the Measured variable to see if it is within limits
C
             Last_filtered_value = (Point(1)+Point1(2))/2.
             If ( (Last_filtered_value .lt. Measured_min(block) ) .or.
             1       (Last_filtered_value .gt. Measured_max(block) )        ) T
C . . . Reject the data point
                   Write( 6, *) 'Shewhart exit due to out of limits Filtered.'
                   write(6,*)' ACS Block: ',block,' at: ',now_time
                   Return
             End if
C
             Do j = 1,num_points                     ! running average
```

TABLE 4-continued

```
                  point(j) = (point1(j)+point1(j+1))/2
                  times(j) = times1(j)
              end do
        Else ! Improper filtered type
              Write( 6, *) 'Shewhart exit due to invalid filtered var type.'
              write(6,*)' ACS Block: ',block,' at: ',now__time
              Return
        End If ! Filtered types
C
C
C . . . Check to see if the last violation was within the Fix time -
C     If so, do no calculations.
C
C . . . Retrieve the last stored nonzero deviation from aim
C
        If ( Deviation__variable__type .eq. Van__var__dev ) Then
C
              Newest__time = Integer__now
              Oldest__time = Newest__time - 365*24*60*60
              Buffer__size = 1
              First__request = .True.
              Need__violation = .True.
              Do While ( Need__violation )
c
                  Van__status = Vss$__Retrieve ( Deviation__variable , Newest__ti
      1                    Oldest__time , Buffer__size , Violation__time ,
      1                    Violation__value ,
      1                       First__request , Block__location , Entry__count ,
      1                       Begin__span__status , Interp__flags , Begin__span__time ,
      1                       End__span__time )
c
              If ( ( Van__status .ne. %loc(vss__systemdown) ) .and.
      1            ( Van__status .ne. %loc(vss__unavaildata)) .and.
      1            ( Van__status .ne. %loc(vss__notallfound))       ) Then
c
                        Write(6,*)' Shewhart Violation retr - status vss__badva
                        write(6,*)' ACS Block: ',block,' at: ',now__time
c
                   Else If( Van__status .eq. %loc(Vss__badtime) ) then
                        Write(6,*)' Shewhart Violation retr - status vss__badt
                        write(6,*)' ACS Block: ',block,' at: ',now__time
c
                   Else If( Van__status .eq. %loc(Vss__badtime) ) then
                        Write(6,*)' Shewhart Violation retr - status vss__badti
                        write(6,*)' ACS Block: ',block,' at: ',now__time
c
                   Else If( Van__status .eq. %loc(Vss__badtimespan) ) then
                        Write(6,*)' Shewhart Violation retr - s
vss__badtimespan'
                        write(6,*)' ACS Block: ',block,' at: ',now__time
c
                   Else If ( Van__status .eq. %loc(Vss__badbuFsize) ) then
                        Write(6,*)' Shewart Violation retr - status vss__badbu
                        write(6,*)' ACS Block: ',block,' at: ',now__time
c
                   Else If( Van__status .eq. %loc(Vss__normal) ) then
                        Write(6,*)' Shewhart Violation retr - status vss__norma
                        write(6,*)' ACS Block: ',block,' at: ',now__time
c
                   Else If( Van__status .eq. %loc(Vss__nonefound) ) then
                        Write(6,*)' Shewhart Violation retr - status vss__nonef
                        write(6,*)' ACS Block: ',block,' at: ',now__time
c
                   Else If( Van__status .eq. %loc(Vss__nomoreonline) ) then
                        Write(6, *)' Shewhart Violation retr - s
vss__nomoreonline'
                        write(6,*)' ACS Block: ',block,' at: ',now__time
c
              End If
              WRite(6,*) ' Van__status = ',Van__status
              Van__status = Vss$__to__ascii__time ( Violation__time(1) , Stor
)
              Write(Error__lun,*)
      1         'Shewhart-couldn''t get a non zero deviation - exiting'
              write(6,*)' ACS Block: ',block,' at: ',now__time
              Write(Error__lun,*)
      1         ' Oldest violation got: ',Violation__value(1),' at ',Store__
              Return
        End If
        If ( ( Abs(Violation__value(1)) .gt. 1.0 E-10 ) .or.
      1              ( Violation__time(1) .lt.
      1                 (Times(7) - Abs( Integer__fix__time ))) ) Then
```

TABLE 4-continued

```
                      Need_violation = .False.
                End If
c
                End Do
            Else ! Improper deviation var type
                Write( 6, *) 'Shewhart exit due to invalid deviation var type
                write(6,*)' ACS Block: ',block,' at: ',now_time
                Return
            End If ! Get last deviation for allowed deviation types
c
d           Van_status = Vss$_to_ascii_time ( Violation_time(1) , Store_ti
d           write(6,*) ' Got a violation of ',Violation_value(1), ' at ',
d           1                       Store_time
C
C....Go through the shewhart Rules - any point older than the last vio
C    time + the fix time is not acceptable.
C
            Cutoff_time = Violation_time(1) + Abs(Integer_fix_time)
d           Van_status = Vss$_to_ascii_time ( Cutoff_time , Store_time )
d           write(6,*) ' Cutoff time is ', Store_time
            Deviation = 0.0
            Rule = 0.0
C
            If ( Times(1) .lt. Cutoff_time ) Return
d           write(error_lun,*) 'Testing 1 out of 1 rule.'
            If ( Abs(Pornt(1)-Aim) .gt. 3*Sigma ) Then
                Deviation = Point(1) - Aim
                Rule = 1.0
                Go To 1000
            End if
C
C... Test 2 in a row outside 2 sigma
C
            If ( Times(2) .lt. Cutoff_time ) Go To 1000
d           write(error_lun,*) 'Testing 2 out of 2 rule.'
            Sum_points = 0.0
            Num_out_high = 0
            Num_out_low = 0
            Do 2 J = 1,2
            Sum_points = Sum_points + Point(J)
            If ( (Point(J)-Aim) .gt. 2*Sigma ) Then
                Num_out_high = Num_out_high +1
            Else If ( (Point(J)-Aim) .lt. -2*Sigma ) Then
                Num_out_low = Num_out_low + 1
            End If
2           Continue
            If ( ( Num_out_high .eq. 2 ) .or.
     1            ( Num_out_low .eq. 2 ) ) Then
                Deviation = Sum_points/2 - Aim
                Rule = 3.0
                Go To 1000
            End If
C
C... Test 2 out of 3 outside of 2 sigma
C
            If ( Times(3) .lt. Cutoff_time ) Go To 1000
d           write(error_lun,*) 'Testing 2 out of 3 rule.'
            Sum_points = Sum_points + Point(3)
            If ( (Point(3)-Aim) .gt. 2*Sigma ) Then
                Num_out_high = Num_out_high +1
            Else If ( (Point(3)-Aim) .lt. -2*Sigma ) Then
                Num_out_low = Num_out_low + 1
            End If
            If ( ( Num_out_high .eq. 2 ) .or.
     1           ( Num_out_low .eq. 2 )    ) Then
                Deviation = Sum_points/3 - Aim
                Rule = 3.0
                Go To 1000
            End If
C
C... Test 4 in a row outside 1 sigma
C
            If ( Times(4) .lt. Cutoff_time ) Go To 1000
d           write(error_lun,*) 'Testing 4 out of 4 rule.'
            Sum_points = 0.0
            Num_out_high = 0
            Num_out_low = 0
            Do 3 J = 1,4
            Sum_points = Sum_points + Point((J)
            If ( (Point(J)-Aim) .gt. 1*Sigma ) Then
                Num_out_high = Num_out_high + 1
            Else If ( (Point(J)-Am) .lt. -1*Sigma ) Then
```

TABLE 4-continued

```
                    Num_out_low = Num_out_low + 1
                End If
3               Continue
                If ( ( Num_out_high .eq. 4 ) .or.
      1               ( Num_out_low .eq. 4 )        ) Then
                    Deviation = Sum_points/4 - Aim
                    Rule = 5.0
                    Go To 1000
                End If
C
C ... Test 4 out of 5 outside 1 sigma
C
                If ( Times(5) .lt. Cutoff_time ) Go To 1000
      d         write(error_lun,*) 'Testing 4 out of 5 rule.'
                Sum_points = Sum_points + Point(5)
                If ( (Point(5)-Aim) .gt. 1*Sigma ) Then
                    Num_out_high = Num_out_high +1
                Else If ( (Point(5)Aim) .lt. -1*Sigma ) Then
                    Num_out_low = Num_out_low + 1
                End If
                If ( ( Num_out_high .eq. 4 ) .or.
      1               ( Num_out_low .eq. 4 )        ) Then
                    Deviation = Sum_points/5 - Aim
                    Rule = 5.0
                    Go To 100
                End If
C
C ... Test 7 in a row - same side of aim
C
                If ( Times(7) .lt. Cutoff_time ) Go To 1000
      d         write(error_lun,*) 'Testng 7 in a row rule.'
                Sum_points = 0.0
                Sign_deviation = Sign( 1.0,(Aim-Point(1)) )
                If ( (Aim-point(1)) .ne. 0) Then
                    All_same_sign = .True.
                else
                    All_same_sign = .False.
                End if
                Do 4 J = 1,7
                    If ( (Aim-Point(J)) .eq. 0) Then
                        All_same_sign = .False.
                    Else If ( Sign( 1.0,(Aim-Point(J)) ) .ne. Sign_deviation )
                        All_same_sign = .False.
                    End if
4               Sum_points = Sum_points + Point(J)
                If ( All_same_sign ) then
                    Deviation = Sum_points/7 - Aim
                    Rule = 7.0
                    Go To 1000
                End If
C
1000            Continue
      d         write(6,*) 'Got deviation, rule of ',deviation,rule
C
C ... Clamp the deviation at allowed limits
C
                If ( Deviation .gt. Manipulated_max(Block) ) Then
                    Deviation = Manipulated_max(Block)
                Else If ( Deviation .lt. Manipulated_min(Block) ) Then
                    Deviation = Manipulated_min(Block)
                End If
C
C ... Store the Computed Deviation and Rule number with Timestamp
C
      d         Van_status = Vss$_to_ascii_time ( Times(1) , Store_time )
      d         write(6,*) 'putting var ',i4_deviation_variable,' at ',store_t
      d         1' with value ',deviation
      c
                If ( Deviation_variable_type .eq. Van_var_dev ) Then
                    I4 deviaton_variable = Deviation_variable
                    Dmt_status = Dmt$_putlab ( I4_deviation_variable , Times(1) ,
      1                         Deviation , 2 , .False. )
                Else ! Other deviation types
                End If ! Deviation types
      c
      d         write(6,*) ' Did putlabs -first status = ',dmt_status
      d         write(6,*) 'putting var ',i4_rule_variable,' at ',store_time,
      d         1' with value ',rule
      c
                If ( Rule_variable_type .eq. Van_var_rule) Then
                    I4 rule_variable = rule_variable
                    Dmt_status = Dmt$_putlab ( I4_rule_variable , Times(1)
```

TABLE 4-continued

```
                1           Rule , 2 , .False. )
        Else ! Other rule types
        End If ! Rule types
c
c               status = vss$__mehclose()           !close file just in ca
d               write(6,*) ' Did putlabs -second status = ',dmt__status
d               write(6,*) ' Did putlabs -exiting'
C
C . . . If Deviation is non-zero, update past actions
C
                If ( Deviation .ne. 0 ) Then
                    Do 90 J = 5,2,-1
                        Past__action__value(Block,J) = Past__action__value(Block,J-1)
      90                Past__action__time (Block,J) = Past__action__time (Block,J-1)
                    Past__action__value(Block,1) = Deviaton
                    Past__action__time (Block,1) = Times(1)
                End If
C
C . . . Load user arrays for user programs
C
                User__integer(1) = Integer__now ! Time of Tests
                User__integer(2) = Rule
                User__real(1) = Deviation
                Do J = 1 , Max ( Num__points , 18 )
                    User__integer(2+J) = Times(J) ! Time of samples used in test
                    User__real (2+J) = Point(J) ! Value of samples used in tes
                End Do
                If ( Rule .eq. 0.0 ) Then
                    User__character(1) ='On aim, No rules broken '
                    User__character(2)= 'On aim, No rules broken.'
                Else If ( Rule .eq. 1.0 ) Then
                    User__character(1) = 'Shewhart 1 out of 1 rule'
                    User__character(2) = 'Shoe heart 1 out of 1 rule'
                Else If ( Rule .eq. 3.0 ) Then
                    User__character(1) = 'Shewhart 2 out of 3 rule'
                    User__character(2) = 'Shoe heart 2 out of 3 rule'
                Else If ( Rule .eq. 5.0 ) Then
                    User__character(1) = 'Shewhart 4 out of 5 rule'
                    User__character(2) = 'Shoe heart 4 out of 5 rule'
                Else If ( Rule .eq. 7.0 ) Then
                    User__character(1) = 'Shewhart 7 in a row rule'
                    User__character(2) = 'Shoe heart 7 in a row rule'
                End If
C
C . . . Call User routine
C
                Call User__programs ( Block )
                Return
                End
```

(Copyright (c) 1987 E. I. duPont de Nemours & Co., all rights reserved).

User-Defined Program Block

FIG. 13 shows the form which (in the presently preferred embodiment) is presented to a user who has chosen the "User program" option from the menu shown in FIG. 9.

The user program block provides a means of controlling the execution of a user written FORTRAN subroutine. The block itself performs no control actions, but allows the user to specify a timing option and switch parameters for executing the block's user routine. A user routine exists for every block in the supervisor procedure. (In the example shown in FIG. 13, where the block shown is block number 2, the block will (selectively) make calls to BLOCK2_USER_ROUTINE.) Initially these routines (BLOCK-1_USER_ROUTINE, BLOCK2_USER_ROUTINE, BLOCK3_USER_ROUTINE, etc.) do nothing (i.e., their default content is merely the FORTRAN statements Return and End), but they can be modified by the user. The user program block only sets up parameters for controlling execution of the user program.

The user program timing options include keying off a measured variable. In this case the variable is not used for anything but timing. This option can be altered by specifying screening limits on the measured variable value (using fields 1332 and 1334), so that measured values outside the screening limits are ignored. Block timing and switching and the block description fields follow the general outlines given above.

Parameters

The parameters are:

Measured variable type: a number code representing the software system and the type of entity which the block should use for the measured variable.

Measured variable number: the number of the entity within the specified system which the block will use for the measured variable. For example, if the measured variable type is a historical database variable, the measured variable number is the number of the variable in the historical database. After the measured variable type is entered, the label next to this field will show what type of data is needed. When the measured variable number is entered, other fields will also be filled in: the name and units for the measured variable; units and default values for the max and min measured values.

Timing option, execution time interval, and Key block number: these parameters are described above.

Switch system and switch number: these are described above.

Minimum and maximum value of measured variable: These define screening limits for reasonable values of the measured variable. Whenever the measured variable value falls outside these limits, the value will be ignored and no action is taken.

Action log file: this field is described above.

Program Block Operation

The sequence of actions performed by a User program block is:

If block status is "On-deselected", do not execute the user routine.

If a measured variable is specified:

* Get the current value of the measured variable (If not accessible, set status to "On-err . . . " and do not execute the user routine).

* Test the value of the measured variable. If it outside the range of allowed values, set status to "On-msrd out of lims" and do not execute the user routine.

Execute the user routine. The routine name is derived from the block number. Block 1 calls Block 1_user_routine, block 199 calls Block199_user_routine, etc.

If a fatal error occurs in the user routine, bypass the rest of the routine, and set the block status to "On-Failed usr routin".

If the block failed on the last execution, but did not fail on this execution, set the block status to "On". Clear all the values in the user vars common block.

Build-User-Program Procedure

The build-supervisor procedure (in the presently preferred embodiment) also provides a structured environment for creating user programs. As will be described below, the build-expert procedure will create the source code for one or more customized expert systems; but the user must still insert a call to this expert code into one of the blocks in the supervisor procedure. The build-user-program procedure facilitates this, and also provides convenient support for sophisticated users who are able to write their own utilities.

In the presently preferred embodiment, this is a structured environment in which users can write FORTRAN subroutines and incorporate them into control blocks. User programs can be run as the only block function by defining a User Program block (as described above), or they can be used to take additional actions (such as message logging) in combination with feedback or feedforward control blocks.

At a minimum, a user with no programming knowledge can insert a one-line call into a user program block, to make use of an expert subprocedure created using the build-expert procedure. However, to take full advantage of the capability for user programming, the user should (in the presently preferred embodiment) already be comfortable programming in FORTRAN and using FORTRAN functions and subroutines, and in using the Vax EDT editor. The build-user-program environment 1810 in this embodiment is menu driven rather than forms driven, and therefore provides less online help than some of the other functions described.

Writing a basic user program involves 5 steps:

Selecting which block number's user program to edit;

Editing the file which contains the user program code for that block. The EDT editor 1812 is used to write and modify the FORTRAN language code;

Checking the code for errors in FORTRAN syntax;

Updating the supervisor procedure by incorporating the latest version of the user program into the base cycle procedure and running the new base cycle procedure; and Monitoring user program execution to assure that the program is executing properly.

In the example shown in FIG. 16, the top level build-supervisor menu permits the user to enter the build-user-program environment by pressing keypad 5. While in the build-user-program environment, the user can edit the block user routine; check the block user routine for errors in FORTRAN syntax; and update the supervisor procedure by incorporating the new version of the block user routine. The first prompt from the user program menu asks what block number's routine the user wants to work on. Entering the block number and pressing return brings up another program menu, with options which will now be described.

Editing the user routine begins by selecting menu option 1 ("Edit user routine"). This will start the EDT editor. User routines of some sort already exist for all the blocks. Blocks which have never had any special programming have a user routine which does nothing—it consists simply of a RETURN statement followed by an END statement, and, if the block's user routine has never been worked on, this default routine will b brought up by the editor. To make a functioning routine, the user must add FORTRAN code before tee RETURN statement to perform the desired function. (In the presently preferred embodiment, the user can simply edit the file like any other FORTRAN source code file on the VAX.) For example, code for logging messages or calling an expert subroutine can be inserted at this point.

Once the user has edited the user routine and returned to the menu, he can select option 5 to check for FORTRAN syntax errors. If the new routine has no FORTRAN syntax errors, the screen will show "The user's routine compiled with no errors in syntax." If the new coding has syntax errors, the user will see them reported on the terminal screen. The user can then correct the errors using Option 1 (edit), and repeat until all errors have been removed.

Once the user has a routine that compiles with no errors, he can include it in the running version of the supervisor procedure by using menu option 8 ("Update"). This will compile the user's routine, relink the base cycle procedure using the user's newly compiled routine, stop the procedure which is currently running, and restart the base cycle procedure using the newly linked version containing the user's new routine.

After compiling the user's routine, the build-supervisor procedure will ask if there are any other subroutines in separate files that need to be compiled. Some application my require more than one subroutine, and, if desired, they can be split up in separate files. To make a routine in a separate file, the user can select option 2 ("Edit a separate FORTRAN subroutine") to create and modify the file, and then select option 6 ("Check a separate subroutine for FORTRAN errors") to check for FORTRAN errors. To include the separate file into the supervisor procedure, the user can use the update option, then answer "Y:" when asked if any separate routines need to be compile and included. The base cycle procedure can then be linked, and then restarted.

After the user's routine has been incorporated into the base cycle procedure, the user can monitor it to make sure it executes properly. There are two key indicators of a problem with the user's user routine: the block status and the control program log file. If the user's routine has an error which would normally cause a stand-alone FORTRAN program to terminate, the base cycle procedure will bypass the error and the remainder of the user's routine, and change the block status to "On-Failed usr routin". This can be seen using the block monitoring screen. If the user's routine fails once but runs successfully on a subsequent execution, the block status will be changed to "On-Recovrd Usr Error", and a message will be posted in the control program log file indicating which user routine had the error, when it occurred, and what the error was. The log file can be viewed using the "List log file" option on the System functions screen.

The user can print a listing of a user routine by using option 3 (or option 4 for a separate routine).

If the user's user routine fails and the user needs to retreat to the last version that was running, he can use the restore option (keypad 9). This will prompt the user for any separate routines that need to be restored, and retrieve the old versions saved by the build-supervisor procedure.

In the presently preferred embodiment, there are several include files which can be used in user routines: "User_vars.inc" contains a common block which is used to pass information about control block actions to user routines. The common block contains a Real array, an integer array, and a character*80 array. Control blocks load values into these arrays for the amount of change made in the manipulated variable, the error in a feedback block, the time the action was taken, etc. The user program block zeros out these values after the user routine executes a RETURN statement. "ACSserv.inc" declares all the ACS service routines (which are integer*4 functions). "ACSstatus.inc" declares all the legal ACS status return values. These values must be declared external before they can be used. "Van_functions.inc" declares some of the retrieval and time functions from the historical process database, and declares some of the status return values.

Of course, many different computer languages and architectures cold be used in practising the present invention: the sample FORTRAN routines specified (as well as other features which, for example, relate specifically to the use of a VMS operating system) simply sets forth the best mode as presently practiced, but a tremendous variety of other languages, operating environments, and/or hardware could be used instead.

Block-Handling Utilities

Figure 14:
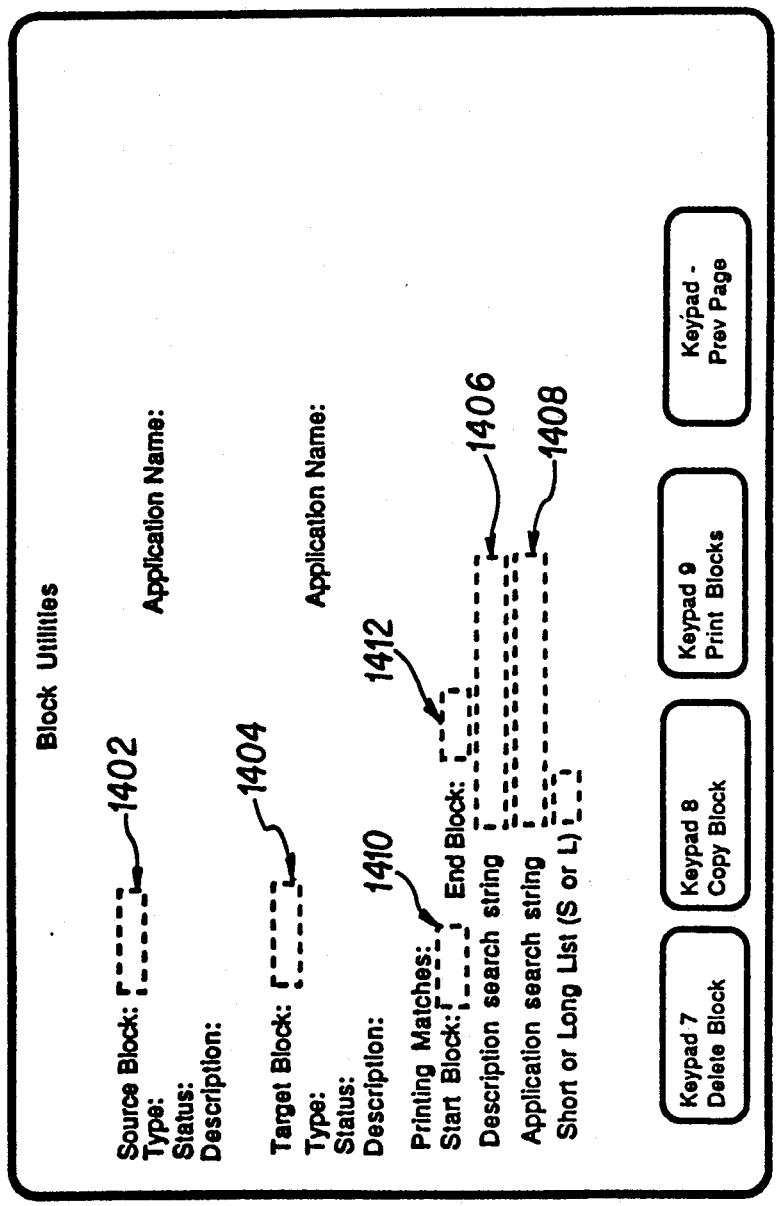
FIG. 14 shows a block-editing utility menu presented to the user, in the presently preferred embodiment, by the build-supervisor procedure.

FIG. 14 shows a menu which is preferably presented t a user who has elected to use the utilities provided in the build-supervisor procedure (e.g. by hitting keypad 9 when faced with the menu shown in FIG. 16). While these utilities are not necessary parts of every implementation of the innovative concepts described in the present application, they do help users to take advantage of the full power available.

In the presently preferred embodiment, the supervisor procedure includes the capabilities for copying and deleting blocks, and for printing listings of block setup parameters. Deleting a block (Keypad 7) removes all the block type and setup parameter data for the block, leaving it available for another use. Coping a block (Keypad 8) reproduces the block type and setup parameters of one block into another. Printing blocks (Keypad 9) allow the user to select blocks to be printed either by number range or by searching for string matches in the application name or block description fields, and makes full or abbreviated listings of block parameters data on the printer of the user's choice.

If the user elects to copy a block, the build-supervisor procedure prompts the user to enter in the "Source block" field 1402 the number of the block to copy. The build-supervisor procedure then fills in the information fields appropriately for that block, allowing the user to confirm that he has entered the right block number, and prompts the user again for the target block into which the block should be copied (field 1404). After this is entered the build-supervisor procedure fills in the information fields for the target block, and prompts the user again. When the user confirms that the block is to be copied, the block type and parameters are overwritten in the shared memory 814. After the block is copied, the build-supervisor procedure prompts the user again, asking whether the source block should be deleted or left unchanged. The build-supervisor procedure confirms that the source block was either deleted or not deleted.

Block information can only be copied into target blocks whose status is "Off" or "Inactive". To copy information into a block with an active status, the user must go to the block setup form for that block, and toggle the block off. This safeguard provides greater system integrity.

In the presently preferred embodiment, keypad 9 will initiate printing a listing of selected block parameters. The build-supervisor procedure will prompt the user to enter in field 1410 for the starting range of bloc numbers to print, or to hit return if he wishes to select blocks by string searches. To print a range of block numbers, the user can enter the lowest number block in the range, press return, then enter the higher number block (in field 1412) and press return. To select the blocks to be printed by search for string matches, the user can press return without entering a number for the starting block. To search tee block description fields, the user can enter the desired string in the description search string field 1406. To search the block application name field, the user can press return without entering anything in the description field, and enter the desired string when prompted in the application name field 1408. In either case, the user can use capital and lower case letters interchangeably, since case is not checked in the string searches. The user need not fill in the whole search string field. A block will be selected to print if the string the user enters appears anywhere in the searched field.

The build-supervisor procedure will now prompt the user for a short or long list. A short list shows only the block number, type, description, and application name. A long list shows the entire setup form for that block. The build-supervisor procedure will clear the screen and prompt the user for the printer he wishes to use. The user can type the number of the printer if he knows it, or enter L to get a list of printers to choose from. The user's terminal screen and its attached printer can be selected, as well as Vax system printers. When the print job is completed, the build-supervisor procedure will report the number of blocks that were printed.

Monitoring

In addition, the supervisor procedure provides several functions for following the performance of control strategies as they operate. The block monitoring screen allows the actions of individual blocks to followed. The system functions screen shows the status of the supervisor procedure. The control system runs as a batch-type process on the Vax, and so it has a log file which contains all the error messages generated by the system.

A user who requests block-monitoring is presented with a block description form which includes a block number field in which he can insert the number of the block to be monitored. The remaining fields on the form then are filled in appropriately by the build-supervisor procedure, and are subsequently updated every 5 seconds. The information shown includes:

the current time;

the time at which the supervisor base cycle procedure will make its next scan through the blocks (and blocks which are due to execute will be executed);

the block type (which was specified during block setup, e.g. feedforward, feedback, etc.);

the block description (which was entered during setup);

the type, number, name and units of the measured variable which was specified in block setup (if none was specified (e.g. in a program block), this field will be blank);

the current value and time stamp of the measured variable (the time stamp for compressed variables is the time the last new value was received; for manual entry variables it is the time stamp of the last entered value; and if no measured variable was specified, this field is blank);

the goal value for feedback blocks (for other block types, this field is empty);

the number, name, units and type of manipulated variable;

the current value of the manipulated variable (with time stamp if one has been defined);

the timing option entered during block setup;

the execution time interval specified during block setup. If the block timing does not include any fixed frequency, this field is blank.

the time the block last did its scheduled actions (this is normally the last time the block was scheduled to execute according to its timing option parameters, regardless of whether the block acted to change the manipulated variable);

the current status of the block; and the last five control actions made by the block (or, for Shewhart blocks, the last five deviation values) and the times at which they occurred.

In the presently preferred embodiments, a similar overhead function permits the user to take a look at the current status of key system parameters, including:

Base scan interval: the time interval at which the base cycle procedure scans through all the properly configured blocks, checking for changes in the on/off status, testing each according to its timing option and status to determine whether it should execute, and executing those that are due to execute.

Next base cycle time: the time at which the supervisor procedure will actually do the ext scan. This time should always be in the future, and should never be more than the base scan interval away.

Current system status: provides information about what the supervisor procedure system is currently doing. Since the supervisor procedure only does its actions once every base san interval, the system spends most of its time sleeping—i.e. waiting for the next cycle time to come. The normal system status values are:

* Running-Sleeping: the normal status value. All control actions on the last scan have completed and the system is waiting for the next scan.

* Running-Computing: the system is currently performing block checks and executing blocks. Since calculations in the supervisor procedure finish rather quickly, this status will rarely be seen.

* Terminated normally: This status indicates that the supervisor procedure system has been stopped in an orderly way. Normally this status value will only be seen if the system manager has stopped the system, or briefly when a user performs the Update function on the user program menu.

An authorized user can change the base scan interval, stop the supervisor process (together with any auxiliary processes used for communication with PCS or other control systems), restart the supervisor process (and any auxiliary processes), or view the log file to which the base cycle procedure writes error reports and messages.

Block Initialization

Blocks are initialized when they are first turned on, or when the supervisor procedure is restarted after an outage of 30 minutes or more and the block had already been on. Block initialization sets the "last execution time" of the block to the current time. The "las execution time" value is used in fixed interval timing and also as a block monitoring parameter. If the block has a measured variable, the "last measured time" is set equal to the current time of the measured variable. This parameter is used when block timing is keyed off the measured variable. If the block timing is set to key off another block, tee key block time is set equal to the last execution time of the key block. For feedforward blocks, the "old measured value" is set equal to the current value of the measured variable.

Build-Expert and Expert Procedures

The procedures for constructing an expert system from a domain expert's knowledge will now be described, together with the procedures by which the expert system is called up by the operating software (preferably the process control supervisor procedure, as described above).

It should be noted that the structures and advantages of the build-expert procedure are not entirely separate from those of the expert procedure (or procedures) generated thereby. The two procedures are preferably operated separately, but they are designed for advantageous combination. The features of the expert procedure are partly designed to advantageously facilitate use of the build-expert procedure, and the features of the build-expert procedure are partly designed to advantageously facilitate use of the expert procedure.

The build-expert procedure works especially advantageously as an integral part of the supervisor procedure, which (in the presently preferred embodiment) is a VAX-based layered control system. The build-expert procedure produces complete FORTRAN subroutines that execute the expert actions. The supervisor procedure (e.g. via a user program block) provides the functions for running an expert subroutine at specified times, and also provides callable routines that can be used by these subroutines to make and modify supervisor actions. The build-expert procedure can be used without the preferred supervisor procedure, but the user must provide a host program running at appropriate times to call the subroutines.

Preferred Menu Structure

Figure 17:
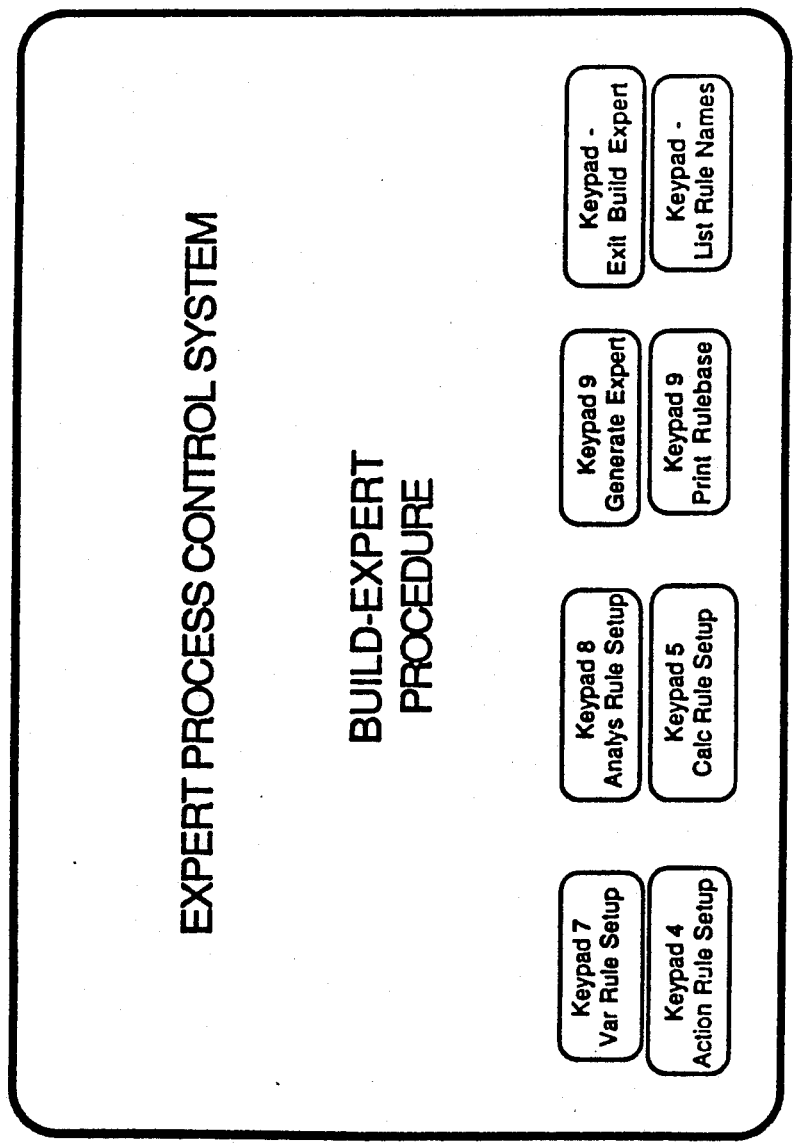
FIG. 17 shows a menu which is the top-level menu within the build-expert procedure.
Figure 18:
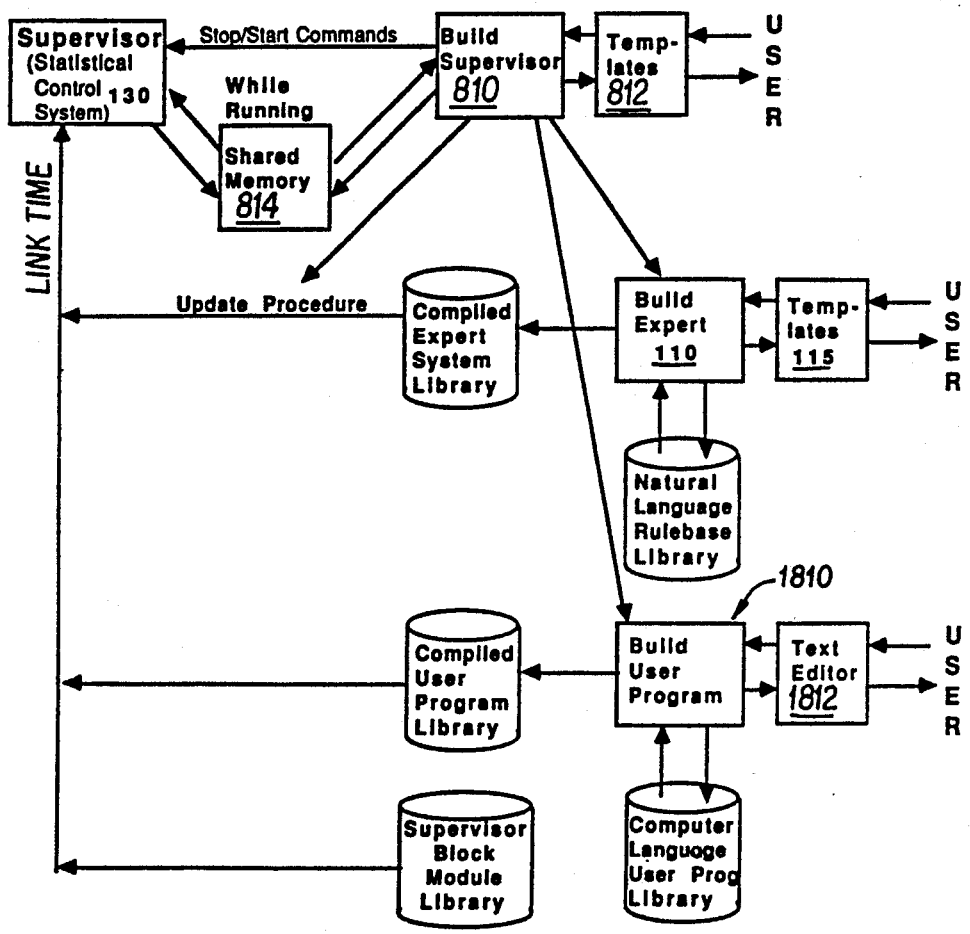
FIG. 18 is another schematic representation of the interrelations among the various procedures which permit user customization of functionality.

In the presently preferred embodiment, the build-expert procedure is accessed by selecting the "User program" option on the top-level menu in the build-supervisor procedure (see FIG. 16), entering the desired block number, and then selecting the Expert system development option on the user program menu. This will take the user to the build-expert procedure, which (in the presently preferred embodiment) presents a menu as shown in FIG. 17.

From this menu the user can access setup templates for the 3 rule types. The user also has access to functions for printing the rulebase, and for building a new expert subroutine.

The rule templates used in the build-expert procedure allow the user to enter and modify the specification information for rules. The build-expert procedure is different from the build-supervisor procedure in the way it handles data. When a rule name is entered in the build-expert procedure and the RETURN or TAB key pressed, the letters are capitalized an the embedded spaces are transformed to underscores. This is how the build-expert procedure stores all character data. The other fields on rule templates are not transformed like this until the rule is stored. When the rule is recalled onto the template, the other fields will be capitalized with embedded blanks changed to underscores. In the presently preferred embodiment, the rule name, data type, and data number fields are the only fields on the rule templates for which the user's entry is checked immediately (others may be modified in the future to do this). The remaining fields can be filled in with any data that the template allows (some fields accept only integers, some only alphabetics, etc). The data on the remaining fields is tested only when the user presses the keypad "-" to store the rule. The build-expert procedure then examines the data for errors, and requests corrections if needed. The build-expert procedure always checks rule names (and condition names) to be sure they are valid and meaningful where entered. In the presently preferred embodiment, the build-expert procedure checks other data for most errors, but it does not check for all conceivable errors. Data entered on a rule template is NOT stored until the keypad "-" key is pressed to store the rule. Data on a template will not be stored if the rule name field is blank. Data on a template an be lost if the user enters the data, teen modifies the rule name field before pressing keypad "-". All the rule template have a "delete rule" (keypad "-") and "top of form" (keypad 9) softkey. The delete rule key will ask the user to confirm the deletion by pressing the key again, and then deletes the rule from the rulebase. The top of form key simply takes the user to the top of the template.

After all the rules have been entered, the FORTRAN expert subroutine must be generated using keypad 9, "Generate Expert". Changes made in the rules will not become effective until the expert is rebuilt. When the build-expert procedure is used within the build-user-program environment (as discussed above), the FORTRAN subroutine is generated in the same directory with the user program and is named Blockn_expert_system.for, with the subroutine name Blockn_expert_system (n is the number of the block being worked on.) To use the expert from within the supervisor procedure, a one line user program must be written to call the expert. The one executable line is:

Call Blockn_expert_system.

Standardized Data Interface

The build-expert procedure uses a standard data interface. In the presently preferred embodiment, data sources are specified by a pair of integer parameters. One, the "data type", is a coded value which identifies the type of data desired and the data collection system from which the data is to come The second, the "data number", identifies the specific data entity of that type within that system. Some data types (e.g. time averages) require a third parameter specifying the time over which to average.

This system has several advantages. First, it provides a simple method of data identification in a many-system environment. Secondly, it allows the rules to easily reference data of many types from many diverse (and possibly remote) sources without requiring the user to write any custom program code for data retrieval. Some useful data sources might include: any lower level process control system; any supervisor process (whether running on the same hardware system or another); any process database (whether running on the same hardware system or another); of any computer which collects or generates data ("computer" being defined very broadly to include, e.g., any system which includes a microprocessor, such as a microprocessor based single loop controller).

In the presently preferred embodiment, the data types allowed by the build expert procedure are: (1) the latest value of a database variable; (2) a time weighted average over a given time interval of the value of a database variable; (3) a simple average over a given time interval of the discrete data values of a database variable; (4) the feedback error of a feedback block in the supervisor process; (5) the change in the value of the measure variable of a supervisor feedforward block since the last time the block acted; (6),(7) the goal values of control loops in two particular lower level control systems; (8) the second most recent value of a discretely sample process database variable (9),(10) the maximum and minimum limits for the manipulated variable value in a supervisor control block. Other sources could be used, for example any kind of parameter from any of the systems named in the previous paragraph, or system lexical functions (such as the system clock). As a further alternative, it might also be advantageous in some embodiments to make one of the options here a one-line blank, in which the user could enter a pointer to a callable procedure to fetch a variable value.

In the presently preferred embodiment, the user must specify the data type before the data number. When the data type is entered, a prompt line pops up on the template indicating the specific data type, which aids the user in entering the proper value for the data number. When the data number is entered, it is tested to be sure it is a meaningful entry for the data type specified. Some additional information is then displayed (such as a variable name and its units) to aid the user in confirming his input. These fields also serve to aid understanding of rule function and meaning when recalled for review or modification.

Constructing the Expert System

An expert system goes through four steps in using knowledge: (1) The expert gets information from the outside world; (2) analyzes that information using its rules; (3) deduces the correct conclusion from its analysis; (4) communicates its decision to the outside world.

Rules state that WHILE on thing is true THEN something else must be true. For example, WHILE the composition of water in the Feed mix drum is greater than 12%, we say "FEED MIX WATER COMPOSITION" is "HIGH". Or, WHILE "FEED MIX WATER COMPOSITION" is "HIGH", AND "DEHY COLUMN BOTTOMS WATER" is "HIGH", we say "TOTAL SYSTEM WATER" is "TOO HIGH". WHILE "TOTAL SYSTEM WATER" is "TOO HIGH", we "Give a high water warning message."

This simple example shows the three basic types of rules which are used in the build-expert procedure: the sample retrieval rule described tests the VALUE (12%) of a process measurement (FEED MIX WATER), and assigns a value (HIGH, LOW, etc.) describing the condition of the measurement. The sample analysis rule given tests for combinations of values defined by other rules. If it finds the combination, the analysis rule creates a new condition (TOTAL SYSTEM WATER) and assigns a value (TOO HIGH) describing that condition. The sample action rule described tests for one specific condition (TOTAL SYSTEM WATER) has one specific value (TOO HIGH), and takes a specified action (Give a high water warning message).

Sample Expert System

An example of construction of an expert system using novel methods and system as set forth in the resent application will now be described in detail. The sample system here chooses an optimum control action from among three possibilities. A key element of the problem here is to control the composition of by-product MFB in the product stream of a refining train like that shown in FIG. 7. MFB is separated in two columns in series. Essentially equivalent response in MFB composition can be achieved by changing the steam flow to either column. Both columns use high value steam in their reboilers. The first, the Xylene column, dumps the team energy to cooling water. The second column, the MFB column, recovers most of the energy by generating steam overhead. Equipment limitations constrain both steam flows to within high and low limits.

As column feed rate varies, steam loading can change from minimum steam on both columns to maximum steam on both columns. The optimum operation maximizes steam on the low cost column (MFB) and minimizes steam on the high cost column (XYL).

In this example, control of the MFB composition is done statistically. The laboratory measurements of MFB are statistically tested using Shewhart tests. The Shewhart tests determine the on aim status of MFB: Off aim high, Off aim low, or on aim. When MFB is off aim, the Shewhart test generates an estimate of how far off aim MFB is. This estimate can be used to compute the feedback action needed to bring MFB back to aim: off aim high requires an increase in steam to the two columns, off aim low requires a decrease.

The expert system which is sought to be developed should instruct the supervisor procedure to make the least cost control action. Plant startup, problems, or poor manual operation may distribute steam in a non-optimal way, and this cannot be known beforehand. The objective will be to move toward the optimum steam distribution through control action response to off aim conditions. Steam will not be shifted for cost saving only, since this complicates control and may negatively affect quality.

Although this may seem like a trivial decision, it actually involves considering 3 variables in the correct sequence. This is where the "expertise" gets into the "expert" system. Developing the logic is the task of the human expert, and the system disclosed herein merely expedites the transfer of that logic into the expert system. The process control decision tree which will be implemented, in the sample embodiment described, is as follows: First, decide whether to add or cut steam:
(1) If adding steam:
 (1.1) First check the MFB column. If MFB column steam below maximum, add steam here.
 (1.2) If the MFB column steam is maximum, then
  (1.2.1) Check the Xylene column. If xylene column steam is below the maximum, add steam here.
  (1.2.2) If xylene column steam is maximum, the user cannot add steam. To get MFB on aim, feed to the column must reduced. Cut column feed.
(2) If cutting steam:
 (2.1) First, check the xylene column. If xylene column steam is above tee minimum, cut steam here.
 (2.2) If xylene column steam is minimum, then
  (2.2.1) Check the MFB column. If MFB columns steam is above minimum, cut steam here.
  (2.2.2) If MFB column steam is minimum, the user cannot cut steam. To get MFB on aim, Feed to the column must be increased. Add column feed.

It is highly desirable that the decision tree being implemented should cover all the possible cases, and that the conclusions should be mutually exclusive. If it does not cover all the possible cases, the expert will sometimes be unable to come to a conclusion. If the conclusions are not mutually exclusive, then more than one conclusion could exist. Although this might logically be possible, this condition might mean unpredictability as to which conclusion will be reached, so that there would not be a reproducible basis for action.

Domain experts, in performing the analytical steps which the expert system should ideally emulate, will carry out many steps implicitly; but implementing a process in a computer requires that each step be expressly spelled out. To make the decision, the user must first specify:

what measurements will be used to evaluate the process condition (in this example, MFB_STEAM, XYL_STEAM, DIRECTION_OF_CHANGE);

what ranges of values of the measurements (e.g. 40>XYL_STEAM) match what status values for the measurements (e.g. MID_RANGE);

what combinations of status values (e.g. MFB_STEAM is MAX and XYL_STEAM is MIN, and DIRECTON_OF_CHANGE is ADD) will result in what other conditions (e.g. ACTION is CHANGE_XYL_STEAM);

what must be done to make the desired action happen.

The detailed specifications needed to handle this problem are defined as follows:

Measurements: For MFB column steam, the goal on the computer loop for MFB steam is a good measure. In the sample system referred to, this is loop 3 in the "DMT PCS" system. For xylene column steam, the goal on the computer loop is a good measure. In the sample system referred to, this is loop 5 in the "DMT PCS" system. For the direction of change, the best measure is the feedback error on the control block that will be changing steam (in this case, the third block in the supervisor procedure). For MFB column steam, we know the operating limits of steam flow to the column (in thousands of pounds per hour (MPPH)):

MAX>49.5;

MIN<28.5;

MID>28.5<49.5.

And for the xylene column:
MAX>66.5

MIN<40.5

MID>40.5<66.5.

For the direction of action, we know that an off aim high condition means a steam increase. Our feedback block (in the supervisor procedure) is using the Shewhart deviation from aim as the measured variable, with an aim of 0.0. Thus if the feedback error is positive, we increase steam:

ADD if Feedback error>0

CUT if Feedback error<0 or =0

For the analysis of these conditions, we need to specify what combinations of conditions lead to what result. This expert provides only one result: it defines what the manipulated variable will be—xylene column steam ("xyl_col_steam"), MFB column steam ("MFB_col_steam"), or column feed ("column_feed". This logic results in the following rules:

TABLE 5

MANIPULATED_VARIABLE is MFB_COLUMN_STEAM While
Direction_of_change is ADD
and MFB_COL_STEAM is not MAX
MANIPULATED_VARIABLE is XYL_COLUMN_STEAM While
Direction_of_change is ADD
and MFB_COL_STEAM is MAX
and XYL_COL_STEAM is not MAX
MANIPULATED_VARIABLE is COLUMN_FEED While
Direction_of_change is ADD
and MFB_COL_STEAM is MAX
and XYL_COL_STEAM is MAX
MANIPULATED_VARIABLE is XYL_COLUMN_STEAM While
Direction_of_change is CUT
and XYL_COL_STEAM is not MIN
MANIPULATED_VARIABLE is MFB_COLUMN_STEAM While
Direction_of_change is CUT
and XYL_COL_STEAM is MIN
and MFB_COL_TEAM_is not MIN
MANIPULATED_VARIABLE is COLUMN_FEED While
Direction_of_change is CUT
and XYL_COL_STEAM is MIN
and MFB_COL_STEAM_is MIN Note that: (1) some of the conditions are negated, i.e. it is specified that a rule or condition must NOT have a certain value (MFB_COL_STEAM is NOT_MIN). (2) More than one test can set the value of the same condition (MANIPULATED_VARIABLE in this case). (3) More than one test can assign the same value to the same condition (i.e. the second and fourth both set MANIPULATED VARIABLE to XYL_COL_STEAM, under different conditions). By contrast, the retrieval rules each assign one of several descriptors to a name which is unique to that specific rule.

Finally, the expert must do something with its conclusion to change the way the supervisor acts. In this case, assume that there are three feedback blocks in the supervisor procedure, all having the Shewhart MFB deviation as measured variable, with aims of 0.0. One (#3) manipulates xyl_COL_steam, one (#4) MFB_column steam, and one (#5) column feed rate. The supervisor procedure includes a FORTRAN callable function named ACS_SELECT_BLOCK, which allows only one block out of a set to take action. The others are "de-selected" and stand ready to act if selected. When ACS_select_block is called, the first block number in the argument list becomes selected, the others are deselected. Trailing zeros are ignored.

Thus, to enable the expert being built to change the control strategy, the following rules are added to the rule set:

While MANIPULATED_VARIABLE is XYL_COL_STEAM
Then do the FORTRAN statement:
ACS_status = ACS_select_block ( 3, 4, 5, 0, 0, 0 )
While MANIPULATED VARIABE is MFB_COL_STEAM
Then do theFORTRAN statement:
ACS_status = ACS_select_block ( 4, 3, 5, 0, 0, 0 )
While MANIPULATED VARIABLE is COLUMN FEED
Then do the FORTRAN statement:
ACS_status = ACS_select_block ( 5, 3, 4, 0, 0, 0 )

The foregoing data entries are all the inputs needed to define the expert system.

Within the supervisor procedure, an expert system can be developed for each block. Used in this way, the build-expert procedure will create the FORTRAN subroutine Blockn_expert_system (where n is the block number, i.e. the subroutines will be named BLOCK2_EXPERT_SYSTEM etc.), compile it, and place it in the proper library so that it can be called from within a supervisor block (by a user routine).

Expert Rule Structure

This sample embodiment provides an example which may help clarify what an expert procedure does. Some more general teachings regarding expert system methods and structure will now be set forth.

Figure 2:
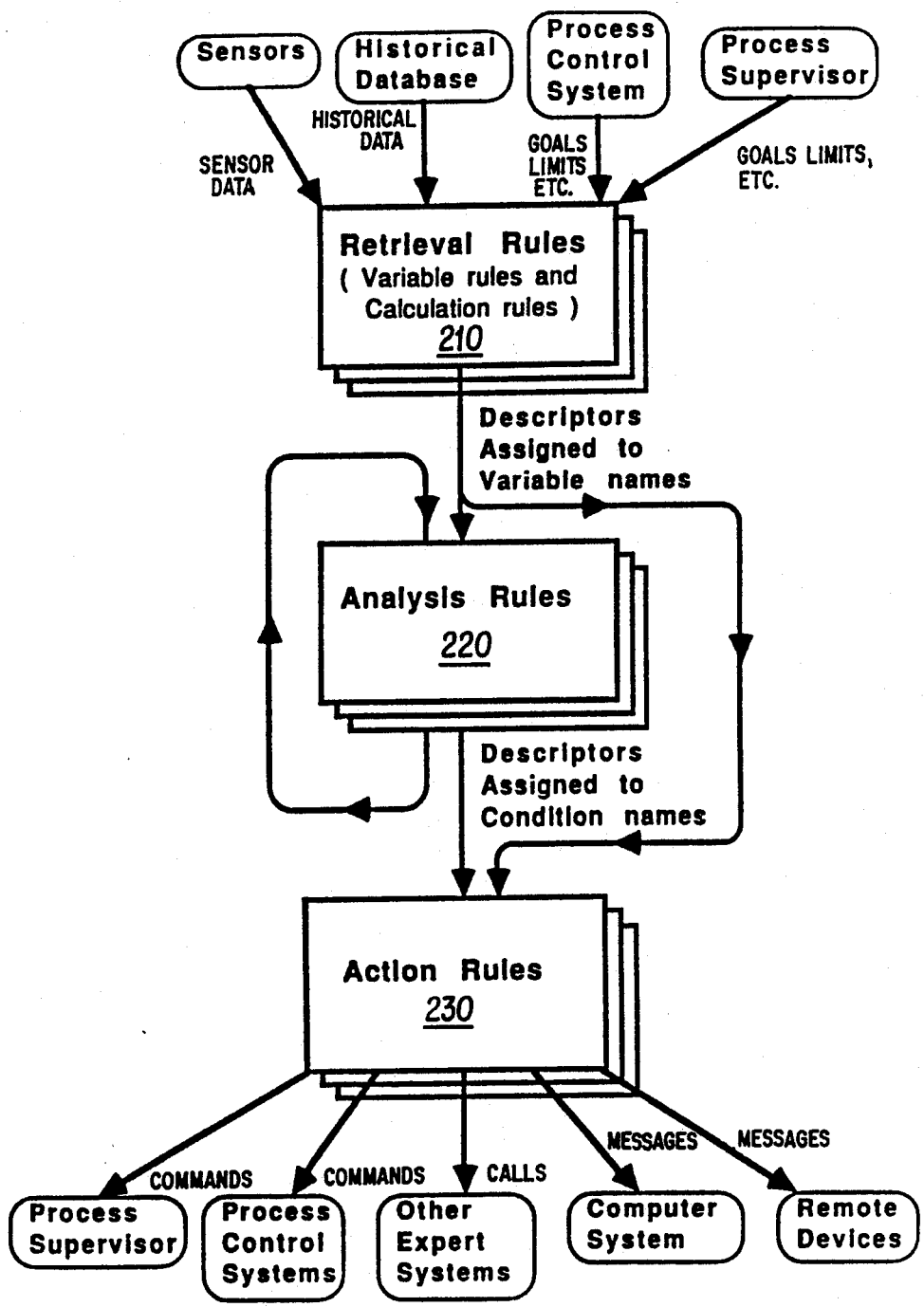
FIG. 2 is a schematic representation of the flow of information in the expert system structure preferably used.

FIG. 2 is a schematic representation of the organization preferably used for the knowledge base. Three main categories of rules are used, namely retrieval rules 200, analysis rules 220, and action rules 230.

Retrieval Rules

The retrieval rules 210 each will retrieve one or more quantitative inputs (which may be, e.g., sensor data 157 from one of the sensors 156, historical data 141 and/or laboratory measurements 162 from a historical data base 140, limits on variable values, goals 132 define by the supervisor procedure 130, combinations of these, or other inputs). One of the significant advantages of the system described is that it provides a very convenient user interface for accessing quantitative inputs from a very wide range of sources: essentially any data object which can be reached by the host computer can be used. (The presently preferred embodiment uses DECnet and serial communication lines to link the compute which will be running the expert system with the various computers it may be calling on for data, but of course a wide variety of other networking, multiprocessor, and/or multitasking schemes could be used instead.)

In the presently preferred embodiment the retrieval rules are of two kinds: the simpler kind (referred to as "variable rules") will name one quantitative value (which may optionally be derived from several independently accessed quantitative inputs), and assign one of a predetermined set of descriptors (variable status values 222) to that name. Each of the more complex retrieval rules (referred to as "calculation rules") permits descriptors to be assigned selectively to a name in accordance with one or more calculated values (which may optionally be derived from a number of quantitative variables).

FIG. 3 shows the template used for a retrieval rule in the presently preferred embodiment, together with a sample of a retrieval rule which has been entered into the template. The areas in this drawing which are surrounded by dotted lines indicate the parts of the template which the user can modify, and which are preferably highlighted to the user in some fashion, e.g. by showing them in reverse video. In this example, the user has typed in the rule name as "xylene column steam." The build-expert software has automatically translated this rule name, by changing all the spaces in it to underscores, so that it appears as a one word name. (This can be conveniently used as part of a variable name in conventional computer languages.) Thus, the rule shown in FIG. 3, when translated into an expert procedure by the build-expert procedure, will define a set of variables whose names each begin with "XYLENE_COLUMN_STEAM."

For example, in the presently preferred embodiment the rule shown will translate into the following set of variables:

"XYLENE_COLUMN_STEAM_STATUS" is a character variable (also known as a string or alphanumeric variable) which will have a string value which is either "MIN," "MAX," or "MID;"

"XYLENE_COLUMN_STEAM_VALUE" will be a real variable, representing the quantitative value originally retrieved for the parameter;

"XYLENE_COLUMN_STEAM_AGE" will be an integer variable representing the age of the quantitative value originally retrieved;

"XYLENE_COLUMN_STEAM_ASTAT" will be a character variable which is defined to have values of "TOO_OLD" or "OK," depending on whether the age value is within limits (note, for example, that this variable could easily be configured as a logical variable instead);

and "XYLENE_COLUMN_STEAM_FIRED" will be a logical variable which indicates whether this particular rule has been fired (on a given pass).

In filling out the retrieval rule template, the user must fill in at least two of the classification blanks. However, in the presently preferred embodiment, only five classification ranges are permitted. (This limit could be changed, but there are significant advantages to permitting the user to input only a restricted number of ranges. Where the process control algorithm absolutely demands that the variable be classified into more ranges, two or more process variable rules could be used to label up to eight or more ranges.)

Another constraint used in the presently preferred embodiment is that the user must enter at least the first two open ended ranges. He may enter up to three bounded ranges, to provide a complete coverage of all cases, but he must enter at least two open ended range specifications.

I the presently preferred embodiment, the build-expert procedure checks to see that the ranges defined are comprehensive and non-overlapping, before the rule is permitted to be added to the rule base.

FIG. 4 shows an example of a different kind of retrieval rule, known as a calculation rule. The menu for this rule is (in the presently preferred embodiment) presented to the user as two screens. The user may specify up to ten quantitative inputs, of any of the types just referred to, as well as up to ten values arithmetically derived from these inputs (or constants). By having some of the derived values refer back to other ones that are derived values, quite complex formulas may be implemented. (One advantageous use of such formulas may be to relate off-line time-stamped laboratory measurements with the continuously-measured values of the same (past) time era, e.g. in a component material balance.) Moreover, notice that the variable values and calculated values thus assembled may be used not only to define a "key value" to be categorized, but also to define the limits of the various categories against which the key value is sought to be tested.

Analysis Rules

Analysis rules generally are used to embed the natural language reasoning as practiced by the domain expert. One important distinction between retrieval rules and analysis rules is that each retrieval rule has a unique name, but the analysis condition names defined by analysis rules are not necessarily unique. FIG. 5 shows an example of an analysis rule 220. Again, the portions of the template which the user can modify are shown inside dashed boxes. Note that the template preferably used defines an analysis condition name and assigns a descriptor to that analysis condition name if specific conditions are met. In the presently preferred embodiment, the only tests permitted are ANDed combinations of no more than five logical terms, each of which can consist only of a test for identity (or non-identity) of two strings. Moreover, the string identity tests are preferably set up so that each of the comparisons either tests a retrieval rule name to see if a certain variable status value 212 was assigned b that rule, or tests an analysis condition name to see if a certain analysis status value 222 was assigned by one of the analysis rules. That is, as seen schematically in FIG. 2, there is potential for recursion among the analysis rules 220 considered as a group, since some of the analysis rules 220 can refer to the outputs of other analysis rule 220. Optionally the analysis rules could be sequenced so that there would never be any open-ended recursions, but in the presently preferred embodiment this extra constraint is not imposed.

Any one analysis condition name may (under various conditions) be assigned values by more than one analysis rule. That is, each analysis rule is preferably set up as an IF statement, and multiple such IF statements will typically be needed to specify the various possible values for any one analysis condition name.

In the presently preferred embodiment, the status of every analysis condition name and variable rule name are initially defined to be "unknown," and the logical comparisons are implemented so that no test will give a "true" result if one term of the comparison has a value of "unknown."

The order in which the analysis rules are executed may be of importance where an analysis condition name is multiply defined. That is, it may in some configurations be useful to permit the conditions of the various analysis rules 220 to be overlapping, so that, under some circumstances, more than one analysis rule may find a true precondition and attempt to assign a status value to the same analysis condition name. In this case, the sequence of execution of the analysis rules 220 can optionally be allowed to determine priority as between analysis rules. However, as mentioned above, this is not done in the presently preferred embodiment.

Moreover, more than one analysis rule may assign the same analysis status value 222 to the same analysis condition name, under different circumstances.

It can be advantageous, for purposes of documenting the reasoning embedded in the expert system, to give names to the analysis rules which include both the name and descriptor possibly linked by that rule: thus, for instance, a rule which is able to conclude that column operation is normal might be named "COLUMN_OP_NORMAL."

Action Rules

FIG. 6 shows the presently preferred embodiment of the template for action rules, and an example of one action rule which has been stated in this format. Again, the portions of the template which the user can modify are indicated by dashed boxes.

The user has chosen to name this particular action rule "Change_Xylene_Steam," which the build-expert software has translated into CHANGE_XYLENE_STEAM (for incorporation into various variable names such as "CHANGE_XYLENE_STEAM_FIRED"). The names assigned to action rules are primarily important for documentation, so that, when this user or another user looks back though the rule base, the use of clear rule names for action rules will help to understand what the structure of the expert system's inference chaining is. In fact, it may be advantageous, as in the example shown, to generally pick analysis status values 222 which have fairly descriptive names, and then, to the extent possible, name the action rules identically with the corresponding analysis status values.

Note also that the action rules can refer back to a variable status value 212 as well as to an analysis status value 222.

Thus, in the presently preferred embodiment the action rules embody an absolute minimum of logic. They are used primarily as a translation from descriptive key words embedded within the inference chaining structure to the actual executable statements (or command procedures) which specify the action to be taken. Thus, one way to think about the advantages of the expert system organization preferably used is that the emulation of natural language reasoning is concentrated as much as possible in the analysis rules, while the retrieval rules are used to provide translation from quantitative measurements into input usable with natural language inference rules, add the action rules are used almost exclusively to provide translation from the natural language inference process back to executable command procedures which fit in well with the computer system used.

Each of the action rule templates also gives the user several choices for the action to be taken to implement the action rule if its precondition is met. The user can either insert an executable statement (in FORTRAN, in the presently preferred embodiment) or insert a pointer to a command procedure, or simply have the action rule send advisory messages. The third option is useful for debugging, since the expert can be observed to see what actions it would have taken, without risking costly errors in the actual control of the system.

In the example shown, an executable FORTRAN statement is used, but the statement specified merely passes an action code back to the supervisor process. In the example shown in FIG. 6, the procedure call given will cause the supervisor procedure to turn on the block whose number is given first, and turn off all other blocks whose numbers are given. Thus, the statement
    acs_status=acs_select_block (3, 4, 5, 0, 0, 0)
would change the status of block 3 to "on-selected" (assuming that it did not need to be initialized), and would set the status values of blocks 4 and 5 to "on-deselected." Thus, when the expert system has completed running, the supervisor procedure which called the expert procedure as a subroutine can selectively execute block functions depending on the values passed back to it by the subroutine.

Thus, the action rules permit a very large variety of actions to be performed. For example, one optional alternative embodiment provides synthetic-speech output; optionally this can be combined with a telephone connection, to permit dial-out alert messages (e.g. to a telephone number which may be selected depending on the time of day shown by the system clock, so that appropriate people can be notified at home if appropriate).

Another optional embodiment permit an action rule to call up a further sub-expert. This might be useful, for example, if one expert subprocedure had been customized to handle emergency situations—who should be called, what should be shut down, what alarms should be sounded.

Generating the Expert Procedure

After the user has input as many rule statements as needed, or has modified as many of an existing set of rule templates as he wishes to, he can then call the generate code option to translate the set of templates 115, including the user inputs which have been made into the rule templates, to create the expert system 120.

Generating Source Code

As a result of the constraints imposed in the various rule templates, the translation from the constrained format of the templates is so direct that the executable rules can be generated simply by a series of appropriate string-equivalent tests, string-append operations, logical-equivalence tests, arithmetic operations, and fetches.

Preferably three passes are performed: the first does appropriate character type declarations; the second loads the appropriate initializations for each rule; and the third translates the inference rules themselves.

An example of the initialization steps is seen in initialization of the analysis rules: an initial value such as "dont_know" is assigned to each condition name, and the equivalence tests are redefined slightly by the translation procedure, so that, until some other value is assigned to the name by another rule, the statement
    "name"="descriptor"

will be evaluated as false, and the statement

NOT("name"="descriptor")

will also be evaluated as false.

Sample Source Code

A portion of the source code for the procedure which actually performs this function, in the presently preferred embodiment, is as follows.

TABLE 6

```
C*************************************
C
C       Build_expert.for
C
C       Routine to generate FORTRAN expert system code using
C       the process rulebase.
C
C
C*************************************
C
        Subroutine Build_expert
C
        Include 'pace$includes:Variable_rule_params.inc'
        Include 'pace$includes:Expert_data.inc'
        Include 'pace$includes:Analysis_commons.inc'
        Include 'pace$includes:Analysis_rule.inc'
        Include 'pace$includes:Action_commons.inc'
        Include 'pace$includes:Action_rule.inc'
        Include 'pace$includes:Action_params.inc'
        Logical First
        Logical No_more
        Character*25       Last_cond
        Character*80       code_dir_file
        Character*80       Directory
        Integer*2          L_dir
        Character*39       Subroutine_name
        Character*14       Subprocess_name
        Character*3        Cblock
        Integer*2          L_sp
        Character*1        Search_string
        Integer*2          Srlen
C
        Call Fdv$Putl(' Generating Expert System code....')
C
C...Rewind the code file
C
d       write(6,*) ' will rewind code file'
        Rewind ( Unit = Code_lun )
        Next_label = 2
C
C...Get the name of the expert system code file, pick out the C subr
name from it
C
d       Call Fdv$putl ( 'Will translate logicals.')
        Call Lib$sys_trnlog ( 'PACE$RULES' ,, Directory ,,,)
        Call Lib$sys_trnlog ( 'PACE$CODE' ,, Code_dir_file ,,,)
d       Call Fdv$putl ( 'Did translate logicals.')
        Istart = Index ( Code_dir_file, ']' )
        Subroutine_name = Code_dir_file(Istart+1:80)//Blank
d       Call Fdv$putl ( 'Will get index of ";".')
        Iend  = Index ( Subroutine_name, '.' )
d       Call Fdv$putl.( 'Will clip subrout name.')
        If  ( Iend .gt. 1 ) Then
           Subroutine_name = Subroutine_name(1:Iend−1)//Blank
        Else
           Subroutine_name = 'Expert'//Blank
        End If
d       Call Fdv$putl ( 'Will trim subroutine name.')
        Call Str$trim ( Subroutine_name, Subroutine_name, Srlen )
d       Write ( 6, 100 ) Subroutine_name
        Write ( Code_lun, 100 ) Subroutine_name
C
C...construct a sub-process name
C
        If ( Subroutine_name(1:5) .eq. 'BLOCK' ) Then
d              Call Fdv$putl('Is block.')
d              Call Fdv$wait ( It )
               Read ( Subroutine_name(6:8), '(I3)' ,err= 91 ) Iblock
d              Call Fdv$putl('Is > 99.')
d              Call Fdv$wait ( It )
               Liblock = 3
               Go To 93
91             Read ( Subroutine_name(6:7), '(I2)' ,err= 92 ) Iblock
d              Call Fdv$putl('Is > 9.')
d              Call Fdv$wait ( It )
               liblock = 2
```

TABLE 6-continued

```
                   Go To 93
        92         Read ( Subroutine_name(6:6), '(I1)' ,err= 93 ) Iblock
d                  Call Fdv$putl('Is < 10.')
d                  Call Fdv$wait ( It )
                   Liblock = 1
                   Go To 93
        93         Write ( Cblock, '(I3)' ) Iblock
                   Istart = 4 − Liblock
                   Subprocess_name = 'B'//Cblock(Istart:3)//'_'
                   L_sp =3 + Liblock
            Else
                   L_sp = 1
            End If
C
100         Format(
            1 '     Options /Extend_source', /,
            1 'C*******************************************',/,
            1 'C',/,
            1 'C     Expert System Code',/,
            1 'C', /,
            1 'C*******************************************',/,
            1 'C', /,
            1 '     Subroutine ', A, /,
            1 'C', / ,
            1 '         Include "ACS$includes:ACSserv.inc" ' , / ,
            1 '         Include "ACS$includes:ACSstatus.inc" ' , / ,
            1 '         Include "ACS$includes:Sys_functions.inc" ' , / ,
            1 '         Include "($Jpidef)" ' , / ,
            1 '         Integer*4 Vss$_to_ascii_time' , / ,
            1 '         Integer This_pass_fires' , / ,
            1 '         Character*25   Unknown' , / ,
            1 '         Parameter      ( Unknown = "Unknown         ")'
            1 '         Character*25   OK' , / ,
            1 '         Parameter      ( OK = "OK                    ")' , / ,
            1 '         Character*25   Too_old' , / ,
            1 '         Parameter      ( Too_old = "Too_old          ")'
            1 '         Integer*4      Now', / ,
            1 '         Integer*4      Then' , / ,
            1 '         Character*18   C_now' , / ,
            1 '         Integer*4      Itemlist(4)' , / ,
            1 '         Integer*2      Code(2)' , / ,
            1 '         Equivalence    ( Itemlist(1) , Code(1) )'      , / ,
            1 '         Integer*4      Mode' , / ,
            1 '         Integer*2      Len' , / ,
            1 '         Character*80   Line' , / ,
            1 'C'
            1 )
d           write(6,*) ' wrote header info.'
C
C..Make declaration code for variable rules
C
C
            First = .True.
      1     Continue
C
C..Read A rule
C
            Call Read_var_rule_params ( First , No_more )
            If ( No_more ) Go To 200
C
C..Write out FORTRAN declarations
C
            Call Str$trim ( Rule_name , Rule_name , Len )
            Write ( Code_lun , 101 ) (Rule_name(1:len) , J=1,5 )
101         Format (
            1 '         Real*4         ', A , '_value'       , / ,
            1 '         Integer*4      ', A , '_age'         , / ,
            1 '         Character*25   ', A , '_stat'        , / ,
            1 '         Logical*1      ', A , '_fired'       , / ,
            1 '         Charactr*10    ', A , '_astat' , / ,
            1 'C'
            1 )
C
            Go To 1
C
    200     Continue
C
C..Make declaration code for calculation rules
C
            Call Declare_calc_rules
C
C..Make declaration code for analysis rules
```

TABLE 6-continued

```
C
C
         Last_cond = '         '
         First = .True.
    2                                                   Continue
C
C..Read A rule
C
         Call Read_anal_rule_params ( First , No_more )
         If ( No_more ) Go To 201
C
C..Write out FORTRAN declarations
C
         Call Str$trim ( An_cond_name , An_cond_name , Len )
         Call Str$trim ( An_rule_name , An_rule_name , ILen )
         Write ( Code_lun , 104 )
         If ( An_cond_name .ne. Last_cond )
       1          Write ( Code_lun , 102 ) (An_cond_name(1:len) )
         Write ( Code_lun , 103 ) (An_rule_name(1:Ilen) )
         Last_cond = An_cond_name
  102    Format
       1 '          Character*25        ' , A , '_stat'
       1 )
  103    Format       (
       1 '          Logical*1           ' , A , '_fired'
       1 )
  104    Format       (
       1 'C'
C
         Go To 2
C
  201    Continue
C
C..Make declaration code for action rules
C
C
         First = .True.
  252    Continue
C
C..Read A rule
C
         Call Read_action_rule_params ( First , No_more )
         If ( No_more ) Go To 251
C
C..Write out FORTRAN declarations
C
         Call Str$trim ( Ac_rule_name , Ac_rule_name , Len )
         Write ( Code_lun , 262 ) Ac_rule_name(1:len)
  262    Format (
       1 '          Logical*1           ' , A , '_fired'              , / ,
       1 'C'
       1 )
C
         Go To 252
  251    Continue
C
C
C...Now Write Initialization code
C
         Write ( Code_lun , 401 ) Subroutine_name (1:Srlen)
    401  Format (
       1 'C' , 1 ,
       1 'C'       Initialize the status values.' , / ,
       1 'C' , / ,
       1 '         Van_status = Vss$_from_ascii_time ( " " , Now )' , 1
       1 '         Van_status = Vss$_to_ascii_time ( Now , C_Now )' . / ,
       1 '         Code(1) = 4                        ' . / ,
       1 '         Code(2) = jpi$_mode' , / ,
       1 '         Itemlist(2) = % loc(Mode)' , / ,
       1 '         Itemlist(3) = % loc(Len)' , / ,
       1 '         Itemlist(4) = 0' , / ,
       1 '         sys_status = sys$getjpiw ( ,,,Itemlist,,,)' , / ,
       1 'd        Write(6,901) C_now' , / ,
       1 '901      Format ( / , " Running ' , A , 'at " , A )' , / ,
       1 'C'
       1 )
C
C....Initialize variable rules - This will set logical flags false and
C    retrieve the necessary data for the rule.
C
         First = .True.
   402   Continue
```

TABLE 6-continued

```
C
C
C..Read A rule
C
         Call Read_var_rule_params ( First , No_more )
         If ( No_more ) Go To 420
C
         Call Str$trim ( Rule_name , Rule_name , Len )
         Write ( Code_lun , 403 ) (Rule_name(1:Len) , J =1,4 )
    403  Format (
         1 'C' , / ,
         1 'C....' , A , ' rule initialization' , / ,
         1 'C' , / ,
         1 '         ' , A , '_astat = Unknown' , / ,
         1 '         ' , A , '_stat = Unknown' , / ,
         1 '         ' , A , '_fired = .False.' )
C
         If ( Ret_meth .eq. Current_val ) Then
             Write ( code_lun , 404 ) Var_num , (Rule_name(1:len),J=1,2)
    404      Format (
         1 '        Call Get_cur_data ( ' , I4 , ' , ' , A , '_value , '
'_age
)'
         1 )
         Else If ( Ret_meth .eq. Discrete_avg ) Then
             Write ( code_lun , 405 ) Ret_time , Var_n
(Rule_name(1:len),J=1,2)
    405      Format (
         1 'C' , / ,
         1 '          Then = Now + ' , I12 , / ,
         1'         Call Get_disc_avg_data ( ' , I4 , ' , ' , A , '_value
A ,
'_age, Then, Now )'
         1 )
         Else If ( Ret_meth. eq. Time_wt_avg ) Then
             Write ( code_lun , 406 ) Ret_time , Var_n
(Rule_name(1:len),J=1,2)
    406      Format (
         1 'C' , / ,
         1 '          Then = Now + ' , I12 , / ,
         1 '         Call Get_time_wt_avg_data ( ' , I4 , ' , ' , A , '_val
, A
, '_age, Then, Now )'
         1 )
         Else If ( Ret_meth .eq. Sec_last_vant_point ) Then
             Write ( code_lun , 411 ) Var_num ,
         1           Rule_name(1:len)
    411      Format (
         1 'C' , / ,
         1 '         Call Get_sec_last_vant_point ( ' , I4 , ' , ' , A , '
, Itime_stamp )'
         1 )
         Else If ( Ret_meth .eq. ACS_ff_delta ) Then
         Write ( code_lun , 407 ) Var_num , Rule_name(1:len)
    407  Format (
         1 'C' , / ,
         1 '         ACS_status = ACS_get_FF_delta ( ' , I4 , ' , ' , A , '
)'
         1 )
         Else If ( Ret_meth .eq. ACS_fb_error ) Then
         Write ( code_lun , 408 ) Var_num , Rule_name(1:len)
    408  Format (
         1 'C' , / ,
         1 '         ACS_status = ACS_get_fb_error ( ' , I4 , ' , ' , A , '
)'
         1 )
         Else If ( Ret_meth .eq. PCS_DMT_loop_goal ) Then
             Write ( code_lun , 409 ) Var_num , Rule_name(1:len)
    409      Format (
         1 'C' , / ,
         1 '         ACS_status = ACS_get_PCS_goal (       " , ' ,
                      "DMT
         1 I , ' , ' , A , '_value)'
         1 )
         Else If ( Ret_meth .eq. PCS_TPA_loop_goal ) Then
             Write ( code_lun , 410 ) Var_num , Rule_name(1:len)
    410      Format (
         1 'C' , / ,
         1 '         ACS_status = ACS_get_PCS_goal (       " , ' ,
                      "TPA
         1 I , ' , ' , A , '_value )'
         1 )
```

TABLE 6-continued

```
                Else
                    Write( Code_lun , * ) 'C.....Bad retrieval method'
                End If
C
                Write ( Code_lun , 510 ) (Rule_name(1:len),J=1,2)
        510     Format
                1 'd Write(6,*) " ' , A , '_value = " , ' , A , '_value'
C
                Go To 402
C
        420     Continue
C
C....Initialize calculation rules
C
                Call Init_calc_rules
C
C....Initialize analysis rules
C
                Last_cond = '             '
                First = .True.
        440     Continue
C
C
C..Read A rule
C
                Call Read_anal_rule_params ( First , No_more )
                If ( No_more ) Go To 450
C
                Call Str$trim ( An_cond_name, An_cond_name , Len )
                Call Str$trim ( An_rule_name, An_rule_name , ILen )
                Write ( Code_lun , 441 ) ( An_rule_name(1:ILen) , J =1,2 )
                If ( An_cond_name .eq. Last_cond ) Go To 440
                Last_cond = An_cond_name
                Write ( Code_lun , 442 ) ( An_cond_name(1:Len) , J =1,1 )
        441     Format (
                1 'C' , / ,
                1 'C....' , A , ' rule initialization' , / ,
                1 'C' , / ,
                1 '       ' , A , '_fired = .False.' )
        442     Format (
                1 '       ' , A , '_stat = Unknown' )
C
                Go To 440
C
        450     Continue
C
C....Initialize action rules
C
                First = .True.
        460     Continue
C
C
C..Read A rule
C
                Call Read_action_rule_params ( First , No_more )
                If ( No_more ) Go To 490
C
                Call Str$trim ( Ac_rule_name , Ac_rule_name , Len )
                Write ( Code_lun , 461 ) ( Ac_rule_name(1:Len) , J =1,2 )
        461     Format (
                1 'C' , / ,
                1 'C....' , A , ' rule initialization' , / ,
                1 'C' , / ,
                1 '       ' , A , '_fired = .False.' )
C
                Go To 460
        490     Continue
C
        500     Continue
C
C...Write the rule code
C
                Write ( Code_lun , 501 )
        501     Format (
                1 'C' , / ,
                1 '1 Continue' , / ,
                1 'C' , / ,
                1 ' This_pass_fires = 0' , / ,
                1 'C'
                1 )
C
C
```

TABLE 6-continued

```
C...Write out variable rule code
C
            First = .True.
C
    502     Continue
C
C..Read A rule
C
            Call Read_var_rule_params ( First , No_more )
            If ( No_more ) Go To 600
C
            Call Str$trim ( Rule_name , Rule_name , Len )
C
            If ( Age_limit .eq. Empty ) Age_limit = -365*24*60*60
C
            Write ( Code_lun , 299 ) ( Rule_name(1:len),J=1,3) , Abs(Age_
           1 ( Rule_name(1:len),J=1,2)
    299     Format (
           1 'C' , / ,
           1 'C....' , A , ' Rules ' , / ,
           1 'C' , / ,
           1 '        If (' , /
           1 '        1     (' , A , '_astat .eq. Unknown ) .and. ' , / ,
           1 '        1     (' , A , '_age .le. ' , ')' , / ,
           1 '        1     ) Then ' , / ,
           1 '        ', A , '_astat = OK ' , / ,
           1 'd        Write(6,*) "' , A , '_age is OK."' , / ,
           1 '        This_pass_fires = This_pass_fires + 1' , / ,
           1 '        End If
           1 )
C
            Write ( Code_lun ,Fmt=298 ) ( Rule_name(1:len),J=1
Abs(Age_limit) ,
           1                           ( Rule_name(1:len),J=1,2
    298     Format (
           1 'C' , / ,
           1 '        If (' , / ,
           1 '        1     (' , A , '_astat .eq. Unknown ) .and. ' , / ,
           1 '        1     (' , A , '_age .gt. ' , I , ')' , / ,
           1 '        1     ) Then ' , / ,
           1 '        ', A , '_astat = Too_old' , / ,
           1 'd        Write (6,*) "' , A , '_age is Too_old."' , / ,
           1 '        This_pass_fires = This_pass_fires + 1' , / ,
           1 '        End If
           1 )
C
            Write( code_lun , 505 ) (Rule_name(1:1en),J=1,3) , Log_op1 , 1           Rule_name(1:len) , Status1 , Rule_name(1:len) ,
           1           Status1 , Rule_name(1:len)
    505     Format (
           1 'C' , / ,
           1 '        If (' , / ,
           1 '        1     ( .not. ' , A , '_fired ) .and. ' , / ,
           1 '        1     (' , A , '_astat .eq. OK ) .and. ' , / ,
           1 '        1     (' , A , '_value ' , A4 , '' , F12.5 , ')' ,
           1 '        1     ) Then ' , / ,
           1 '        ', A , '_stat = "', A25 ,'"' , / ,
           1 'd        Write(6,*) "' , A , '_stat is ' , A ,'"' , / ,
           1 '        ', A , '_fired = .True.' , / ,
           1 '        This_pass_fires = This_pass_fires + 1' , / ,
           1 '        End If
           1 )
C
            Write( code_lun , 506 ) (Rule_name(1:len),J=1,3) , Log_op8 , 1           Rule_name(1:len) , Status8 , Rule_name(1:len) ,
           1           Status8 , Rule_name(1:len)
    506     Format (
           1 'C' , / ,
           1 '        If (' , / ,
           1 '        1     ( .not. ' , A , '_fired ) .and. ' , / ,
           1 '        1     (' , A , '_astat .eq. OK ) .and. ' , / ,
           1 '        1     (' , A , '_value ' , A4 , ' 2 , F12.5 , ')' ,
           1 '        1     ) Then ' , / ,
           1 '        ', A , '_stat = "', A25 ,'"' , / ,
           1 'd        Write(6,*) "' , A , '_stat is ' , A ,'"' , / ,
           1 '        ', A , '_fired = .True.' , / ,
           1 '        This_pass_fires = This_pass_fires + 1' , / ,
           1 '        End If
           1 )
```

TABLE 6-continued

```
C
        If ( Status2 .ne. '                    ' ) Then
C
        Write( code_lun , 508 ) (Rule_name(1:len),J=1,3) , Log_op2 ,
,
       1            Rule_name(1:len) , Log_op3 , Limit3 ,
       1            Rule_name(1:len) , Status2 , Rule_name(1:len) ,
       1            Status2 , Rule_name(1:len)
508    Format (
       1 'C' , / ,
       1 '         If ( ' , / ,
       1 '         1     ( .not. ' , A , '_fired ) .and. ' , / ,
       1 '         1     ( ' , A , '_astat .eq. OK ) .and. ' , / ,
       1 '         1     ( ' , A , '_value ' , A4 , ' ' , F12.5 , ' ) .and
,
       1 '         1     ( ' , A , '_value ' , A4 , ' ' , F12.5 , ' ) ' ,
       1 '         1         ) Then ' , / ,
       1 '           ' , A , '_stat = "' , A25 , '"' , / ,
       1 'd          Write(6,*) "' , A , '_stat is ' , A ,'"' , / ,
       1 '           ' , A , '_fired = .True.' , / ,
       1 '           This_pass_fires = This_pass_fires + 1' , / ,
       1 '         End If'
       1 )
       End If
C
        If ( Status4 .ne. '                    ' ) Then
C
        Write( code_lun , 509 ) (Rule_name(1:len),J=1,3) , Log_op4 ,
,
       1            Rule_name(1:len) , Log_op5 , Limit5 ,
       1            Rule_name(1:len) , Status4 , Rule_name(1:len) ,
       1            Status4 , Rule_name(1:len)
509    Format (
       1 'C' , / ,
       1 '         If ( ' , / ,
       1 '         1     ( .not. ' , A , '_fired ) .and. ' , / ,
       1 '         1     ( ' , A , '_astat .eq. OK ) .and. ' , / ,
       1 '         1     ( ' , A , '_value ' , A4 , ' ' , F12.5 , ' ) .and
,
       1 '         1     ( ' , A , '_value ' , ' ' , F12.5 , ' ) ' ,
       1 '         1         ) Then ' , / ,
       1 '           ' , A , '_stat = "' , A25 , '"' , / ,
       1 'd          Write(6,*) "' , A , '_stat is ' , A ,'"' , / ,
       1 '           ' , A , '_fired = .True.' , / ,
       1 '           This_pass_fires = This_pass_fires + 1' , / ,
       1 '         End If'
       1 )
       End If
C
        If ( Status6 .ne. '                    ' ) Then
C
        Write( code_lun , 511 ) (Rule_name(1:len),J=1,3) , Log_op6 ,
,
       1            Rule_name(1:len) , Log_op7 , Limit7 ,
       1            Rule_name(1:len) , Status6 , Rule_name(1:len) ,
       1            Status6 , Rule_name(1:len)
511    Format (
       1 'C' , / ,
       1 '         If ( ' , / ,
       1 '         1     ( .not. ' , A , '_fired ) .and. ' , / ,
       1 '         1     ( ' , A , '_astat .eq. OK ) .and. ' , / ,
       1 '         1     ( ' , A , '_value ' , A4 , ' ' , F12.5 , ' ) .and
,
       1 '         1     ( ' , A , '_value ' , A4 , ' ' , F12.5 , ' ) ' ,
       1 '         1         ) Then ' , / ,
       1 '           ' , A , '_stat = "' , A25 , '"' , / ,
       1 'd          Write(6,*) "' , A , '_stat is ' , A ,'"' , / ,
       1 '           ' , A , '_fired = .True.' , / ,
       1 '           This_pass_fires = This_pass_fires + 1' , / ,
       1 '         End If'
       1 )
       End If
C
        Go To 502
C
600    Continue
C
C...Write out calculation rule code
C
        Call Write_calc_rules
C
C...Write out analysis rule code
```

TABLE 6-continued

```
C
            First = .True.
C
  602     Continue
C
C..Read A rule
C
          Call Read_anal_rule_params ( First , No_more )
          If ( No_more ) Go To 700
C
C
          Call Str$trim ( An_cond_name , An_cond_name , Len )
          Call Str$trim ( An_rule_name , An_rule_name , ILen )
          Write ( Code_lun , 699 ) ( An_rule_name(1:Ilen),j=1,2)
  699     Format (
          1 'C' , / ,
          1 'C....' , A , ' Rules ' , / ,
          'C' , / ,
          1 '           If (' , / ,
          1 '           1 ( .not. ' , A , '_fired ) .and. '
                       1 )
C
          If ( An_rule1 .ne. '                    ' ) Then
          Call Str$trim ( An_rule1 , An_rule1 , Len )
C
          If ( An_not1 .eq. '.NOT.' ) Then
              Write( code_lun , 1001 ) An_rule1(1:len)
          End If
  1001    Format (
          1 '         1         ( .not. (' , A , '_stat .EQ. Unknown ) ) .and.'
          1 )
          Write( code_lun , 608 ) An_not1 , An_rule1(1:len) ,
          1            An_status1
  608     Format (
          1 '         1              (' , A , '(' , A , '_stat .EQ. "' , A , '
.and.'
          1 )
          End If
C
          If ( An_rule2 .ne. '                    ' ) Then
          Call Str$trim ( An_rule2 , An_rule2, Len )
C
          If ( An_not2 .eq. '.NOT.' ) Then
              Write( code_lun , 1001 ) An_rule2(1:len)
          End If
          Write( code_lun, 609 ) An_not2 , An_rule2(1:len) ,
          1            An_status2
  609     Format (
          1 '              1      (' , A , '(' , A , '_stat .EQ. "' , A , '
.and.'
          1 )
          End If
C
          If ( An_rule3 .ne. '                    ' ) Then
          Call Str$trim ( An_rule3 , An_rule3, Len )
C
          If ( An_not3 .eq. '.NOT.' ) Then
              Write( code_lun , 1001 ) An_rule3(1:len)
          End If
          Write( code_lun , 610 ) An_not3 , An_rule3(1:len) ,
          1            An_status3
  610     Format     (
          1 '              1      (' , A , '(' , A , '_stat .EQ. "' , A , '
.and.'
          1 )
          End If
C
          If ( An_rule4 .ne. '                    ' ) Then
          Call Str$trim ( An_rule4 , An_rule4 , Len )
C
          If ( An_not4 .eq. '.NOT.') Then
              Write( code_lun , 1001 ) An_rule4(1:len)
          End If
          Write( code_lun , 611 ) An_not4 , An_rule4(1:len) ,
          1            An_status4
  611     Format     (
          1 '              1      (' , A , '(' , A , '_stat .EQ. "' , A , '
.and.'
          1 )
          End If
C
          If ( An _rule5 .ne. '                    ' ) Then
```

TABLE 6-continued

```
                Call Str$trim ( An__rule5 , An__rule5 , Len )
C
                If ( An__not5 .eq. '.NOT.' ) Then
                    Write( code__lun , 1001 ) An__rule5(1:len)
                End If
                Write( code__lun , 612 ) An__not5 , An__rule5(1:len) ,
            1               An__status5
612         Format         (
            1 '             1           ( ' , A , ' ( ' , A , '__stat .EQ. "' , A , '
.and.'
            1 )
                End If
C
                Call Str$trim ( An__cond__name , An__cond__name , Len )
                Write ( Code__lun , 613 )
            1 (An__cond__name(1:len),j=1,1) , An__end__status ,
            1 (An__cond__name(1:len),j=1,1) , An__end__status ,
            1 (An__rule__name(1:llen),j=1,1)
613         Format      (
            1 '             1             ( .True. ) ' , / ,
            1 '             1                        ) Then ' , / ,
            1 '                           ' , A , '__stat = "' , A , '__stat is ' , A , '"' , / ,
            1 'd            Write(6,*) "' , A , '__stat is ' , A ,'"' , / ,
            1 'd            This__pass__fires = This__pass__fires + 1' , / ,
            1 '             End If'
            1 )
C
                Go To 602
C
   700      Continue
C
C
C...Write out action rule code
C
                First = .True.
C
   702      Continue
C
C..Read A rule
C
                Call Read__action__rule__params ( First , No__more )
                If ( No__more ) Go To 800
C
C
                Call Str$trim ( Ac__rule__name , Ac__rule__name , Len )
                Write ( Code__lun , 799 ) (Ac__rule__name(1:len),j=1,2)
799         Format (
            1 'C' , / ,
            1 'C....' , A , ' Rules ' , / ,
            1 'C' , / ,
            1 '             If ( ' , / ,
            1 '             1             ( .not. ' , A , '__fired ) .and. '
                            1 )
        C                   .
                Call Str$trim ( Ac__rule1 , Ac__rule1 , Len )
C
                Write( code__lun , 708 ) Ac__rule1(1:len) ,
            1               Ac__status1
708         Format         (
            1 '             1           ( ' , ' ( ' , A , '__stat .EQ. "' , A , '" ) ) '
            1 )
C
C
                Call Str$trim ( Ac__rule__name , Ac__rule__name , Len )
                Write ( Code__lun , 713 ) (Ac__rule__name(1:len),j=1,2)
    713     Format (
            1 '             1            ) Then ' , / ,
            1 'd                Write(6,*) "Doing action rule ' , A , ' " ' , / ,
            1 '             ' , A ,
                            '__fired
                            =
                            .True.' ,
                            / ,
            1 '                        This__pass__fires = This__pass__fires + 1'
            1 )
C
                Call Str$trim ( Ac__data__line , Ac__data__line , Len )
                If ( Iac__type .eq. Exec__fort__statement ) Then
                    Write ( code__lun , 714 ) Ac__data__line(1:Len)
714             Format (
            1 '         ' , A
            1 )
```

TABLE 6-continued

```
              Else If ( Iac_type .eq. Exec_dcl_procedure ) Then
                  Subprocess_name(L_sp:14) = Ac_rule_name
                  Call Str$trim ( Subprocess_name , Subprocess_name , ILen )
                  Write ( code_lun , 715 ) Ac_data_line(1:Len) ,
         1                                  Subprocess_name(1:ILen)
715           Format (
              1 ' Call Lib$spawn ( "@' , A , '",,,"' , A , '" ,,,,
              1 )
              Else If ( Iac_type .eq. Send_vaxmail_msg ) Then
                Call Str$trim ( Ac_rule_name , Ac_rule_name , Len )
                Call Str$trim ( Directory , Directory , L_dir )
                  Subprocess_name(L_sp:14) = Ac_rule_name
                  Call Str$trim ( Subprocess_name , Subprocess_name , ILen )
                  Write(Code_lun , 788 )
788           Format (
              1 '         If ( Mode .eq. Jpi$k_other ) Then'
              1 )
                  Write ( code_lun , 718 ) Directory(1:L_dir) ,
         1                            Ac_rule_name(1:len) ,
         1                            Subprocess_name(1:Ilen)
718           Format (
              1 '         Call Lib$spawn ( "@' , A , A , '.mailmsg",,,"' , A
'"'
,,,,)'
              1 )
                  Write(Code_lun , 787 )
787           Format (
              1 '         Else if ( Mode .eq. Jpi$k_interactive ) Then'
              1 )
                  Write ( Code_lun , 789 ) Directory(1:L_dir) ,
         1                            Ac_rule_name(1:len) , Next_label, Next_label
                  Next_label = Next_label + 1
789           Format (
              1 '         Open(11,File="' , A , A , '.mailmsg" ,Status="old"
              1 '         Do J = 1,3 ' , / ,
              1 '             Read ( 11 , "(A)" ) Line' ,/,
              1 '         End Do' ,/,
              1 '         Do J = 1,60' ,/,
              1 '             Read (11 , "(A)" , End = ' , I4 , ' ) Line ' ,/,
              1 '             Write(6,*) Line ' ,/,
              1 '         End Do' ,/,
              1 I4 ,' Continue' ,/,
              1 '         Close ( 11 ) '
              1 )
                  Write(Code_lun , 786 )
786           Format (
              1 '         End If'
              1 )
C
              Else
                  Write ( code_lun , 716 )
716           Format (
              1 '         Write(6,*) "Bad Action type."'
              1 )
              End If
C
              Write ( Code_lun , 717 )
717       Format (
              1 '         End If'
              1 )
C
              Go To 702
C
800           Continue
C
              Write( Code_lun , 9998 )
9998      Format (
              1 'd        Write(6,*) This_pass_fires," rules fired this pass.'
              ,
              1 '         If ( This_pass_fires .gt. 0 ) Go To 1' , / ,
              1 'C' ,    / ,
              1 '         Return' , / ,
              1 '
              1 )
              Call Fdv$PutI(' Generating Expert System code.... Done.')
              Return
              End
```

Copyright (c) 1987 E. I. duPont de Nemours & Co., all rights reserved

Thus, steps such as those listed above will produce (in this example) FORTRAN source code which defines an expert system including rules as defined by the user. This source code can then be compiled and linked, as described above, to provide an expert procedure which is callable at run-time. This expert procedure is tied into the supervisor procedure, as described above, by inserting an appropriate call into the user program section of one of the blocks in the supervisor procedure. Thus, the expert procedure can be called under specific circumstances (e.g. if selection among several possible manipulated variables must be made), or may optionally be called on every pass of the base cycle procedure, or at fixed time intervals, or according to an of the other options set forth above.

As will be recognized by those skilled in the art, the innovative concepts described in the present application can be modified and varied over a tremendous range of applications, and accordingly their scope is not limited except by the allowed claims.

- Wake up. Check to see if interrupted to terminate. If so, set the system status to "Terminated normally", and stop completely.

- If not terminated, branch back to the start of the control cycle loop 1510.

Sample Source Code

The source code for the procedure which actually performs this function, in the presently preferred embodiment, is as follows. Due to the formatting requirements of patent applications, some portions of this and other portions of source code provided herein contain statements which are wrapped across more than one line (and hence would need to be restored to single-line format, or appropriate leaders inserted, before being loaded for execution); but those skilled in the art will readily recognize these instances, and can readily correct them to produce formally perfect code.

Table 1

```
C**********************************
C
C       Control.for
C
C    Main control program for the Advanced Control
C         System,
C    a high level optimization and control system
C       running on the Vax, using Vantage facilities.
C
C**********************************
C     Program Control
         Include 'ACS$includes:Block_parameters.inc/nolist'
          Include 'ACS$includes:Van_functions.inc/nolist'
          Include 'ACS$includes:Sys_functions.inc/nolist'
          Include 'ACS$includes:Manip_params.inc'
          Include 'ACS$includes:Meas_params.inc'
          Include 'ACS$includes:Filter_params.inc'
          Include 'ACS$includes:ACSserv.inc'
          Include 'ACS$includes:ACSstatus.inc'
C
         Integer*4    Block
         Integer*4    Integer_Now
         Character*20 Character_now
```

```
        Integer*4       Timbuf(2)
        Integer*4       Measured_time_stamp
        Integer*4       Key_block_exec_time
        Logical*2       Execute_block
        Logical         Success
        Logical         First
        Character*18    Debug_time
        Logical         Force_initialization
        Parameter       (Force_initialization = .True.)
        Logical         Dont_force_initialization
        Parameter       (Dont_force_initialization = .False. )
c
        Integer*2       Meas_type
        Integer*2       Meas_var
        Integer*2       Filt_type
        Integer*2       Filt_var
c
        Integer*4       Event_flag_state
        Integer*4       Timer_flag
        Integer*4       Interrupt_flag
        Character*9     Cluster_name
        Parameter       ( Cluster_name = 'ACS_FLAGS' )
        Integer*4       Flag_mask
c
        Logical         Interrupt_flag_set
        Interrupt_flag_set() = Btest(Event_flag_state,1)
c
        Timer_flag = 64
        Interrupt_flag = 65
        First = .True.
        Flag_mask = 0
        Flag_mask = Ibset ( Flag_mask , 0 )
        Flag_mask = Ibset ( Flag_mask , 1 )
c
C...Record control program startup in the log file
c
        Van_status = Vss$_from_ascii_time ( ' ' , Integer_now )
        Van_status = Vss$_to_ascii_time ( Integer_now ,
     1                                          Character_now )
        Write (6,*) ' Started the ACS control program at ',
     1                                          Character_now
c
C...Create the event flag cluster , clear interrupt flag
c
        Sys_status = Sys$ascefc ( %Val(Timer_flag ) ,
     1      %descr(Cluster_name) , 0 , )
        Sys_status = sys$clref ( %val(Interrupt_flag ))
c
C...Check to see if ACS_control has been down for more than
C   30 minutes. If so, initialize all active blocks.
c
        Van_status = Vss$_from_ascii_time ( ' ' , Integer_now )
        If ( Integer_now - Integer_next_cycle .gt. 30*60 ) Then
            Do 10 Block = 1,Max_blocks
              If ( ( Block_status(Block)(1:2) .eq. 'On' ) .or.
     1         ( Block_status(Block)(1:6) .eq. 'Active' ) .or.
     1         ( Block_status(Block)(1:14) .eq. 'Just turned on' ) )
     1         Call Initialize_block ( Block )
    10      Continue
          End If
c
C....The main block control loop
    1   Continue
```

```
c
c....Set system status to Running
c
        System_status = 'Running-Computing   '
c
c...Set Wake up time to ACS_base_scan minutes from now
c
        Van_status = Vss$_from_ascii_time ( ' ' , Integer_now )
        Van_status = Vss$_to_ascii_time ( Integer_now ,
      1                                   Character_now )
        Integer_next_cycle = Integer_now + ACS_base_scan*60
        Call Vss$_get_systime ( Integer_next_cycle , Timbuf )
c
c....Loop through all the blocks
c
        Do 100  Block = 1,Max_blocks
c
c....Update the block Status from the info coming from PCS
c
        Call Check_block_status ( Block )
c
c...Check the block status, if inactive or off, skip it
c
        If ( ( Block_status(Block)(1:8)   .eq. 'Inactive'  )   .or.
      1      ( Block_status(Block)(1:6)   .eq. 'Failed'    )   .or.
      1      ( Block_status(Block)(1:10)  .eq. 'On-holding')   .or.
      1      ( Block_status(Block)(1:3)   .eq. 'Off'       )         ) Then
            Go To 100
        End if
d       If ( First )
d     1   write(6,*) ' Block: ',block,'   Status = '
      1 block_status(block)

c
c...If the block has just been turned on, initialize it
c
        If (Block_status(Block)(1:14) .eq. 'Just turned on' ) Then
          Call Initialize_block( Block )
        End if
c
c....Check to see if it is time to execute the block
c
c..... Use appropriate calls for the block type
c
        If (
      1      ( Block_type ( Block )(1:8 )  .eq. 'Feedback'    ) .or.
      1      ( Block_type ( Block )(1:11)  .eq. 'Feedforward' ) .or.
      1      ( Block_type ( Block )(1:7 )  .eq. 'Program'     )
      1    ) Then
          ACS_status = ACS_get_meas_var_type ( Block , Meas_type )
          If ( Meas_type .eq. Cur_val_van_var ) Then
            ACS_status = ACS_get_meas_var_num ( Block , Meas_var )
            Van_status = Vss$g_curtime ( Meas_var ,
      1                                  Measured_time_stamp )
          Else
            Measured_time_stamp = 0
          End If
c
        Else If (
      1      ( Block_type ( Block )(1:8 )  .eq. 'Shewhart' )
      1    ) Then
          ACS_status = ACS_get_filtered_var_type ( Block , Filt_type
```

```
              If ( Filt_type .eq. Van_var_filter ) Then
                 ACS_status = ACS_get_filtered_var_num ( Block , Filt_var
                 Van_status = Vss$g_curtime ( Filt_var ,
     1                                        Measured_time_stamp )
              Else
                 Measured_time_stamp = 0
              End If
           End If
c
c...Get exec time of key block, if defined
c
           Key_block = Var_num2(Block)
           If ( Key_block .ne. Empty ) Then
              Key_block_exec_time = Last_execution_time ( Key_block )
           Else
              Key_block_exec_time = 0
           End If
c
           Execute_block = .False.
d          If ( First .eq. .True. ) Then
d          Van_STATUS = vss$_to_ascii_time ( integer_now , Debug_time )
d          write(6,*) ' Block = ',block
d          write(6,*) 'Integer_now = ',Debug_time
d          Van_STATUS = vss$_to_ascii_time ( last_execution_time(block)
d     1 , Debug_time )
d          write(6,*) 'last_execution_time = ',debug_time
d          Van_STATUS = vss$_to_ascii_time ((-1)*Frequency(block)*60
d     1 , Debug_time )
d          write(6,*) 'Frequency(block) = ',Debug_time
d          Van_STATUS = vss$_to_ascii_time ( last_measured_time(block)
d     1 , Debug_time )
d          write(6,*) 'last_measured_time = ',Debug_time
d          Van_STATUS = vss$_to_ascii_time ( measured_time_stamp
d     1 , Debug_time )
d          write(6,*) 'measured_time_stamp = ',Debug_time
d          write(6,*) 'timing_option = ', Var_num3(BLock)
d          End If
c
           I_timing_option = Var_num3(Block)
           If ( ( I_timing_option .eq. Interval ) .and.
     1       ( Integer_now - Last_execution_time(Block) .ge.
     1                  Frequency(Block)*60)           ) Then
     1          Last_execution_time(Block) = Integer_now
              Last_measured_time(Block) = Measured_time_stamp
              Execute_block = .True.
c
           Else If ( I_timing_option .eq.
     1                          Key_off_measured_variable )Then
              If ( Measured_time_stamp .gt.
     1                  Last_measured_time(Block) ) Then
                 Last_execution_time(Block) = Integer_now
                 Last_measured_time(Block) = Measured_time_stamp
                 Execute_block = .True.
              End If
c
           Else If ( I_timing_option .eq.
     1                          Key_off_ACS_block ) Then
              If ( Key_block_exec_time .gt.
     1                          Fix_time(Block) ) Then
                 Last_execution_time(Block) = Integer_now
                 Last_measured_time(Block) = Measured_time_stamp
                 Fix_time(block) = Key_block_exec_time
                 Execute_block = .True.
              End If
```

```
c
      Else If ( I_timing_option .eq.
     1                          Intrvl_and_key_off_ACS_block) Then
        If (
     1      ( Key_block_exec_time .gt.
     1                     Fix_time(Block) ) .or.
     1      ( Integer_now - Last_execution_time(Block) .ge.
     1                     Frequency(Block)*60)
     1    ) Then
          Last_execution_time(Block) = Integer_now
          Last_measured_time(Block) = Measured_time_stamp
          Fix_time(block) = Key_block_exec_time
          Execute_block = .True.
        End If
c
      Else If ( I_timing_option .eq.
     1                          Intrvl_and_key_off_meas_var) Then
        If (
     1      ( Measured_time_stamp .gt.
     1              Last_measured_time(Block) ) .or.
     1      ( Integer_now - Last_execution_time(Block) .ge.
     1                     Frequency(Block)*60)
     1    ) Then
          Last_execution_time(Block) = Integer_now
          Last_measured_time(Block) = Measured_time_stamp
          Fix_time(block) = Key_block_exec_time
          Execute_block = .True.
        End If
c
      Else If ( I_timing_option .eq.
     1                          Key_off_meas_var_and_block) Then
        If (
     1      ( Key_block_exec_time .gt.
     1                     Fix_time(Block) ) .or.
     1      ( Measured_time_stamp .gt.
     1              Last_measured_time(Block) )
     1    ) Then
          Last_execution_time(Block) = Integer_now
          Last_measured_time(Block) = Measured_time_stamp
          Fix_time(block) = Key_block_exec_time
          Execute_block = .True.
        End If
c
      Else If ( I_timing_option .eq.
     1                          Intrvl_and_Key_meas_and_block)Then
        If (
     1      ( Key_block_exec_time .gt.
     1                     Fix_time(Block) ) .or.
     1      ( Measured_time_stamp .gt.
     1              Last_measured_time(Block) )  .or.
     1      ( Integer_now - Last_execution_time(Block) .ge.
     1                     Frequency(Block)*60)
     1    ) Then
          Last_execution_time(Block) = Integer_now
          Last_measured_time(Block) = Measured_time_stamp
          Fix_time(block) = Key_block_exec_time
          Execute_block = .True.
        End If
      End if
c
C...If Time to execute, call the Subroutine for the appropriate block
c
```

```
      If ( Execute_block .eq. .True. ) Then
          If ( Block_type(Block)(1:11) .eq. 'Feedforward' ) then
              Call Feedforward_block(Block)
          Else If ( Block_type(Block)(1:8 ) .eq. 'Feedback' ) then
              Call Feedback_block(Block)
          Else if ( Block_type(Block)(1:7 ) .eq. 'Program' ) then
              Call Program_block ( Block)
          Else if ( Block_type(Block)(1:8 ) .eq. 'Shewhart' ) then
              Call Shewhart_block( Block)
          End if
      End if
C
 100      Continue
C
C...All Blocks checked and executed if needed; go to sleep until neede
C
 102      Continue
C
          Sys_status = Sys$setimr ( %val(Timer_flag) , %ref(Timbuf),,  )
          If (Sys_status .eq. %loc(Ss$_normal) ) Then
d         Write(6,*) ' Successfully set timer.'
          Else
          Write(6,*) ' Error return from setimr in Control at ',
       1                                          Character_now
          End If
c
          System_status = 'Running-Sleeping    '
          Sys_status = Sys$wflor   ( %val(Timer_flag) , %val(Flag_mask)
          If ( .not. Sys_status ) Call Lib$signal(%val(Sys_status))
c
          Sys_status = sys$readef ( %val(Timer_flag ) ,
       1       %ref(Event_flag_state)  )
          If ( .not. Sys_status ) Call Lib$signal(%val(Sys_status))
c
          If ( ( Sys_status .ne. %loc(Ss$_wasclr) ) .and.
       1      ( Sys_status .ne. %loc(Ss$_wasset) )         ) Then
              Write(6,*) ' Problem reading event flag status'
          End If
C
C..Test the interrupt bit- if set, process the request
C
          If ( Interrupt_flag_set() ) Then
d            Write(6,*) 'got an interrupt'
             Call Shutdown ( Event_flag_state )
          Else
d            WRite(6,*) 'Timer expired.'
          End If
C
          First = .False.
          Go To 1
C
          End
``` detail below.) The data passed by the feedback block may include:

"User_integer(1)" - the time stamp of the measured variable (from the database);

"User_integer(2)" - the time the action was taken;

"User_real(1)" - the change in the value of the manipulated variable;

"User_real(2)" - the computed error; and

"User_character(1)" - a string (alphanumeric) sequence which describes the block type; for feedback blocks this is set to be
= 'Feedback'.

Sample Source Code

The source code for the procedure which actually performs this function, in the presently preferred embodiment, is as follows.

Table 2

```
C*************************************
C
C       Feedback_block.for
C
C
C       ACS subroutine to do feedback action on the Vax, communicating
C       directly with the target system.
C
C
C
C*************************************
C
        Subroutine Feedback_block ( Block )
C
        Include 'ACS$includes:Block_parameters.inc/nolist'
        Include 'ACS$includes:Van_functions.inc/nolist'
        Include 'ACS$includes:User_vars.inc/nolist'
        Include 'ACS$includes:ACSstatus.inc/nolist'
        Include 'ACS$includes:ACSserv.inc'
        Include 'Acs$includes:TIserv.inc'
        Include 'Acs$includes:TIstatus.inc'
        Include 'ACS$includes:Manip_params.inc'
        Include 'ACS$includes:Meas_params.inc'
C
        Integer*2       Meas_var_system
        Integer*2       Meas_var_number
        Integer*2       Manip_var_system
        Integer*2       Manip_var_number
        Integer*4       Block
        Integer*4       Measured_time_stamp
        Integer*4       Integer_Now
        Character*20    now_time
        Real*4          Measured_value
        Real*4          Current_manipulated_value
        Real*4          New_manipulated_value C
C...Special handling for 'On-deselected' status - do nothing
C
        If ( Block_status(Block)(1:13) .eq. 'On-deselected') Then
            Return
        End If
```

```
C
        ACS_status = ACS_get_meas_var_type ( Block , MEAS_VAR_system )
        Manip_var_system = Manipulated_variable(Block)
        Manip_var_number = New_manipulated_variable(Block)
D       Write(6,*) ' Calling new_feedback - block = ',block
C
C...Get the measured value
C
        Van_status = Vss$_from_ascii_time ( ' ' , Integer_now )
        van_status = Vss$_to_ascii_time( Integer_now , now_time )
C
C...Measured Value  is TPA PCS loop goal
C
        If ( Meas_var_system .eq. PCS_TPA_Loop_goal  ) Then
           ACS_status = ACS_get_pcs_goal( 'TPA      ' ,
1              Measured_variable(Block) , Measured_value )
           If ( ACS_Status .ne. %loc(ACS_success) ) Then
C............If PCS goal value not available, don't execute
              Block_status(Block) = 'On-Err-PCS goal get'
              Write( 6, *) 'Feedback exit due to measured var not availa
              write(6,*)' ACS Block: ',block,'  at: ',now_time
              Return
           End If
C
C...Measured Value  is DMT PCS loop goal
C
        Else If ( MEAS_var_system .eq. PCS_DMT_loop_goal ) Then
           ACS_status = ACS_get_pcs_goal( 'DMT      ' ,
1              Measured_variable(Block) , Measured_value )
           If ( ACS_Status .ne. %loc(ACS_success) ) Then
C............If PCS goal value not available, don't execute
              Block_status(Block) = 'On-Err-PCS goal get'
              Write( 6, *) 'Feedback exit due to measured var not availa
              write(6,*)' ACS Block: ',block,'  at: ',now_time
              Return
           End If
C
C...Measured Value  is ACS block goal
C
        Else If ( MEAS_var_system .eq. ACS_block_goal ) Then
           ACS_status = ACS_get_goal (
1              Measured_variable(Block) , Measured_value )
           If ( ACS_Status .ne. %loc(ACS_success) ) Then
C............If ACS goal Value not available, don't execute
              Block_status(Block) = 'On-Err-ACS goal get'
              Write( 6, *) 'Feedback exit due to measured var not availa
              write(6,*)' ACS Block: ',block,'  at: ',now_time
              Return
           End If
C
C...Measured Value  is Vantage variable
C
        Else If ( Meas_var_system .eq. cur_val_Van_var ) Then
           Van_Status = Vss$g_current( Measured_variable(Block) ,
1              Measured_value )
           If ( Van_Status .ne. %loc(vss_normal) ) Then
C..........If Variable Value not available, don't execute
              Block_status(Block) = 'On-Failed Msrd var '
              Write( 6, *) 'Feedback exit due to measured var not availa
              write(6,*)' ACS Block: ',block,'  at: ',now_time
              Return
           End If
```

```
C
          end if
          Van_status = Vss$g_curtime ( Measured_variable(Block) ,
     1                                 Measured_time_stamp )
C
C....Check the Measured variable to see if it is within limits
C
          If ( (Measured_value .lt. Measured_min(block) )  .or.
     1       (Measured_value .gt. Measured_max(block) )        ) Then
C..........Reject the data point
             Write( 6, *) 'Feedback exit due to out of limts measured'
             write(6,*)' ACS Block: ',block,'  at: ',now_time
             Block_status(Block) = 'On-Msrd out of lims '
             Return
          End if
C
C
C...Get the current manipulated value
C
C
C
C...Target is TPA PCS loop goal
C
         If ( Manip_var_system .eq. PCS_TPA_Loop  ) Then
             ACS_status = ACS_get_pcs_goal( 'TPA      '  ,
     1     Manip_var_number , Current_manipulated_value , )
             If ( ACS_Status .ne. %loc(ACS_success) ) Then
C............If PCS goal value not available, don't execute
                 Block_status(Block) = 'On-Err-PCS goal get'
                 Return
             End If
C
C...Target is DMT PCS loop goal
C
         Else If ( Manip_var_system .eq. PCS_DMT_loop ) Then
             ACS_status = ACS_get_pcs_goal( 'DMT      '  ,
     1     Manip_var_number , Current_manipulated_value )
             If ( ACS_Status .ne. %loc(ACS_success) ) Then
C............If PCS goal value not available, don't execute
                 Block_status(Block) = 'On-Err-PCS goal get'
                 Return
             End If
C
C...Target is ACS block goal
C
         Else If ( Manip_var_system .eq. ACS_block ) Then
             ACS_status = ACS_get_goal ( Manip_var_number ,
     1                                 Current_manipulated_value )
             If ( ACS_Status .ne. %loc(ACS_success) ) Then
C............If ACS goal Value not available, don't execute
                 Block_status(Block) = 'On-Err-ACS goal get'
                 Return
             End If
C
C...Target is Vantage variable
C
         Else If ( Manip_var_system .eq.
     1                                 Vantage_variable ) Then
             Van_Status = Geteuval ( Manip_var_number ,
     1                                 Current_manipulated_value )
             If ( Van_Status .ne. %loc(vss_success) ) Then
C.......... If Variable Value not available, don't execute
                 Block_status(Block) = 'On-Err-Vant var get '
                 Return
             End If
```

```
C
C...Target is Texas Instruments PM550 controller setpoint in CRD
C
        Else If ( ( Manip_var_system .ge. Low_PM550 ) .and.
     1            ( Manip_var_system .le. Hi_PM550  ) ) Then
C
          If ( Manip_var_system .eq. CRD_ESCHS_PM550_01 ) Then
             ACS_status = TI_get_loop_setpoint ( 'TI_PM550_01_PORT' ,
     1       Manip_var_number , Current_manipulated_value )
           Else If ( Manip_var_system .eq. CRD_ESCHS_PM550_02 ) Then
             ACS_status = TI_get_loop_setpoint ( 'TI_PM550_02_PORT' ,
     1       Manip_var_number , Current_manipulated_value )
           Else If ( Manip_var_system .eq. CRD_ESCHS_PM550_03 ) Then
             ACS_status = TI_get_loop_setpoint ( 'TI_PM550_03_PORT' ,
     1       Manip_var_number , Current_manipulated_value )
           Else If ( Manip_var_system .eq. CRD_ESCHS_PM550_04 ) Then
             ACS_status = TI_get_loop_setpoint ( 'TI_PM550_04_PORT' ,
     1       Manip_var_number , Current_manipulated_value )
           Else If ( Manip_var_system .eq. CRD_ESCHS_PM550_05 ) Then
             ACS_status = TI_get_loop_setpoint ( 'TI_PM550_05_PORT' ,
     1       Manip_var_number , Current_manipulated_value )
           Else If ( Manip_var_system .eq. CRD_ESCHS_PM550_06) Then
             ACS_status = TI_get_loop_setpoint ( 'TI_PM550_06_PORT' ,
     1       Manip_var_number , Current_manipulated_value )
           Else If ( Manip_var_system .eq. CRD_ESCHS_PM550_07) Then
             ACS_status = TI_get_loop_setpoint ( 'TI_PM550_07_PORT' ,
     1       Manip_var_number , Current_manipulated_value )
          End If
          If ( ACS_Status .ne. %loc(TI_success) ) Then
C.............If PM550 setpoint value not available, don't execute
             Block_status(Block) = 'On-Err-TI setpnt get'
             Write( 6, *)
     1         ' Feedback exit - TI PM550 Manip var not gettable.'
             Write (6, *) ' ACS Block: ',block,'  at: ',now_time
             Return
          End If
        Else   ! Other Manip device type
        End If
C
C...Value is within limits - Test to see if the error is less th
deadband
C
        Error = Measured_value - Goal(Block)
        If ( Abs(Error) .lt. Absolute_deadband(Block) ) Then
d          Write( 6, *) 'Feedback error less than deadband'
           Return
        End If
C
C.....Compute proportional Feedback Response-Test Delta to see if too
C
        Delta = Error * Proportional_gain(Block)
        If ( Abs(Delta) .gt. Max_manip_delta(Block) ) Then
           Delta = Sign(Max_manip_delta(Block),Delta)
        End If
C
C...Calculate new manipulated value, check to see it within limits
C
        New_manipulated_value = Current_manipulated_value + Delta
C
        If ( New_manipulated_value .gt. Manipulated_max(Block) ) Then
```

```
              New_manipulated_value = Manipulated_max(Block)
           Else If ( New_manipulated_value .lt. Manipulated_min(Block) )
              New_manipulated_value = Manipulated_min(Block)
           End If
           Delta = New_manipulated_value - Current_manipulated_value C
C... Transmit the new Manipulated Value to the manip variable
C
C...Target is TPA PCS loop goal
C
           If ( Manip_var_system .eq. PCS_TPA_Loop  ) Then
              ACS_status = ACS_put_pcs_goal( 'TPA         ' ,
      1           Manip_var_number , New_manipulated_value )
              If ( ACS_Status .ne. %loc(ACS_success) ) Then
C............If PCS goal value not available, don't execute
                 Block_status(Block) = 'On-Err-PCS goal put'
                 Write( 6, *) 'Feedback exit due to failed manip var put.
                 Write(6,*)' ACS Block: ',block,'  at: ',now_time
                 Return
              End If
C
C...Target is DMT PCS loop goal
C
           Else If ( Manip_var_system .eq. PCS_DMT_loop ) Then
              ACS_status = ACS_put_pcs_goal( 'DMT         ' ,
      1           Manip_var_number , New_manipulated_value )
              If ( ACS_Status .ne. %loc(ACS_success) ) Then
C............If PCS goal value not available, don't execute
                 Block_status(Block) = 'On-Err-PCS goal put'
                 Write( 6, *) 'Feedback exit due to failed manip var put.
                 Write(6,*)' ACS Block: ',block,'  at: ',now_time
                 Return
              End If
C
C...Target is ACS block goal
C
           Else If ( Manip_var_system .eq. ACS_block ) Then
              ACS_status = ACS_put_goal ( Manip_var_number ,
      1                           New_manipulated_value )
              If ( ACS_Status .ne. %loc(ACS_success) ) Then
C............If ACS goal Value not available, don't execute
                 Block_status(Block) = 'On-Err-ACS goal put'
                 Write( 6, *) 'Feedback exit due to failed manip var put.
                 Write(6,*)' ACS Block: ',block,'  at: ',now_time
                 Return
              End If
C
C...Target is Vantage variable
C
           Else If ( Manip_var_system .eq.
      1                                 Vantage_variable ) Then
              Van_status = Puteugen ( Manip_var_number ,
      1                           New_manipulated_value )
              If ( Van_Status .ne. %loc(vss_success) ) Then
C..........  If Variable Value not available, don't execute
                 Block_status(Block) = 'On-Err-Vant var put '
                 Write( 6, *) 'Feedback exit due to failed manip var put.
                 Write(6,*)' ACS Block: ',block,'  at: ',now_time
                 Return
              End If
```

```
C
C...Target is Texas Instruments PM550 controller setpoint in CRD
C
          Else If ( ( Manip_var_system .ge. Low_PM550 ) .and.
        1           ( Manip_var_system .le. Hi_PM550  ) ) Then
C
            If ( Manip_var_system .eq. CRD_ESCHS_PM550_01 ) Then
              ACS_status = TI_put_loop_setpoint ( 'TI_PM550_01_PORT' ,
        1       Manip_var_number , New_manipulated_value )
            Else If ( Manip_var_system .eq. CRD_ESCHS_PM550_02 ) Then
              ACS_status = TI_put_loop_setpoint ( 'TI_PM550_02_PORT' ,
        1       Manip_var_number , New_manipulated_value )
            Else If ( Manip_var_system .eq. CRD_ESCHS_PM550_03 ) Then
              ACS_status = TI_put_loop_setpoint ( 'TI_PM550_03_PORT' ,
        1       Manip_var_number , New_manipulated_value )
            Else If ( Manip_var_system .eq. CRD_ESCHS_PM550_04 ) Then
              ACS_status = TI_put_loop_setpoint ( 'TI_PM550_04_PORT' ,
        1       Manip_var_number , New_manipulated_value )
            Else If ( Manip_var_system .eq. CRD_ESCHS_PM550_05 ) Then
              ACS_status = TI_put_loop_setpoint ( 'TI_PM550_05_PORT' ,
        1       Manip_var_number , New_manipulated_value )
            Else If ( Manip_var_system .eq. CRD_ESCHS_PM550_06) Then
              ACS_status = TI_put_loop_setpoint ( 'TI_PM550_06_PORT' ,
        1       Manip_var_number , New_manipulated_value )
            Else If ( Manip_var_system .eq. CRD_ESCHS_PM550_07) Then
              ACS_status = TI_put_loop_setpoint ( 'TI_PM550_07_PORT' ,
        1       Manip_var_number , New_manipulated_value )
            End If
            If ( ( ACS_Status .ne. %loc(TI_success) .and.
        1        ( ACS_status .ne. %loc(TI_clamped)         ) Then
C.............If PM550 setpoint value not accessible, dont execute
              Block_status(Block) = 'On-Err-TI setpnt put'
              Write( 6, *) ' Feedback exit - TI  PM550  Manip v
 puttable.'
              Write (6, *) ' ACS Block: ',block,'  at: ',now_time
              Return
            End If
          Else  ! Other manip device types
          End If
C
C....Load special arrays for user programs to log messages.
C
              User_integer(1) = Measured_time_stamp
              User_integer(2) = Integer_now
              User_real(1)    = Delta
              User_real(2)    = Error
              User_character(1) = 'Feedback       '
C
C...If Delta is non-zero, update past actions
C
          If ( Delta .ne. 0 ) Then
            Do 90 J = 5,2,-1
              Past_action_value(Block,J) = Past_action_value(Block,J-1)
       90     Past_action_time (Block,J) = Past_action_time (Block,J-1)
            Past_action_value(Block,1) = Delta
            Past_action_time (Block,1) = Integer_now
          End If
C
C....Call User subprograms for this block
C
          Call User_programs(Block)
```

```
C
C...All done
C
      Return
      End
```

Data passed to the user routine

The feedforward block passes information about its actions to the user routine through the User_vars common block. The use of this data is described in more detail in the chapter covering User routines. In the presently preferred embodiment, the data passed by the feedforward block includes:

User_integer(1) - the time stamp of the measured variable;

User_integer(2) - the time the action was taken;

User_real(1) - the change in the value of the manip variable;

User_real(2) - the change in the value of the measured variable from the last time the "old measured value" was updated;

User_character(1) - = 'Feedforward'.

Sample Source Code

The source code for the procedure which actually performs this function, in the presently preferred embodiment, is as follows.

Table 3

```
C*************************************
C
C     FEEDFORWARD_block.FOR
C
C     Subroutine to do feedforward calculations on the Vax,
C     communicating directly with the target system.
C
C
C
C*************************************
C
      Subroutine Feedforward_block ( Block )
C
      Include 'ACS$includes:Block_parameters.inc/nolist'
```

```fortran
        Include 'ACS$includes:Van_functions.inc/nolist'
        Include 'ACS$includes:User_vars.inc/nolist'
        Include 'ACS$includes:ACSstatus.inc/nolist'
        Include 'ACS$includes:ACSserv.inc'
        Include 'Acs$includes:TIserv.inc'
        Include 'Acs$includes:TIstatus.inc'
        Include 'ACS$includes:Manip_params.inc'
        Include 'ACS$includes:Meas_params.inc'
C
        Integer*2       Manip_var_type
        Integer*2       Manip_var_num
        Integer*2       Meas_var_type
        Integer*2       Meas_var_num
        Integer*4       Block
        Real*4          Measured_value
        Real*4          Current_manipulated_value
        Real*4          New_manipulated_value
        Integer*4       Integer_Now
        Character*20    Character_now
        Integer*4       Measured_time_stamp
C
        Van_status = Vss$_from_ascii_time ( ' ' , Integer_now )
        Van_status = Vss$_to_ascii_time( Integer_now , Character_now )
C
C...Get the measured value
C
        ACS_status = ACS_get_meas_var_type ( Block , Meas_var_type )
        ACS_status = ACS_get_meas_var_num  ( Block , Meas_var_num )
        Measured_time_stamp = 0
C
C...Measured Value  is TPA PCS loop goal
C
        If ( Meas_var_type .eq. PCS_TPA_Loop_goal  ) Then
           ACS_status = ACS_get_pcs_goal( 'TPA       '  ,
     1          Meas_var_num , Measured_value )
           If ( ACS_Status .ne. %loc(ACS_success) ) Then
C............If PCS goal value not available, don't execute
              Block_status(Block) = 'On-Err-PCS goal get'
              Write( 6, *) 'Feedback exit due to measured var not availa
              write(6,*)' ACS Block: ',block,'  at: ',Character_now
              Return
           End If
C
C...Measured Value  is DMT PCS loop goal
C
        Else If ( Meas_var_type .eq. PCS_DMT_loop_goal ) Then
           ACS_status = ACS_get_pcs_goal( 'DMT       '  ,
     1          Meas_var_num , Measured_value )
           If ( ACS_Status .ne. %loc(ACS_success) ) Then
C............If PCS goal value not available, don't execute
              Block_status(Block) = 'On-Err-PCS goal get'
              Write( 6, *) 'Feedback exit due to measured var not availa
              write(6,*)' ACS Block: ',block,'  at: ',Character_now
              Return
           End If
C
C...Measured Value  is ACS block goal
C
        Else If ( Meas_var_type .eq. ACS_block_goal ) Then
           ACS_status = ACS_get_goal (
     1          Meas_var_num , Measured_value )
           If ( ACS_Status .ne. %loc(ACS_success) ) Then
```

```
C............If ACS goal Value not available, don't execute
            Block_status(Block) = 'On-Err-ACS goal get'
            Write( 6, *) 'Feedback exit due to measured var not avai write(6,*)' ACS Block: ',block,'  at: ',Character_now
            Return
         End If
C
C...Measured Value   is Vantage variable
C
         Else If ( Meas_var_type .eq. cur_val_Van_var ) Then
           Van_Status = Vss$g_current( Meas_var_num ,
     1         Measured_value )
           If ( Van_Status .ne. %loc(vss_normal) ) Then
C..........If Variable Value not available, don't execute
            Block_status(Block) = 'On-Failed Msrd var '
            Write( 6, *) 'Feedback exit due to measured var not availa
            write(6,*)' ACS Block: ',block,'  at: ',Character_now
            Return
           End If
           Van_status = Vss$g_curtime ( Meas_var_num ,
     1                                  Measured_time_stamp )
C
         End If
C
C....Check the Measured variable to see if it is within limits
C
         If (  (Measured_value .lt. Measured_min(block) )   .or.
     1        (Measured_value .gt. Measured_max(block) )         ) Then
C.....Reject the data point
            Return
         End if
C
C...Test to see if the change in the measured value is less th
deadband
C
         Delta_meas = Measured_value - Old_measured_value(Block)
         If ( Abs( Delta_meas ) .lt.
     1                   Absolute_deadband(Block)              ) Then
            Return
         End If
C
C...Special action for 'On-deselected' status - update old_meas_valu
exit.
C
         Old_measured_value(Block) = Measured_value
         If ( Block_status(Block)(1:13) .eq. 'On-deselected' ) Then
            Return
         End If
C
C...Value is within limits - Compute Feedforward Response
C
         Delta_manip = Delta_meas * Proportional_gain(Block)
C
C...Test Delta_manip to see if too great
C
         If ( Abs(Delta_manip) .gt. Max_manip_delta(Block) ) Then
            Delta_manip = Sign(Max_manip_delta(Block),Delta_manip)
         End If
C
C...Get the current manipulated value
```

```
C
        ACS_status = ACS_get_manip_var_sys ( Block , Manip_var_type )
        ACS_status = ACS_get_manip_var_num   ( Block , Manip_var_num )
C
C...Target is TPA PCS loop goal
C
        If ( Manip_var_type .eq. PCS_TPA_Loop  ) Then
           ACS_status = ACS_get_pcs_goal( 'TPA         ' ,
     1     Manip_var_num , Current_manipulated_value , )
           If ( ACS_Status .ne. %loc(ACS_success) ) Then
C............If PCS goal value not available, don't execute
              Block_status(Block) = 'On-Err-PCS goal get'
              Return
           End If
C
C...Target is DMT PCS loop goal
C
        Else If ( Manip_var_type .eq. PCS_DMT_loop ) Then
           ACS_status = ACS_get_pcs_goal( 'DMT         ' ,
     1     Manip_var_num , Current_manipulated_value )
           If ( ACS_Status .ne. %loc(ACS_success) ) Then
C............If PCS goal value not available, don't execute
              Block_status(Block) = 'On-Err-PCS goal get'
              Return
           End If
C
C...Target is ACS block goal
C
        Else If ( Manip_var_type .eq. ACS_block ) Then
           ACS_status = ACS_get_goal ( Manip_var_num ,
     1                                 Current_manipulated_value )
           If ( ACS_Status .ne. %loc(ACS_success) ) Then
C............If ACS goal Value not available, don't execute
              Block_status(Block) = 'On-Err-ACS goal get'
              Return
           End If
C
C...Target is Vantage variable
C
        Else If ( Manip_var_type .eq.
     1                                Vantage_variable ) Then
           Van_Status = Geteuval ( Manip_var_num ,
     1                             Current_manipulated_value )
           If ( Van_Status .ne. %loc(vss_success) ) Then
C.......... If Variable Value not available, don't execute
              Block_status(Block) = 'On-Err-Vant var get '
              Return
           End If
C
C...Target is Texas Instruments PM550 controller setpoint in CRD
C
        Else If ( ( Manip_var_type .ge. Low_PM550 ) .and.
     1            ( Manip_var_type .le. Hi_PM550  ) ) Then
C
           If ( Manip_var_type .eq. CRD_ESCHS_PM550_01 ) Then
              ACS_status = TI_get_loop_setpoint ( 'TI_PM550_01_PORT' ,
     1        Manip_var_num , Current_manipulated_value )
           Else If ( Manip_var_type .eq. CRD_ESCHS_PM550_02 ) Then
              ACS_status = TI_get_loop_setpoint ( 'TI_PM550_02_PORT' ,
     1        Manip_var_num , Current_manipulated_value )
           Else If ( Manip_var_type .eq. CRD_ESCHS_PM550_03 ) Then
              ACS_status = TI_get_loop_setpoint ( 'TI_PM550_03_PORT' ,
```

```
    1       Manip_var_num , Current_manipulated_value )
          Else If ( Manip_var_type .eq. CRD_ESCHS_PM550_04 ) Then
             ACS_status = TI_get_loop_setpoint ( 'TI_PM550_04_PORT' ,
    1       Manip_var_num , Current_manipulated_value )
          Else If ( Manip_var_type .eq. CRD_ESCHS_PM550_05 ) Then
             ACS_status = TI_get_loop_setpoint ( 'TI_PM550_05_PORT' ,
    1       Manip_var_num , Current_manipulated_value )
          Else If ( Manip_var_type .eq. CRD_ESCHS_PM550_06) Then
             ACS_status = TI_get_loop_setpoint ( 'TI_PM550_06_PORT' ,
    1       Manip_var_num , Current_manipulated_value )
          Else If ( Manip_var_type .eq. CRD_ESCHS_PM550_07) Then
             ACS_status = TI_get_loop_setpoint ( 'TI_PM550_07_PORT' ,
    1       Manip_var_num , Current_manipulated_value )
          End If
          If ( ACS_Status .ne. %loc(TI_success) ) Then
C.............If PM550 setpoint value not available, don't execute
             Block_status(Block) = 'On-Err-TI setpnt get'
             Write( 6, *)
    1          ' Feedforward exit - TI PM550 Manip var not accessible
             Write (6, *) ' ACS Block: ',block,' at: ',now_time
             Return
          End If
       Else    ! Other Manip device type
       End If
C
C...Calculate new manipulated value, check to see it within limits
C
       New_manipulated_value = Current_Manipulated_value + Delta_mani
C
       If ( New_manipulated_value .gt. Manipulated_max(Block) ) Then
          New_manipulated_value = Manipulated_max(Block)
       Else If ( New_manipulated_value .lt. Manipulated_min(Block) )
          New_manipulated_value = Manipulated_min(Block)
       End If
       Delta_manip = New_manipulated_value - Current_Manipulated_valu
C
C... Transmit the New Manipulated Value to the manipulated variable
C
C...Target is TPA PCS loop goal
C
       If ( Manip_var_type .eq. PCS_TPA_Loop  ) Then
          ACS_status = ACS_put_pcs_goal( 'TPA          ' , 1        Manip_var_num , New_manipulated_value )
          If ( ACS_Status .ne. %loc(ACS_success) ) Then
C.............If PCS goal value not available, don't execute
             Block_status(Block) = 'On-Err-PCS goal put'
             Write( 6, *) 'Feedback exit due to failed manip var put.
             Write(6,*)' ACS Block: ',block,' at: ',now_time
             Return
          End If
C
C...Target is DMT PCS loop goal
C
       Else If ( Manip_var_type .eq. PCS_DMT_loop ) Then
          ACS_status = ACS_put_pcs_goal( 'DMT          ' ,
    1         Manip_var_num , New_manipulated_value )
          If ( ACS_Status .ne. %loc(ACS_success) ) Then
C.............If PCS goal value not available, don't execute
             Block_status(Block) = 'On-Err-PCS goal put'
             Write( 6, *) 'Feedback exit due to failed manip var put.
```

```
                  Write(6,*)' ACS Block: ',block,'  at: ',now_time
                  Return
               End If
C
C...Target is ACS block goal
C
           Else If ( Manip_var_type .eq. ACS_block ) Then
               ACS_status = ACS_put_goal ( Manip_var_num ,
     1                           New_manipulated_value )
               If ( ACS_Status .ne. %loc(ACS_success) ) Then
C............If ACS goal Value not available, don't execute
                  Block_status(Block) = 'On-Err-ACS goal put'
                  Write( 6, *) 'Feedback exit due to failed manip var put.
                  Write(6,*)' ACS Block: ',block,'  at: ',now_time
                  Return
               End If
C
C...Target is Vantage variable
C
           Else If ( Manip_var_type .eq.
     1                            Vantage_variable ) Then
               Van_status = Puteugen ( Manip_var_num ,
     1                           New_manipulated_value )
               If ( Van_Status .ne. %loc(vss_success) ) Then
C..........   If Variable Value not available, don't execute
                  Block_status(Block) = 'On-Err-Vant var put '
                  Write( 6, *) 'Feedback exit due to failed manip var put.
                  Write(6,*)' ACS Block: ',block,'  at: ',now_time
                  Return
               End If
C
C...Target is Texas Instruments PM550 controller setpoint in CRD
C
           Else If ( ( Manip_var_type .ge. Low_PM550 ) .and.
     1               ( Manip_var_type .le. Hi_PM550  ) ) Then
C
               If ( Manip_var_type .eq. CRD_ESCHS_PM550_01 ) Then
                  ACS_status = TI_put_loop_setpoint ( 'TI_PM550_01_PORT' ,
     1               Manip_var_num , New_manipulated_value )
                Else If ( Manip_var_type .eq. CRD_ESCHS_PM550_02 ) Then
                  ACS_status = TI_put_loop_setpoint ( 'TI_PM550_02_PORT' ,
     1               Manip_var_num , New_manipulated_value )
                Else If ( Manip_var_type .eq. CRD_ESCHS_PM550_03 ) Then
                  ACS_status = TI_put_loop_setpoint ( 'TI_PM550_03_PORT' ,
     1               Manip_var_num , New_manipulated_value )
                Else If ( Manip_var_type .eq. CRD_ESCHS_PM550_04 ) Then
                  ACS_status = TI_put_loop_setpoint ( 'TI_PM550_04_PORT' ,
     1               Manip_var_num , New_manipulated_value )
                Else If ( Manip_var_type .eq. CRD_ESCHS_PM550_05 ) Then
                  ACS_status = TI_put_loop_setpoint ( 'TI_PM550_05_PORT' ,
     1               Manip_var_num , New_manipulated_value )
                Else If ( Manip_var_type .eq. CRD_ESCHS_PM550_06) Then
                  ACS_status = TI_put_loop_setpoint ( 'TI_PM550_06_PORT' ,
     1               Manip_var_num , New_manipulated_value )
                Else If ( Manip_var_type .eq. CRD_ESCHS_PM550_07) Then
                  ACS_status = TI_put_loop_setpoint ( 'TI_PM550_07_PORT' ,
     1               Manip_var_num , New_manipulated_value )
               End If
               If ( ACS_Status .ne. %loc(TI_success) ) Then
C............If PM550 setpoint value not available, don't execute
                  Block_status(Block) = 'On-Err-TI setpnt put'
                  Write( 6, *)
```

```
1         ' Feedforward exit - TI PM550 Manip var not puttable.'
              Write (6, *) ' ACS Block: ',block,'  at: ',now_time
              Return
           End If
        Else   ! Other Manip device type
        End If
C
C....Load special arrays for user programs to log messages.
C
           User_integer(1)   = Measured_time_stamp
           User_integer(2)   = Integer_now
           User_real(1)      = Delta_manip
           User_real(2)      = Delta_meas
           User_character(1) = 'Feedforward     '
C
C...If Delta is non-zero, update past actions
C
        If ( Delta_manip .ne. 0 ) Then
           Do 90  J = 5,2,-1
              Past_action_value(Block,J) = Past_action_value(Block,J-1)
90            Past_action_time (Block,J) = Past_action_time (Block,J-1)
           Past_action_value(Block,1) = Delta_manip
           Past_action_time (Block,1) = Integer_now
        End If
C
C....Call User subprograms for this block
C
        Call User_programs(Block)
        Return
        End
```

Table 4

```
C*******************************
C
C       Shewhart_block.for
C
C
C*******************************
C
        Subroutine Shewhart_block ( Block)
C
        Include 'ACS$includes:Block_parameters.inc/nolist'
        Include 'acs$includes:ACSserv.inc/nolist'
        Include 'acs$includes:ACSstatus.inc/nolist'
        Include 'ACS$includes:Van_functions.inc/nolist'
        Include 'ACS$includes:Filter_params.inc/nolist'
        Include 'ACS$includes:dev_params.inc/nolist'
        Include 'ACS$includes:rule_params.inc/nolist'
        Include 'ACS$includes:User_vars.inc'

Integer*4      Block
        Integer        Error_lun
        Parameter      ( Error_lun = 6 )
        Character*20   Store_time
        Character*20   now_time
C
        Integer*2      Filtered_variable
        Integer*2      Deviation_variable
        Integer*2      Rule_variable
        Integer*2      Filtered_variable_type
```

```
            Integer*2        Deviation_variable_type
            Integer*2        Rule_variable_type
            Integer*4        I4_deviation_variable
            Integer*4        I4_rule_variable
            Real*4           Aim
            Real*4           Sigma
            Integer*4        Integer_fix_time
            Integer*4        Cutoff_time
            Integer*4        Safe_time
            Real*4           Deviation
            Real*4           Rule
            Real*4           Last_filtered_value
            Logical          All_same_sign
            Logical          Need_violation
C
            Integer*4        Num_points
            Parameter        (Num_points = 7)
            Real*4           Point(Num_points)
            Integer*4        Times(Num_points)
            Character*18     Char_times(Num_points)
            Integer*4        Num_points1
            Parameter        (Num_points1 = 8)
            Real*4           Point1(Num_points1)
            Integer*4        Times1(Num_points1)
            Character*18     Char_times1(Num_points1)
            Real*4           Violation_value(1)
            Integer*4        Violation_time(1)
            Integer*4        Newest_time
            Integer*4        Oldest_time
            Integer*4        Buffer_size
            Logical*1        First_request
            Integer*4        Block_location
            Integer*4        Entry_count
            Integer*4        Begin_span_status
            Byte             Interp_flags
            Integer*4        Begin_span_time
            Integer*4        End_span_time
            Integer*4        Num_points_retrieved
            Integer*4        Integer_Now
            Integer*2        Start_point
C
C....Special case for 'On-deselected' status
C
            If ( Block_status(Block)(1:13) .eq. 'On-deselected' ) Then
               Return
            End If
C
C..Set the value of the local variables
C
            ACS_status = ACS_get_filtered_var_type(Block,filtered_variable Filtered_variable = Measured_variable(Block)
            ACS_status = ACS_get_dev_var_type ( Block , deviation_variabl
)
            Deviation_variable = Manipulated_variable(Block)
            ACS_status = ACS_get_rule_var_type ( Block , rule_variable_typ
            Rule_variable = New_manipulated_variable(Block)
            Aim = Goal(Block)
            Sigma = Absolute_deadband(Block)
            Integer_fix_time = Fix_time(Block)
C
            Van_status = Vss$_from_ascii_time ( ' ' , Integer_now )
            Van_status = Vss$_to_ascii_time ( Integer_now , now_time )
```

```
d           Van_status = Vss$_to_ascii_time ( Integer_now , Store_time )
d           write(6,202) ' Calling Shewhart on var ',filtered_variable,' a
d      1 Store_time
d 202    format(//,a,' ',i5,' ',a,' ',a)
c
c...Retrieve enough points to test all the rules
c
         If ( Filtered_variable_type .eq. Van_var_filter ) Then
c
           Newest_time = Integer_now
           Oldest_time = Newest_time - 365*24*60*60
           Buffer_size = Num_points
           First_request = .True.
           Num_points_retrieved = 0
           Start_point = 1
c
           Do 777 j = 1,Num_points
           Times(j) = 0
 777       Point(j) = 0.0
c
           Van_status = %loc(vss_systemdown)
           Do While ( (Van_status .eq. %loc(vss_systemdown)) .or.
     1              (Van_status .eq. %loc(vss_unavaildata)) )
c
             Van_status = Vss$_Retrieve ( Filtered_variable , Newest_tim
     1         Oldest_time , Buffer_size , Times(start_point) ,
     1          Point(Start_point) ,
     1         First_request , Block_location , Entry_count ,
     1         Begin_span_status , Interp_flags , Begin_span_time ,
     1         End_span_time )
             Num_points_retrieved = Num_points_retrieved + Entry_count
             If ( Num_points_retrieved .lt. Num_points ) then
                Buffer_size = Buffer_size - Num_points_retrieved
                Start_point = Start_point + Entry_count
             End If
d            write(6,*) 'Finished data retr.'
c
           End Do
c
d          do 11 J =1,Num_points
d  11      Van_status = Vss$_to_ascii_time ( Times(j) , Char_times(j))
d          write(6,12) (Char_times(j),Point(j),j=1,num_points)
d  12      Format( /,' Here are the times and points:',//
d      1         (' ',a18,' ',f12.4 , / ) )
d          write(6,*) ' Got ',Num_points_retrieved,' points.'
           If ( Num_points_retrieved .lt. Num_points ) then
             Write(Error_lun,*)
     1       'Shewhart Failed to get enough data on Variable ',
     1         Filtered_variable
             write(error_lun,*)'from ACS block:',block,' at:',now_time
             Write(Error_lun,*) 'Wanted ',Num_points,';  Got ',
     1         Num_points_retrieved
             Return
           End If
d          write(6,*) 'Got enough points.'
c
c
c....Check the Measured variable to see if it is within limits
c
           Last_filtered_value = Point(1)
           If (  (Last_filtered_value .lt. Measured_min(block) )  .or.
     1         (Last_filtered_value .gt. Measured_max(block) )       ) T
c.....Reject the data point
```

```
                    Write( 6, *) 'Shewhart exit due to out of limts filtered.'
                    write(6,*)' ACS Block: ',block,' at: ',now_time
                    Return
                End if
            Else if ( Filtered_variable_type .eq. Van_run_2_filter ) Then
c
                Newest_time = Integer_now
                Oldest_time = Newest_time - 365*24*60*60
                Buffer_size = Num_points1
                First_request = .True.
                Num_points_retrieved = 0
                Start_point = 1
c
                Do 1777 j = 1,Num_points1
                    Times1(j) = 0
1777            Point1(j) = 0.0
c
                Van_status = %loc(vss_systemdown)
                Do While ( (Van_status .eq. %loc(vss_systemdown)) .or.
              1            (Van_status .eq. %loc(vss_unavaildata)) )
c
                    Van_status = Vss$_Retrieve ( Filtered_variable , Newest_tim
              1         Oldest_time , Buffer_size , Times1(start_point) ,
              1          Point1(Start_point) ,
              1          First_request , Block_location , Entry_count ,
              1          Begin_span_status , Interp_flags , Begin_span_time ,
              1          End_span_time )
                    Num_points_retrieved = Num_points_retrieved + Entry_count
                    If ( Num_points_retrieved .lt. Num_points1 ) then
                        Buffer_size = Buffer_size - Num_points_retrieved
                        Start_point = Start_point + Entry_count
                    End If
d           write(6,*) 'Finished data retr.'
c
                End Do
c
d               do 111 J =1,Num_points1
d      111      Van_status = Vss$_to_ascii_time ( Times1(j) , Char_times1(j))
d               write(6,112) (Char_times1(j),Point1(j),j=1,num_points1)
d      112      Format( /,' Here are the times and points:',//
d             1          (' ',a18,'  ',f12.4 , / ) )
d               write(6,*) ' Got ',Num_points_retrieved,' points.'
                If ( Num_points_retrieved .lt. Num_points1 ) then
                    Write(Error_lun,*)
              1     'Shewhart Failed to get enough data on Variable ',
              1         Filtered_variable
                    write(error_lun,*)'from ACS block:',block,' at:',now_time
                    Write(Error_lun,*) 'Wanted ',Num_points1,'; Got ',
              1         Num_points_retrieved
                    Return
                End If
d           write(6,*) 'Got enough points.'
C....Check the Measured variable to see if it is within limits
c
                Last_filtered_value = (Point1(1)+Point1(2))/2.
                If (  (Last_filtered_value .lt. Measured_min(block) )  .or.
              1       (Last_filtered_value .gt. Measured_max(block) )        ) T
C.....Reject the data point
                    Write( 6, *) 'Shewhart exit due to out of limts filtered.'
                    write(6,*)' ACS Block: ',block,' at: ',now_time
                    Return
                End if
```

```
c
      Do j = 1,num_points                         ! running average
         point(j) = (point1(j)+point1(j+1))/2
         times(j) = times1(j)
      end do Else ! Improper filtered type
         Write( 6, *) 'Shewhart exit due to invalid filtered var type.'
         write(6,*)' ACS Block: ',block,' at: ',now_time
         Return
      End If ! Filtered types
c
c
C....Check to see if the last violation was within the Fix time -
C    If so, do no calculations.
c
C...Retrieve the last stored nonzero deviation from aim
c
      If ( Deviation_variable_type .eq. Van_var_dev ) Then
c
      Newest_time = Integer_now
      Oldest_time = Newest_time - 365*24*60*60
      Buffer_size = 1
      First_request = .True.
      Need_violation = .True.
      Do While ( Need_violation )
c
         Van_status = Vss$_Retrieve ( Deviation_variable , Newest_ti
     1       Oldest_time , Buffer_size , Violation_time ,
     1        Violation_value ,
     1        First_request , Block_location , Entry_count ,
     1        Begin_span_status , Interp_flags , Begin_span_time ,
     1        End_span_time )
c
         If ( ( Van_status .ne. %loc(vss_systemdown) ) .and.
     1        ( Van_status .ne. %loc(vss_unavaildata)) .and.
     1        ( Van_status .ne. %loc(vss_notallfound))       ) Then
c
            Write(6,*)' Shewhart Violation retr - status vss_badva
            write(6,*)' ACS Block: ',block,' at: ',now_time
c
         Else If( Van_status .eq. %loc(Vss_badtime) ) then
            Write(6,*)' Shewhart Violation retr - status vss_badti
            write(6,*)' ACS Block: ',block,' at: ',now_time
c
         Else If( Van_status .eq. %loc(Vss_badtimespan) ) then
            Write(6,*)' Shewhart   Violation   retr   -  s
     vss_badtimespan'
            write(6,*)' ACS Block: ',block,' at: ',now_time
c
         Else If( Van_status .eq. %loc(Vss_badbufsize) ) then
            Write(6,*)' Shewhart Violation retr - status vss_badbu write(6,*)' ACS Block: ',block,' at: ',now_time
c
         Else If( Van_status .eq. %loc(Vss_normal) ) then
            Write(6,*)' Shewhart Violation retr - status vss_norma
            write(6,*)' ACS Block: ',block,' at: ',now_time
c
         Else If( Van_status .eq. %loc(Vss_nonefound) ) then
            Write(6,*)' Shewhart Violation retr - status vss_nonef
            write(6,*)' ACS Block: ',block,' at: ',now_time
```

```
c
          Else If( Van_status .eq. %loc(Vss_nomoreonline) ) then
               Write(6,*)'   Shewhart   Violation   retr  -  s
vss_nomoreonline'
               write(6,*)' ACS Block: ',block,'  at: ',now_time
c
          End If
          WRite(6,*) ' Van_status = ',Van_status
          Van_status = Vss$_to_ascii_time ( Violation_time(1) , Stor
)
          Write(Error_lun,*)
     1    'Shewhart-couldn''t get a non zero deviation - exiting'
          write(6,*)' ACS Block: ',block,'  at: ',now_time
          Write(Error_lun,*)
     1    ' Oldest violation got: ',Violation_value(1),' at ',Store_
          Return
        End If
        If ( ( Abs(Violation_value(1)) .gt. 1.0 E-10 ) .or.
     1       ( Violation_time(1) .lt.
     1                (Times(7) - Abs( Integer_fix_time ))) ) Then
          Need_violation = .False.
        End If
c
      End Do
      Else ! Improper deviation var type
        Write( 6, *) 'Shewhart exit due to invalid deviation var type
        write(6,*)' ACS Block: ',block,'  at: ',now_time
        Return
      End If ! Get last deviation for allowed deviation types
c
c
d     Van_status = Vss$_to_ascii_time ( Violation_time(1) , Store_ti
d     write(6,*) ' Got a violation of ',Violation_value(1),' at ',
d   1                          Store_time
c
C....Go through the shewhart Rules - any point older than the last vio
c    time + the fix time is not acceptable.
c
      Cutoff_time = Violation_time(1) + Abs(Integer_fix_time)
d     Van_status = Vss$_to_ascii_time ( Cutoff_time , Store_time )
d     write(6,*) ' Cutoff time is ',  Store_time
c
      Deviation = 0.0
      Rule = 0.0
c
      If ( Times(1) .lt. Cutoff_time ) Return
d     write(error_lun,*) 'Testing 1 out of 1 rule.'
      If ( Abs(Point(1)-Aim) .gt. 3*Sigma ) Then
        Deviation = Point(1) - Aim
        Rule = 1.0
        Go To 1000
      End if
c
C..Test 2 in a row outside 2 sigma
c
      If ( Times(2) .lt. Cutoff_time ) Go To 1000
d     write(error_lun,*) 'Testing 2 out of 2 rule.'
      Sum_points  = 0.0
      Num_out_high = 0
      Num_out_low  = 0
      Do 2 J = 1,2
```

```
              Sum_points = Sum_points + Point(J)
              If ( (Point(J)-Aim) .gt. 2*Sigma ) Then
                 Num_out_high = Num_out_high +1
              Else If ( (Point(J)-Aim) .lt. -2*Sigma ) Then
                 Num_out_low  = Num_out_low  + 1
              End If
    2     Continue
          If ( ( Num_out_high .eq. 2 ) .or.
    1        ( Num_out_low   .eq. 2 )          ) Then
             Deviation = Sum_points/2 - Aim
             Rule = 3.0
             Go To 1000
          End If
c
c...Test 2 out of 3 outside of 2 sigma
c
          If ( Times(3) .lt. Cutoff_time ) Go To 1000
d         write(error_lun,*) 'Testing 2 out of 3 rule.'
          Sum_points = Sum_points + Point(3)
          If ( (Point(3)-Aim) .gt. 2*Sigma ) Then
             Num_out_high = Num_out_high +1
          Else If ( (Point(3)-Aim) .lt. -2*Sigma ) Then
             Num_out_low  = Num_out_low  + 1
          End If
          If ( ( Num_out_high .eq. 2 ) .or.
    1        ( Num_out_low   .eq. 2 )          ) Then
             Deviation = Sum_points/3 - Aim
             Rule = 3.0
             Go To 1000
          End If
c
c...Test 4 in a row outside 1 sigma
c
          If ( Times(4) .lt. Cutoff_time ) Go To 1000
d         write(error_lun,*) 'Testing 4 out of 4 rule.'
          Sum_points = 0.0
          Num_out_high = 0
          Num_out_low  = 0
          Do 3 J = 1,4
          Sum_points = Sum_points + Point(J)
          If ( (Point(J)-Aim) .gt. 1*Sigma ) Then
             Num_out_high = Num_out_high +1
          Else If ( (Point(J)-Aim) .lt. -1*Sigma ) Then
             Num_out_low  = Num_out_low  + 1
          End If
    3     Continue
          If ( ( Num_out_high .eq. 4 ) .or.
    1        ( Num_out_low   .eq. 4 )          ) Then
             Deviation = Sum_points/4 - Aim
             Rule = 5.0
             Go To 1000
          End If
c
c...Test 4 out of 5 outside 1 sigma
c
          If ( Times(5) .lt. Cutoff_time ) Go To 1000
d         write(error_lun,*) 'Testing 4 out of 5 rule.'
          Sum_points = Sum_points + Point(5)
          If ( (Point(5)-Aim) .gt. 1*Sigma ) Then
             Num_out_high = Num_out_high +1
          Else If ( (Point(5)-Aim) .lt. -1*Sigma ) Then
             Num_out_low  = Num_out_low  + 1
          End If
```

```
              If ( ( Num_out_high .eq. 4 ) .or.
       1           ( Num_out_low   .eq. 4 )          ) Then
                  Deviation = Sum_points/5 - Aim
                  Rule = 5.0
                  Go To 1000
              End If
C
C...Test 7 in a row - same side of aim
C
              If ( Times(7) .lt. Cutoff_time ) Go To 1000
       d      write(error_lun,*) 'Testing 7 in a row rule.'
              Sum_points = 0.0
              Sign_deviation = Sign( 1.0,(Aim-Point(1)) )
              If ( (Aim-Point(1)) .ne. 0) Then
                  All_same_sign = .True.
              else
                  All_same_sign = .False.
              End if
              Do 4 J = 1,7
                  If ( (Aim-Point(J)) .eq. 0) Then
                      All_same_sign = .False.
                  Else If ( Sign( 1.0,(Aim-Point(J)) ) .ne. Sign_deviation )
                      All_same_sign = .False.
                  End if
       4      Sum_points = Sum_points + Point(J)

If ( All_same_sign ) then
                  Deviation = Sum_points/7 - Aim
                  Rule = 7.0
                  Go To 1000
              End If
C
 1000         Continue
       d      write(6,*) 'Got deviation, rule of ',deviation,rule
C
C...Clamp the deviation at allowed limits
C
              If ( Deviation .gt. Manipulated_max(Block) ) Then
                  Deviation = Manipulated_max(Block)
              Else If ( Deviation .lt. Manipulated_min(Block) ) Then
                  Deviation = Manipulated_min(Block)
              End If
C
C...Store the Computed Deviation and Rule number with Timestamp
C
       d      Van_status = Vss$_to_ascii_time ( Times(1) , Store_time )
       d      write(6,*) 'putting var ',i4_deviation_variable,' at ',store_t
       d     1' with value ',deviation
       c
              If ( Deviation_variable_type .eq. Van_var_dev ) Then
                  I4_deviation_variable = Deviation_variable
                  Dmt_status = Dmt$_putlab ( I4_deviation_variable , Times(1) ,
              1                Deviation , 2 , .False. )
              Else ! Other deviation types
              End If ! Deviation types
       c
       d      write(6,*) ' Did putlabs -first status = ',dmt_status
       d      write(6,*) 'putting var ',i4_rule_variable,' at ',store_time,
       d     1' with value ',rule
       c
              If ( Rule_variable_type .eq. Van_var_rule ) Then
```

Table 6

```
C**************************************
C
C       Build_expert.for
C
C       Routine to generate FORTRAN expert system code using
C       the process rulebase.
C
C
C**************************************
C
        Subroutine Build_expert
C
        Include 'pace$includes:Variable_rule_params.inc'
        Include 'pace$includes:Expert_data.inc'
        Include 'pace$includes:Analysis_commons.inc'
        Include 'pace$includes:Analysis_rule.inc'
        Include 'pace$includes:Action_commons.inc'
        Include 'pace$includes:Action_rule.inc'
        Include 'pace$includes:Action_params.inc'
C
        Logical First
        Logical No_more
        Character*25    Last_cond
        Character*80    code_dir_file
        Character*80    Directory
        Integer*2       L_dir
        Character*39    Subroutine_name
        Character*14    Subprocess_name
        Character*3     Cblock
        Integer*2       L_sp
        Character*1     Search_string
        Integer*2       Srlen
C
        Call Fdv$Putl(' Generating Expert System code....')
C
C...Rewind the code file
C
d       write(6,*) ' will rewind code file'
        Rewind ( Unit = Code_lun )
        Next_label = 2
C
C...Get the name of the expert system code file, pick out the C    subr
name from it
C
d       Call Fdv$putl ( 'Will translate logicals.')
        Call Lib$sys_trnlog ( 'PACE$RULES' ,, Directory      ,,,)
        Call Lib$sys_trnlog ( 'PACE$CODE'  ,, Code_dir_file ,,,)
d       Call Fdv$putl ( 'Did translate logicals.')
        Istart = Index ( Code_dir_file, ']' )
        I4_rule_variable = rule_variable
        Dmt_status = Dmt$_putlab ( I4_rule_variable , Times(1) ,
     1                  Rule , 2 , .False. )
        Else ! Other rule  types
        End If ! Rule types
c
c       status = vss$_mehclose()                       !close file just in ca
c
d       write(6,*) ' Did putlabs -second status = ',dmt_status
d       write(6,*) ' Did putlabs -exiting'
```

```
C
C...If Deviation is non-zero, update past actions
C
        If ( Deviation .ne. 0 ) Then
           Do 90  J = 5,2,-1
              Past_action_value(Block,J) = Past_action_value(Block,J-1)
   90         Past_action_time (Block,J) = Past_action_time (Block,J-1)
           Past_action_value(Block,1) = Deviation
           Past_action_time (Block,1) = Times(1)
        End If
C
C...Load user arrays for user programs
C
        User_integer(1) = Integer_now    ! Time of Tests
        User_integer(2) = Rule
        User_real(1) = Deviation
        Do J = 1 , Max ( Num_points , 18 )
           User_integer(2+J) = Times(J)   ! Time of samples used in test
           User_real    (2+J) = Point(J)  ! Value of samples used in tes
        End Do
        If ( Rule .eq. 0.0 ) Then
           User_character(1) = 'On aim, No rules broken '
           User_character(2) = 'On aim, No rules broken.'
        Else If ( Rule .eq. 1.0 ) Then
           User_character(1) = 'Shewhart 1 out of 1 rule'
           User_character(2) = 'Shoe heart 1 out of 1 rule'
        Else If ( Rule .eq. 3.0 ) Then
           User_character(1) = 'Shewhart 2 out of 3 rule'
           User_character(2) = 'Shoe heart 2 out of 3 rule'
        Else If ( Rule .eq. 5.0 ) Then
           User_character(1) = 'Shewhart 4 out of 5 rule'
           User_character(2) = 'Shoe heart 4 out of 5 rule'
        Else If ( Rule .eq. 7.0 ) Then
           User_character(1) = 'Shewhart 7 in a row rule'
           User_character(2) = 'Shoe heart 7 in a row rule'
        End If
C
C...Call User routine
C
        Call User_programs ( Block )
        Return
        End
        Subroutine_name = Code_dir_file(Istart+1:80)//Blank
d       Call Fdv$putl ( 'Will get index of ".".')
        Iend   = Index ( Subroutine_name, '.' )
d       Call Fdv$putl ( 'Will clip subrout name.')
        If   ( Iend .gt. 1 ) Then
           Subroutine_name = Subroutine_name(1:Iend-1)//Blank
        Else
           Subroutine_name = 'Expert'//Blank
        End If
d       Call Fdv$putl ( 'Will trim subroutine name.')
        Call Str$trim ( Subroutine_name, Subroutine_name, Srlen )
d       Write ( 6, 100 ) Subroutine_name
        Write ( Code_lun, 100 ) Subroutine_name
C
C...construct a sub-process name
C
        If ( Subroutine_name(1:5) .eq. 'BLOCK' ) Then
d          Call Fdv$putl('Is block.')
d          Call Fdv$wait ( It )
           Read ( Subroutine_name(6:8), '(I3)' ,err= 91 ) Iblock
d          Call Fdv$putl('Is > 99.')
```

```
d            Call Fdv$wait ( It )
             Liblock = 3
             Go To 93
   91        Read ( Subroutine_name(6:7), '(I2)' ,err= 92 ) Iblock
d            Call Fdv$putl('Is > 9.')
d            Call Fdv$wait ( It )
             liblock = 2
             Go To 93
   92        Read ( Subroutine_name(6:6), '(I1)' ,err= 93 ) Iblock
d            Call Fdv$putl('Is < 10.')
d            Call Fdv$wait ( It )
             Liblock = 1
             Go To 93
   93        Write ( Cblock, '(I3)' ) Iblock
             Istart = 4 - Liblock
             Subprocess_name = 'B'//Cblock(Istart:3)//'_'
             L_sp = 3 + Liblock
         Else
             L_sp = 1
         End If
C
 100     Format(
       1 '      Options /Extend_source', /,
       1 'C*********************************************',/,
       1 'C',/,
       1 'C     Expert System Code',/,
       1 'C', /,
       1 'C*********************************************',/,
       1 'C', /,
       1 '      Subroutine ', A, /,
       1 'C' , / ,
       1 '      Include ''ACS$includes:ACSserv.inc'' ' , / ,
       1 '      Include ''ACS$includes:ACSstatus.inc'' ' , / ,
       1 '      Include ''ACS$includes:Sys_functions.inc'' ' , / ,
       1 '      Include ''($Jpidef)'' ' , / ,
       1 '      Integer*4       Vss$_to_ascii_time' , / ,
       1 '      Integer This_pass_fires' , / ,
       1 '      Character*25    Unknown' , / ,
       1 '      Parameter       ( Unknown = ''Unknown              '')' 
       1 '      Character*25    OK' , / ,
       1 '      Parameter       ( OK = ''OK                   '')' , / ,
       1 '      Character*25    Too_old' , / ,
       1 '      Parameter       ( Too_old = ''Too_old              '')'
       1 '      Integer*4       Now' , / ,
       1 '      Integer*4       Then' , / ,
       1 '      Character*18    C_now' , / ,
       1 '      Integer*4       Itemlist(4)' , / ,
       1 '      Integer*2       Code(2)' , / ,
       1 '      Equivalence     ( Itemlist(1) , Code(1) )' , / ,
       1 '      Integer*4       Mode' , / ,
       1 '      Integer*2       Len' , / ,
       1 '      Character*80    Line' , / ,
       1 'C'
       1 )
d        write(6,*) ' wrote header info.'
c
C..Make declaration code for variable rules
c
c
         First = .True.
   1     Continue
c
C..Read A rule
```

```
C
        Call Read_var_rule_params ( First , No_more )
        If ( No_more ) Go To 200
C
C..Write out FORTRAN declarations
C
        Call Str$trim ( Rule_name , Rule_name , Len )
        Write ( Code_lun , 101 ) (Rule_name(1:len) , J=1,5 )
101     Format (
        1 '       Real*4            ' , A , '_value'    , / ,
        1 '       Integer*4         ' , A , '_age'      , / ,
        1 '       Character*25      ' , A , '_stat'     , / ,
        1 '       Logical*1         ' , A , '_fired'    , / ,
        1 '       Character*10      ' , A , '_astat'    , / ,
        1 'C'
        1 )
C
        Go To 1
C
  200   Continue
C
C..Make declaration code for calculation rules
C
        Call Declare_calc_rules
C
C..Make declaration code for analysis rules
C
C
        Last_cond = '                          '
        First = .True.
    2   Continue
C
C..Read A rule
C
        Call Read_anal_rule_params ( First , No_more )
        If ( No_more ) Go To 201
C
C..Write out FORTRAN declarations
C
        Call Str$trim ( An_cond_name , An_cond_name , Len )
        Call Str$trim ( An_rule_name , An_rule_name , ILen )
        Write ( Code_lun , 104 )
        If ( An_cond_name .ne. Last_cond )
        1       Write ( Code_lun , 102 ) (An_cond_name(1:len) )
        Write ( Code_lun , 103 ) (An_rule_name(1:Ilen) )
        Last_cond = An_cond_name
102     Format (
        1 '       Character*25      ' , A , '_stat'
        1 )
103     Format (
        1 '       Logical*1         ' , A , '_fired'
        1 )
  104   Format (
        1 'C'
        1        )
C
        Go To 2
C
  201   Continue
C
C..Make declaration code for action rules
C
C
```

```
              First = .True.
    252       Continue
C
C..Read A rule
C
              Call Read_action_rule_params ( First , No_more )
              If ( No_more ) Go To 251
C
C..Write out FORTRAN declarations
C
              Call Str$trim ( Ac_rule_name , Ac_rule_name , Len )
              Write ( Code_lun , 262 ) Ac_rule_name(1:len)
    262       Format (
              1 '      Logical*1        ' , A , '_fired'       , / ,
              1 'C'
              1 )
C
              Go To 252
C
    251       Continue
C
C
C...Now Write Initialization code
C
              Write ( Code_lun , 401 ) Subroutine_name (1:Srlen)
    401       Format (
              1 'C' , / ,
              1 'C    Initialize the status values.' , / ,
              1 'C' , / ,
              1 '     Van_status = Vss$_from_ascii_time ( '' '' , Now )' , /
              1 '     Van_status = Vss$_to_ascii_time ( Now , C_Now )' , / ,
              1 '     Code(1) = 4           ' , / ,
              1 '     Code(2) = jpi$_mode' , / ,
              1 '     Itemlist(2) = %loc(Mode)' , / ,
              1 '     Itemlist(3) = %loc(Len)' , / ,
              1 '     Itemlist(4) = 0' , / ,
              1 '     sys_status = sys$getjpiw ( ,,,Itemlist,,,)' , / ,
              1 'd    Write(6,901) C_now' , / ,
              1 '901 Format ( / , '' Running ' , A , ' at '' , A )' , / ,
              1 'C'
              1 )
C
C....Initialize variable rules - This will set logical flags false and
C       retrieve the necessary data for the rule.
C
              First = .True.
    402       Continue
C
C
C..Read A rule
C
              Call Read_var_rule_params ( First , No_more )
              If ( No_more ) Go To   420
C
              Call Str$trim ( Rule_name , Rule_name , Len )
              Write ( Code_lun , 403 ) ( Rule_name(1:Len) , J =1,4 )
    403       Format (
              1 'C' , / ,
              1 'C....' , A , ' rule initialization' , / ,
              1 'C' , / ,
              1 '    ' , A , '_astat = Unknown' , / ,
              1 '    ' , A , '_stat = Unknown' , / ,
              1 '    ' , A , '_fired = .False.' )
```

```
C
           If ( Ret_meth .eq. Current_val ) Then
              Write ( code_lun , 404 ) Var_num , (Rule_name(1:len),J=1,2)
   404     Format (
        1 '     Call Get_cur_data ( ' , I4 , ' , ' , A , '_value , '
'_age
)'
        1 )

Else If ( Ret_meth .eq. Discrete_avg ) Then
              Write   ( code_lun  ,   405  )  Ret_time   ,   Var_n
(Rule_name(1:len),J=1,2)

405     Format (
        1 'C' , / ,
        1 '     Then = Now + ' , I12 , / ,
        1 '     Call Get_disc_avg_data ( ' , I4 , ' , ' , A , '_value
A ,
'_age , Then , Now )'
        1 )
           Else If ( Ret_meth .eq. Time_wt_avg ) Then
              Write   ( code_lun  ,   406  )  Ret_time   ,   Var_n
(Rule_name(1:len),J=1,2)

406     Format (
        1 'C' , / ,
        1 '     Then = Now + ' , I12 , / ,
        1 '     Call Get_time_wt_avg_data ( ' , I4 , ' , ' , A , '_val
, A
, '_age , Then , Now )'
        1 )
           Else If ( Ret_meth .eq. Sec_last_vant_point ) Then Write ( code_lun , 411 ) Var_num ,
        1        Rule_name(1:len)
   411     Format (
        1 'C' , / ,
        1 '     Call Get_sec_last_vant_point ( ' , I4 , ' , ' , A , '
, Itime_stamp )'
        1 )
           Else If ( Ret_meth .eq. ACS_ff_delta ) Then Write ( code_lun , 407 )  Var_num , Rule_name(1:len)
   407     Format (
        1 'C' , / ,
        1 '     ACS_status = ACS_get_FF_delta ( ' , I4 , ' , ' , A , '
)'
        1 )
           Else If ( Ret_meth .eq. ACS_fb_error ) Then
              Write ( code_lun , 408 ) Var_num , Rule_name(1:len)
   408     Format (
        1 'C' , / ,
        1 '     ACS_status = ACS_get_fb_error ( ' , I4 , ' , ' , A , '
)'
        1 )
           Else If ( Ret_meth .eq. PCS_DMT_loop_goal ) Then
              Write ( code_lun , 409 ) Var_num , Rule_name(1:len)
   409     Format (
        1 'C' , / ,
        1 '     ACS_status = ACS_get_PCS_goal ( ''DMT        '' , ' ,
        1 I , ' , ' , A , '_value )'
```

```
                1 )
                Else If ( Ret_meth .eq. PCS_TPA_loop_goal ) Then
                   Write ( code_lun , 410 ) Var_num , Rule_name(1:len)
     410        Format (
                1 'C' , / ,
                1 '       ACS_status = ACS_get_PCS_goal ( ''TPA          '' , ' ,
                1 I , ' , ' , A , '_value )'
                1 )
                Else
                    Write( Code_lun , * ) 'C....Bad retrieval method'
                End If
C
                Write ( Code_lun , 510 ) (Rule_name(1:len),J=1,2)
     510        Format (
                1 'd    Write(6,*) '' ' , A , '_value = '' , ' , A , '_value'
C
                Go To 402
C
     420        Continue
C
C....Initialize calculation rules
C
                Call Init_calc_rules
C
C....Initialize analysis rules
C
                Last_cond = '                    '
                First = .True.
     440        Continue
C
C
C..Read A rule
C
                Call Read_anal_rule_params ( First , No_more )
                If ( No_more ) Go To 450
C
                Call Str$trim ( An_cond_name , An_cond_name , Len )
                Call Str$trim ( An_rule_name , An_rule_name , ILen )
                Write ( Code_lun , 441 ) ( An_rule_name(1:ILen) , J =1,2 )
                If ( An_cond_name .eq. Last_cond ) Go To 440
                Last_cond = An_cond_name
                Write ( Code_lun , 442 ) ( An_cond_name(1:Len) , J =1,1 )
     441        Format (
                1 'C' , / ,
                1 'C....' , A , ' rule initialization' , / ,
                1 'C' , / ,
                1 '      ' , A , '_fired = .False.' )
     442        Format (
                1 '      ' , A , '_stat = Unknown' )
C
                Go To 440
C
     450        Continue
C
C....Initialize action rules
C
                First = .True.
     460        Continue
C
C
C..Read A rule
C
```

```
              Call Read_action_rule_params ( First , No_more )
              If ( No_more ) Go To 490
C
              Call Str$trim ( Ac_rule_name , Ac_rule_name , Len )
              Write ( Code_lun , 461 ) ( Ac_rule_name(1:Len) , J =1,2  )
    461       Format (
             1 'C' , / ,
             1 'C....' , A , ' rule initialization' , / ,
             1 'C' , / ,
             1 '      ' , A , '_fired = .False.'  )
C
              Go To 460
    490       Continue
C
    500       Continue
C
C...Write the rule code
C
              Write ( Code_lun , 501 )
    501       Format (
             1 'C' , / ,
             1 '   1 Continue' , / ,
             1 'C' , / ,
             1 '      This_pass_fires = 0' , / ,
             1 'C'
             1 )
C
C
C...Write out variable rule code
C
              First = .True.
C
    502       Continue
C
C..Read A rule
C
              Call Read_var_rule_params ( First , No_more )
              If ( No_more ) Go To 600
C
              Call Str$trim ( Rule_name , Rule_name , Len )
C
              If ( Age_limit .eq. Empty ) Age_limit = -365*24*60*60
C
              Write ( Code_lun , 299 ) ( Rule_name(1:len),J=1,3) , Abs(Age_
,
             1 ( Rule_name(1:len),J=1,2)
    299       Format (
             1 'C' , / ,
             1 'C....' , A , ' Rules ' , / ,
             1 'C' , / ,
             1 '      If ( ' , /
             1 '     1    ( ' , A , '_astat .eq. Unknown ) .and. ' , / ,
             1 '     1    ( ' , A , '_age .le. ' , I , ' ) ' , / ,
             1 '     1    ) Then ' , / ,
             1 '          ' , A , '_astat = OK ' , / ,
             1 'd         Write(6,*) ''' , A , '_age is OK.''' , / ,
             1 '          This_pass_fires = This_pass_fires + 1' , / ,
             1 '      End If'
             1 )
C
              Write  ( Code_lun  ,Fmt=298 ) ( Rule_name(1:len),J=1
     Abs(Age_limit) ,
```

```
       1      ( Rule_name(1:len),J=1,2)
 298   Format (
       1 'C' , / ,
       1 '      If ( ' , / ,
       1 '       1    ( ' , A , '_astat .eq. Unknown ) .and. ' , / ,
       1 '       1    ( ' , A , '_age .gt. ' , I , ' ) ' , / ,
       1 '       1        ) Then ' , / ,
       1 '          ' , A , '_astat = Too_old' , / ,
       1 'd        Write(6,*) '''' , A , '_age is Too_old.''' , / ,
       1 '          This_pass_fires = This_pass_fires + 1' , / ,
       1 '      End If'
       1 )
C
       Write( code_lun , 505 ) (Rule_name(1:len),J=1,3) , Log_op1 ,
       1        Rule_name(1:len) , Status1 , Rule_name(1:len) ,
       1        Status1 , Rule_name(1:len)
 505   Format (
       1 'C' , / ,
       1 '      If ( ' , / ,
       1 '       1    ( .not. ' , A , '_fired ) .and. ' , / ,
       1 '       1    ( ' , A , '_astat .eq. OK ) .and. ' , / ,
       1 '       1    ( ' , A , '_value ' , A4 , ' ' , F12.5 , ' ) ' ,
       1 '       1        ) Then ' , / ,
       1 '          ' , A , '_stat = ''' , A25 ,'''' , / ,
       1 'd        Write(6,*) '''' , A , '_stat is ' , A ,'''' , / ,
       1 '          ' , A , '_fired = .True.' , / ,
       1 '          This_pass_fires = This_pass_fires + 1' , / ,
       1 '      End If'
       1 )
C
       Write( code_lun , 506 ) (Rule_name(1:len),J=1,3) , Log_op8 ,
       1        Rule_name(1:len) , Status8 , Rule_name(1:len) ,
       1        Status8 , Rule_name(1:len)
 506   Format (
       1 'C' , / ,
       1 '      If ( ' , / ,
       1 '       1    ( .not. ' , A , '_fired ) .and. ' , / ,
       1 '       1    ( ' , A , '_astat .eq. OK ) .and. ' , / ,
       1 '       1    ( ' , A , '_value ' , A4 , ' ' , F12.5 , ' ) ' ,
       1 '       1        ) Then ' , / ,
       1 '          ' , A , '_stat = ''' , A25 ,'''' , / ,
       1 'd        Write(6,*) '''' , A , '_stat is ' , A ,'''' , / ,
       1 '          ' , A , '_fired = .True.' , / ,
       1 '          This_pass_fires = This_pass_fires + 1' , / ,
       1 '      End If'
       1 )
C
       If ( Status2 .ne. '                        ' ) Then
C
       Write( code_lun , 508 ) (Rule_name(1:len),J=1,3) , Log_op2 ,
       1        Rule_name(1:len) , Log_op3 , Limit3 ,
       1        Rule_name(1:len) , Status2 , Rule_name(1:len) ,
       1        Status2 , Rule_name(1:len)
 508   Format (
       1 'C' , / ,
       1 '      If ( ' , / ,
       1 '       1    ( .not. ' , A , '_fired ) .and. ' , / ,
       1 '       1    ( ' , A , '_astat .eq. OK ) .and. ' , / ,
       1 '       1    ( ' , A , '_value ' , A4 , ' ' , F12.5 , ' ) .and
```

```
          1 '        1    ( ' , A , '_value ' , A4 , ' ' , F12.5 , ' ) ' ,
          1 '        1      ) Then ' , / ,
          1 '            ' , A , '_stat = ''', A25 ,'''' , / ,
          1 'd        Write(6,*) '''' , A , '_stat is ' , A ,'''' , / ,
          1 '            ' , A , '_fired = .True.' , / ,
          1 '            This_pass_fires = This_pass_fires + 1' , / ,
          1 '        End If'
          1 )
          End If
c
          If ( Status4 .ne. '                           ' ) Then
c
          Write( code_lun , 509 ) (Rule_name(1:len),J=1,3) , Log_op4 ,
          1         Rule_name(1:len) , Log_op5 , Limit5 ,
          1         Rule_name(1:len) , Status4 , Rule_name(1:len) ,
          1         Status4 , Rule_name(1:len)
509       Format (
          1 'C' , / ,
          1 '        If ( ' , / ,
          1 '        1    ( .not. ' , A , '_fired ) .and. ' , / ,
          1 '        1    ( ' , A , '_astat .eq. OK ) .and. ' , / ,
          1 '        1    ( ' , A , '_value ' , A4 , ' ' , F12.5 , ' ) .and
          1 '        1    ( ' , A , '_value ' , A4 , ' ' , F12.5 , ' ) ' ,
          1 '        1      ) Then ' , / ,
          1 '            ' , A , '_stat = ''', A25 ,'''' , / ,
          1 'd        Write(6,*) '''' , A , '_stat is ' , A ,'''' , / ,
          1 '            ' , A , '_fired = .True.' , / ,
          1 '            This_pass_fires = This_pass_fires + 1' , / ,
          1 '        End If'
          1 )
          End If
c
          If ( Status6 .ne. '                           ' ) Then
c
          Write( code_lun , 511 ) (Rule_name(1:len),J=1,3) , Log_op6 ,
          1         Rule_name(1:len) , Log_op7 , Limit7 ,
          1         Rule_name(1:len) , Status6 , Rule_name(1:len) ,
          1         Status6 , Rule_name(1:len)
511       Format (
          1 'C' , / ,
          1 '        If ( ' , / ,
          1 '        1    ( .not. ' , A , '_fired ) .and. ' , / ,
          1 '        1    ( ' , A , '_astat .eq. OK ) .and. ' , / ,
          1 '        1    ( ' , A , '_value ' , A4 , ' ' , F12.5 , ' ) .and
          1 '        1    ( ' , A , '_value ' , A4 , ' ' , F12.5 , ' ) ' ,
          1 '        1      ) Then ' , / ,
          1 '            ' , A , '_stat = ''', A25 ,'''' , / ,
          1 'd        Write(6,*) '''' , A , '_stat is ' , A ,'''' , / ,
          1 '            ' , A , '_fired = .True.' , / ,
          1 '            This_pass_fires = This_pass_fires + 1' , / ,
          1 '        End If'
          1 )
          End If
c
          Go To 502
c
```

```
 600    Continue
C
C...Write out calculation rule code
C
        Call Write_calc_rules
C
C...Write out analysis rule code
C
        First = .True.
C
 602    Continue
C
C..Read A rule
C
        Call Read_anal_rule_params ( First , No_more )
        If ( No_more ) Go To 700
C
C
        Call Str$trim ( An_cond_name , An_cond_name , Len )
        Call Str$trim ( An_rule_name , An_rule_name , ILen )
        Write ( Code_lun , 699 ) (An_rule_name(1:Ilen),j=1,2)
 699    Format (
       1 'C' , / ,
       1 'C....' , A , ' Rules ' , / ,
       1 'C' , / ,
       1 '    If ( ' , / ,
       1 '    1    ( .not. ' , A , '_fired ) .and. '
       1 )
C
        If ( An_rule1 .ne. '                        ' ) Then
        Call Str$trim ( An_rule1 , An_rule1 , Len )
C
        If ( An_not1 .eq. '.NOT.' ) Then
           Write( code_lun , 1001 ) An_rule1(1:len)
        End If
 1001   Format (
       1 '    1    ( .not. ( ' , A , '_stat .EQ. Unknown ) ) .and.'
       1 )
        Write( code_lun , 608 ) An_not1 , An_rule1(1:len) ,
       1        An_status1
 608    Format (
       1 '    1    ( ' , A , ' ( ' , A , '_stat .EQ. ''' , A , ' .and.'

1 )
        End If
C
        If ( An_rule2 .ne. '                        ' ) Then
        Call Str$trim ( An_rule2 , An_rule2 , Len )
C
        If ( An_not2 .eq. '.NOT.' ) Then
           Write( code_lun , 1001 ) An_rule2(1:len)
        End If
        Write( code_lun , 609 ) An_not2 , An_rule2(1:len) ,
       1        An_status2
 609    Format (
       1 '    1    ( ' , A , ' ( ' , A , '_stat .EQ. ''' , A , ' .and.'

1 )
        End If
C
```

```
          If ( An_rule3 .ne. '                              ' ) Then
          Call Str$trim ( An_rule3 , An_rule3 , Len )
C
          If ( An_not3 .eq. '.NOT.' ) Then
              Write( code_lun , 1001 ) An_rule3(1:len)
          End If
          Write( code_lun , 610 ) An_not3 , An_rule3(1:len) ,
         1      An_status3
  610     Format (
         1 '         1        ( ' , A , ' ( ' , A , '_stat .EQ. ''' , A , ' .and.'

1 )
          End If
C
          If ( An_rule4 .ne. '                              ' ) Then
          Call Str$trim ( An_rule4 , An_rule4 , Len )
C
          If ( An_not4 .eq. '.NOT.' ) Then
              Write( code_lun , 1001 ) An_rule4(1:len)
          End If
          Write( code_lun , 611 ) An_not4 , An_rule4(1:len) ,
         1      An_status4
  611     Format (
         1 '         1        ( ' , A , ' ( ' , A , '_stat .EQ. ''' , A , ' .and.'

1 )
          End If
C
          If ( An_rule5 .ne. '                              ' ) Then
          Call Str$trim ( An_rule5 , An_rule5 , Len )
C
          If ( An_not5 .eq. '.NOT.' ) Then
              Write( code_lun , 1001 ) An_rule5(1:len)
          End If
          Write( code_lun , 612 ) An_not5 , An_rule5(1:len) ,
         1      An_status5
  612     Format (
         1 '         1        ( ' , A , ' ( ' , A , '_stat .EQ. ''' , A , ' .and.'

1 )
          End If
C
          Call Str$trim ( An_cond_name , An_cond_name , Len )
          Write ( Code_lun , 613 )
         1 (An_cond_name(1:len),j=1,1) , An_end_status ,
         1 (An_cond_name(1:len),j=1,1) , An_end_status ,
         1 (An_rule_name(1:Ilen),j=1,1)
  613     Format (
         1 '         1    ( .True. ) ' , / ,
         1 '         1         ) Then ' , / ,
         1 '             ' , A , '_stat = ''', A25 ,'''' , / ,
         1 'd        Write(6,*) ''' , A , '_stat is ' , A ,'''' , / ,
         1 '            This_pass_fires = This_pass_fires + 1' , / ,
         1 '         End If'
         1 )
C
          Go To 602
C
  700     Continue
C
C
```

```
C...Write out action rule code
C
        First = .True.
C
 702    Continue
C
C..Read A rule
C
        Call Read_action_rule_params ( First , No_more )
        If ( No_more ) Go To 800
C
C
        Call Str$trim ( Ac_rule_name , Ac_rule_name , Len )
        Write ( Code_lun , 799 ) (Ac_rule_name(1:len),j=1,2)
 799    Format (
      1 'C' , / ,
      1 'C....' , A , ' Rules ' , / ,
      1 'C' , / ,
      1 '      If ( ' , / ,
      1 '     1    ( .not. ' , A , '_fired ) .and. '
      1 )
C
        Call Str$trim ( Ac_rule1 , Ac_rule1 , Len )
C
        Write( code_lun , 708 ) Ac_rule1(1:len) ,
      1         Ac_status1
 708    Format (
      1 '     1    ( ' , ' ( ' , A , '_stat .EQ. ''' , A , ''' ) ) '
      1 )
C
C
        Call Str$trim ( Ac_rule_name , Ac_rule_name , Len )
        Write ( Code_lun , 713 ) (Ac_rule_name(1:len),j=1,2)
 713    Format (
      1 '     1    ) Then ' , / ,
      1 'd       Write(6,*) ''Doing action rule ' , A , '''' , / ,
      1 '        ' , A , '_fired = .True.' , / ,
      1 '        This_pass_fires = This_pass_fires + 1'
      1 )
C
        Call Str$trim ( Ac_data_line , Ac_data_line , Len )
        If ( Iac_type .eq. Exec_fort_statement ) Then
           Write ( code_lun , 714 ) Ac_data_line(1:Len)
 714       Format (
      1 '       ' , A
      1 )
        Else If ( Iac_type .eq. Exec_dcl_procedure ) Then Subprocess_name(L_sp:14) = Ac_rule_name
           Call Str$trim ( Subprocess_name , Subprocess_name , ILen )
           Write ( code_lun , 715 ) Ac_data_line(1:Len) ,
      1                             Subprocess_name(1:Ilen)
 715       Format (
      1 '       Call Lib$spawn ( ''@' , A , ''',,,,'' , A , ''' ,,,,'
      1 )
        Else If ( Iac_type .eq. Send_vaxmail_msg ) Then Call Str$trim ( Ac_rule_name , Ac_rule_name , Len )
         Call Str$trim ( Directory , Directory , L_dir )
           Subprocess_name(L_sp:14) = Ac_rule_name
           Call Str$trim ( Subprocess_name , Subprocess_name , ILen )
           Write(Code_lun , 788 )
```

```
 788        Format (
           1 '    If ( Mode .eq. Jpi$k_other ) Then'
           1 )
             Write ( code_lun , 718 ) Directory(1:L_dir) ,
           1              Ac_rule_name(1:len) ,
           1              Subprocess_name(1:Ilen)
 718        Format (
           1 '    Call Lib$spawn ( ''@'' , A , A , ''.mailmsg'',,,,'''' , A
''',,,,)'
           1 )
             Write(Code_lun , 787 )
 787        Format (
           1 '    Else if ( Mode .eq. Jpi$k_interactive ) Then'
           1 )
             Write ( Code_lun , 789 ) Directory(1:L_dir) ,
           1              Ac_rule_name(1:len) , Next_label, Next_label
             Next_label = Next_label + 1
 789        Format (
           1 '    Open(11,File='''' , A , A , ''.mailmsg'' ,Status=''old''
           1 '    Do J = 1,3 ' ,/,
           1 '      Read ( 11 , ''(A)'' ) Line' ,/,
           1 '    End Do' ,/,
           1 '    Do J = 1,60' ,/,
           1 '      Read (11 , ''(A)'' , End = ', I4 , ' ) Line ' ,/,
           1 '      Write(6,*) Line ' ,/,
           1 '    End Do' ,/,
           1 I4 ,' Continue' ,/,
           1 '    Close ( 11 ) '
           1 )
             Write(Code_lun , 786 )
 786        Format (
           1 '    End If'
           1 )
C
           Else
             Write ( code_lun , 716 )
 716        Format (
           1 '    Write(6,*) ''Bad Action type.'''
           1 )
           End If
C
           Write ( Code_lun , 717 )
 717       Format (
           1 '    End If'
           1 )
C
           Go To 702
C
 800       Continue
C
           Write( Code_lun , 9998 )
 9998      Format (
           1 'd   Write(6,*) This_pass_fires,'' rules fired this pass.'
           1 '    If ( This_pass_fires .gt. 0 ) Go To 1' , / ,
           1 'C' , / ,
           1 '    Return' , / ,
           1 '
           1 )
           Call Fdv$Put1(' Generating Expert System code....  Done.')
           Return
           End
```

What is claimed is:

1. A computer-based method for operating a substantially continuous process, comprising the steps of:
   (1) operating the process with one or more sensors connected to sense conditions in the process, and one or more actuators connected to change conditions in the process;
   (2) controlling one or more of said actuators with a process controller is accordance with signals received from said sensors and in accordance with control parameters;
   (3) repeatedly running a process supervisor procedure comprising one or more software modules, for selectively defining one or more of said control parameters for said process controller;
   (4) presenting a functional structure to a user, for a new software module and said process supervisor procedure and/or a functional structure corresponding to the user input from which a current software module of said process supervisor procedure was generated, and selectively loading user inputs into said functional structure to be used by said process supervisor procedure;
   (5) wherein said functional structure permits the user to define timing and sequencing parameters for respective ones of said software modules which include at least the following options:
      (a) become active if another specified software module has become active;
      (b) become active if a new value has been entered for a specified data source; or
      (c) become active if a specified time of inactivity has elapsed.

2. The method of claim 1, wherein said timing and sequencing parameters of step (5) further provide the option of:
   become active if a specified external event is found to have occurred.

3. The method of claim 1, wherein said step of loading user inputs to become actively accessed by said process supervisor procedure is only performed after a validation run has been performed.

4. The method of claim 1, wherein said process controller of step (2) uses a cycling step, and said process supervisor procedure of step (3) uses a cycling step.

5. The method of claim 1, wherein said process supervisor procedure of step (3) uses a cycling step, and said process controller of step (2) operates in substantially real-time.

6. The method of claim 1, wherein said functional structure of step (4) comprises the step of presenting itself in a substantially natural language format which is readily understandable by a user who is technically skilled in a predetermined art but who is not necessarily competent in any computer language.

7. The method of claim 1, wherein only restricted portions of said functional structure of step (4) comprises the step of allowing for user alterability.

8. The method of claim 1, wherein said user-alterable portions of said functional structure of step (4) comprise the step of appearing differently to the user than do other portions of said functional structures.

9. The method of claim 1, wherein said process supervisor procedure of step (3) comprises the step of calling on at least one expert subprocedure which includes a knowledge base and inference structure relevant to the process.

10. The method of claim 1, wherein, for each of said control parameters, said process supervisor procedure of step (3) comprises the step of being constrained not to make changes unless the amount of the change would exceed a certain threshold; and wherein said process supervisor procedure reports every instance where it changes a control parameter.

11. The method of claim 1, wherein for each of said control parameters, said process supervisor procedure of step (3) comprises the step of being constrained not to make changes unless the amount of the change would exceed a certain threshold.

12. The method of claim 1, wherein said process supervisor procedure of step (3) comprises the step of following a feedback control relation including a deadband on respective ones of said control parameters, and wherein said process supervisor procedure follows a feedforward control relation including a deadband on respective ones of said control parameters.

13. The method of claim 1, wherein said process supervisor procedure of step (3) comprises the step of having a maximum iteration period significantly longer than the maximum iteration period of said process controller of step (2).

14. The method of claim 1, wherein said process controller of step (2) uses analog logic for controlling.

15. The method of claim 1, wherein said step (3) of repeatedly running a process supervisor procedure comprises the step of running said process supervisor procedure using a cycling step.

16. The method of claim 1, wherein said software modules of step (4) comprise the step of being defined by respective data definitions, including
   pointers to procedures which will carry out a respective function,
   and parameters to be passed to said procedures pointed to.

17. The method of claim 1, wherein said software modules of step (4) comprise the step of being defined by respective data definitions, including
   pointers to procedures which will carry out a respective function, most of said procedures pointed to corresponding generally to one of a limited number of procedure types,
   and, parameters to be passed to said procedures pointed to.

18. The method of claim 1, wherein said software modules of step (4) comprise the step of being defined by respective data definitions, including
   pointers to procedures which will carry out a respective function, wherein most of said procedures pointed to correspond generally to one of a limited number of procedure types, and wherein at least some of said procedures which do not correspond generally to any one of said limited number of procedure types,
   and, parameters to be passed to said procedures pointed to.

19. The method of claim 1, wherein said control parameters of step (2) comprise the step of including goals of said process controller.

20. The method of claim 1, wherein said functional structure of step (4) comprises the step of including standardized data interface definitions such that the user can specify data having one of plural pre-defined temporal characteristics.

21. The method of claim 1, wherein said functional structure of step (4) comprises the step of including standardized data interface definitions such that the user can specify data having one of a plural pre-defined temporal characteristics, and said pre-defined temporal characteristics include both current values and also time-averaged values.

22. The method of claim 1, wherein said functional structure of step (4) comprises the step of including standardized data interface definitions such that the user can specify data from any one of several different types of control systems having different respective data standards.

23. The method of claim 1, wherein said functional structure of step (4) comprises the step of permitting the user to define timing and sequencing parameters for respective ones of said modules which also include the additional option of: become active if a specified parameter in a lower-level controller has changed.

24. The method of claim 1, wherein said functional structure of step (4) comprises the step of permitting the user to define timing and sequencing parameters for respective ones of said software modules which also include the additional option of: become active only on programmatic request.

25. The method of claim 1, wherein said functional structure of step (4) comprises the step of permitting the user to define timing and sequencing parameters for respective ones of said software modules which also includes the additional option of: become active upon external switching in a specific switch system.

26. The method of claim 1, wherein each said functional structure of step (4) comprises the step of including a standard functional control relationship selected from a very limited set and a pointer to optional user-customized programming.

27. The method of claim 1, wherein said process controller of step (2) and said process supervisor procedure of step (3) comprise processes running on the same computer system.

28. The method of claim 1, wherein said process controller of step (2) and said process supervisor procedure of step (3) are both respective parts of the same software system.

* * * * *